United States Patent [19]

Richardson et al.

[11] Patent Number: 5,696,690
[45] Date of Patent: Dec. 9, 1997

[54] SHEET STACKING APPARATUS

[75] Inventors: Michael M. Richardson, Eden Prairie;
Allan C. Brittle, Jr., Wayzata; Lee B. Fiedler, Burnsville; Kent Gorham, Prior Lake; Jay R. Peterson, Eden Prairie; Gary T. Schultze, Burnsville; Chris J. Vetter, St. Paul; Eugene G. Weiss, Minneapolis, all of Minn.

[73] Assignee: Check Technology Corporation, Minnetonka, Minn.

[21] Appl. No.: 480,420

[22] Filed: Jun. 7, 1995

Related U.S. Application Data

[63] Continuation of Ser. No. 399,126, Mar. 6, 1995, which is a continuation of Ser. No. 354,654, Dec. 13, 1994.

[51] Int. Cl.$^6$ .................... G06F 19/00; B65H 9/22
[52] U.S. Cl. .................. 364/478.07; 364/478.11; 364/478.16; 271/3.01
[58] Field of Search ............. 364/478.07, 478.08, 364/478.11, 478.16; 271/3.01, 296

[56] References Cited

U.S. PATENT DOCUMENTS

| | | |
|---|---|---|
| 3,816,866 | 6/1974 | Miaskoff et al. . |
| 3,881,717 | 5/1975 | Dean . |
| 4,459,013 | 7/1984 | Hamlin et al. ............... 355/23 |
| 4,560,293 | 12/1985 | McCumber et al. . |
| 4,734,748 | 3/1988 | Murayama et al. . |
| 4,786,041 | 11/1988 | Acquaviva et al. . |
| 4,799,661 | 1/1989 | Nail . |
| 4,880,223 | 11/1989 | Yamazaki et al. . |
| 5,005,817 | 4/1991 | Ruch et al. . |
| 5,017,972 | 5/1991 | Daughton et al. ............ 355/321 |
| 5,018,717 | 5/1991 | Sadwick et al. ............. 271/207 |
| 5,022,641 | 6/1991 | Okada ...................... 271/3.1 |
| 5,037,082 | 8/1991 | Roller ...................... 271/187 |
| 5,049,924 | 9/1991 | Moro et al. . |
| 5,067,704 | 11/1991 | Tsuihiji et al. . |
| 5,075,721 | 12/1991 | Paulsel et al. . |
| 5,085,418 | 2/1992 | Rapkin et al. .............. 271/3.1 |
| 5,136,343 | 8/1992 | Brasell . |
| 5,141,215 | 8/1992 | Ishiguro et al. . |
| 5,222,860 | 6/1993 | Kamath et al. . |
| 5,232,211 | 8/1993 | Kubota et al. . |
| 5,246,219 | 9/1993 | Watkiss . |
| 5,287,158 | 2/1994 | Nagashima et al. . |
| 5,342,034 | 8/1994 | Mandel et al. ............... 270/53 |
| 5,358,238 | 10/1994 | Mandel et al. ............... 271/298 |
| 5,390,910 | 2/1995 | Mandel et al. ............... 271/296 |
| 5,435,544 | 7/1995 | Mandel ..................... 271/298 |
| 5,537,196 | 7/1996 | Matsumoto et al. ........... 355/320 |

OTHER PUBLICATIONS

*Print 600 Document Printing System*; Advanced Printing Systems, Inc.; Brochure (Oct., 1992).

(List continued on next page.)

*Primary Examiner*—Paul P. Gordon
*Attorney, Agent, or Firm*—Merchant, Gould, Smith, Edell, Welter & Schmidt, P.A.

[57] ABSTRACT

In one embodiment of the present invention, a modular printing system has a plurality of modules for processing sheets. One module is a collator module configured to retain the sheets. The collator module has a collator controller and sensors linked to the collator controller. The sensors are arranged to detect erroneously processed sheets. The collator controller is configured to generate an error signal in response to detection of an error. The collator module also includes a feed assembly for presenting the sheets. A printer module is configured to receive sheets presented by the feed assembly. The printer module includes a printer controller and sensors linked to the printer controller. The sensors are arranged to detect erroneously processed sheets and to generate an error signal in response to detection of an error. The module printing system also includes a system controller linked to the collator controller and the printer controller. The system controller is configured to generate and transmit scheduling signals thereby scheduling operation of the printing system for processing sheets. The system controller is further configured to generate error-recovery signals in response to error signals generated by the collator and printer controllers, thereby causing the modular printing system to automatically recover from printer and collator errors.

14 Claims, 28 Drawing Sheets

OTHER PUBLICATIONS

*Bourg BST Suction Tower*; C.P. Bourg, Inc.; Brochure.

*Bourg BST Vertical Suction Tower*; C.P. Bourg, Inc.; Brochure.

*Bourg Collators Systems*; C.P. Bourg, Inc.; Brochure.

*Bourg Multitower and Bourg Single Tower*; C.P. Bourg, Inc.; Brochure.

*Foliotronic Finishing System*; Check Technology Corporation; Brochure (Sep., 1993).

*Checktronic Printing System*; Check Technology Corporation; Brochure (Sep., 1993).

*Vario Control Systems*; Watkiss Automation Limited, Dist. By Challenge Graphics Equipment Company; Brochure (Aug., 1991).

*Vario Floor–Standing Base*; Watkiss Automation Limited, Dist. By Challenge Graphics Equipment Company; Brochure (Aug., 1991).

*Vario Twin Towers*; Watkiss Automation Limited, Dist. By Challenge Graphics Equipment Company; Brochure (Mar., 1992).

*Vario Suction Feed Bin*; Watkiss Automation Limited, Dist. By Challenge Graphics Equipment Company; Brochure (Mar., 1992).

*Vario Bench Top Base*; Watkiss Automation Limited, Dist. By Challenge Graphics Equipment Company; Brochure (Aug., 1991).

*Vario Stitch–Fold & Trim*; Watkiss Automation Limited, Dist. By Challenge Graphics Equipment Company; Brochure (Aug., 1991).

*Vario Friction Feed Bin*; Watkiss Automation Limited, Dist. By Challenge Graphics Equipment Company; Brochure (Aug., 1991).

*Vario X–Jogger*; Watkiss Automation Limited, Dist. By Challenge Graphics Equipment Company; Brochure (Aug., 1991).

*Vario*; Watkiss Automation Limited, Dist. By Challenge Graphics Equipment Company; Folder for Product Brochures.

*Duplo DC–8000 S Air Suction–Feed Collator*; Duplo; Brochure.

*Eprint 1000*; Indigo, N.V.; Brochure.

*Indigo's E–Print: New Generation of Offset Color Printing*; Seybold Report on Publishing System; Jul. 12, 1993; at pp. 1–8.

*Automatic Air–Suction Controllers, TAC Series*; Horizon International, Inc.; Brochure.

*The Mark Of A Great Collator Is No Mark At All*; Standard Finishing Systems; Brochure.

*Vario, What The Papers Say...*; Watkiss Automation Limited; Packet of Product Announcements, Articles, and the British Design Award, which was given on May 21, 1993 (Aug., 1993).

*Xeikon DCP–1*; Xeikon N.V.; Brochure (Copyright, 1993).

SHEET STACKING APPARATUS

This is a continuation of application Ser. No. 08/399,126, filed Mar. 6, 1995, which is a continuation of Ser. No. 08/354,654 filed Dec. 13, 1994, which applications are incorporated herein by reference.

FIELD OF THE INVENTION

The present invention relates generally to a document handling apparatus and, more particularly, to a document handling apparatus that collates sheets and inserts the sheets into a printing system.

BACKGROUND OF THE INVENTION

Customized documents are commonly used in the form of deposit slips, checks, and other types of bank drafts and personalized documents. The use of these types of documents has become widespread throughout the world and many institutions, such as banks and credit unions, are dependent upon these documents for efficient operation. The widespread use of these customized documents has lead to numerous efforts to develop systems that can print them fast and without error.

Conventional check printing processes typically use a collator and either a printer or a press. The collator first organizes different types of check stock, and then selects ("picks") the appropriate type of check stock and feeds it to the printer. Once received by the printer, the check stock is printed with customized information, such as an account-holder's name and address.

Many check-printing systems use a press-type printer that includes an imaging plate. The imaging plate is typically arranged in a document-feed path for engaging the face of the documents as they are guided by document-guiding rollers. Such document-guiding mechanisms are conventional in photocopying machines. When printing a document, the printer is designed to transport the document around the rollers in order to guide it to the imaging plate for printing.

In connection with the present invention, several disadvantages of the above-described process have been recognized. One disadvantage concerns productivity. It is important that the document-feeding path to and through the printer be as error-free as possible in order to minimize the likelihood of the paper-jams. In the above-described process, the documents (or print medium) are typically bent around several different rollers while they are being transported through the printing equipment. Bending the documents in this manner dramatically increases the likelihood of them getting jammed, which results in a significant productivity interruption because operator intervention is required to remove the jammed documents. Moreover, jammed documents can cause a series of sequential documents to be printed out of order, which causes an even greater interruption to productivity.

Another shortcoming is that the printer, collator, and other machines used in the printing system are not typically integrated. This lack of integration, or disjointedness, makes it difficult to control the various sections of the overall printing system. For example, if an error occurs in one part of the system, such as the printer, the system will typically stop running and a warning light will illuminate. The operator is then required to manually correct the error. Furthermore, independent machines are not easily configured into a customized printing system.

Other disadvantages concern the involvement by a system operator to detect and recover from errors that inevitably occur in such document-handling systems. While many known systems can detect an error, these systems typically do not provide the operator with information regarding the location and type of error that occurred. Moreover, even the more sophisticated systems typically cannot automatically recover from the error without user intervention.

Additionally, systems that use press-type printers are expensive to operate because imaging plates for each set of checks must be created and stored. Thus, the manufacturer must purchase material for the plates and related chemicals. The labor that is required to produce and install the imaging plates is also expensive.

Accordingly, there is a need for an improved printing system that overcomes the above-mentioned deficiencies, and that increases the accuracy and productivity of the overall document-handling process.

SUMMARY OF THE INVENTION

In one embodiment of the present invention, a modular printing system has a plurality of modules for processing sheets. One module is a collator module configured to retain the sheets. The collator module has a collator controller and sensors linked to the collator controller. The sensors are arranged to detect erroneously processed sheets. The collator controller is configured to generate an error signal in response to detection of an error. The collator module also includes a feed assembly for presenting the sheets. A printer module is configured to receive sheets presented by the feed assembly. The printer module includes a printer controller and sensors linked to the printer controller. The sensors are arranged to detect erroneously processed sheets and to generate an error signal in response to detection of an error. The module printing system also includes a system controller linked to the collator controller and the printer controller. The system controller is configured to generate and transmit scheduling signals thereby scheduling operation of the printing system for processing sheets. The system controller is further configured to generate error-recovery signals in response to error signals generated by the collator and printer controllers, thereby causing the modular printing system to automatically recover from printer and collator errors.

An alternative embodiment of the present invention includes an apparatus for registering a sheet being transported along a path. The sheet has a leading edge and the apparatus is configured to shift the sheet from a first position in which the leading edge is not substantially perpendicular to the path to a second position in which the leading edge is substantially perpendicular to the path. The apparatus has a first sensor arranged and configured to detect the leading edge and generate a first signal in response to detection of the leading edge. A second sensor is arranged and configured to detect the leading edge and generate a second signal in response to detection of the leading edge. First and second roller pairs are arranged and configured to feed the sheet along the path. First and second motors are arranged and configured to rotate the first and second roller pairs, respectively. Circuitry is limited to the first and second sensors and to the first and second motors. The circuitry is configured to receive the first and second signals, detect the time interval between reception of the first and second signals, and cause a speed differential between the first and second motors in response to detection of a time interval thereby shifting the sheet from the first position to the second position.

Another alternative embodiment of the present invention includes a sheet stacking apparatus for stacking sheets received from a printing assembly. The sheet stacking apparatus includes a support structure and an inverted conveyor assembly supported by the support structure. The inverted-conveyor assembly has a bottom surface and is configured to suspend the sheet received from the printing assembly against the bottom surface. The inverted-conveyor assembly transports the suspended sheets. A recirculating assembly is also supported by the support structure. The recirculating assembly is configured to separate the suspended sheet from the inverted-conveyor assembly thereby causing the sheets to fall. A platform is supported by the support structure. The falling sheets land on the platform and form a stack.

The above summary of the present invention is not intended to present each embodiment or every aspect of the present invention. This is the purpose of the figures and the associated description that follow.

BRIEF DESCRIPTION OF THE DRAWINGS

Other aspects and advantages of the present invention will become apparent upon reading the following detailed description and upon reference to the drawings in which:

FIGS. 5 and 6 and 6A show a pick mechanism assembly that is a component of the collator module shown in FIG. 1;

FIGS. 7 and 7A is an illustration of a front edge guard and separator fingers that are components of the collator module shown in FIG. 1;

While exemplary implementations of the present invention, as illustrated in these figures, can be modified and altered in various ways, it should be understood that the intention is not to limit the invention to the particular embodiment described. On the contrary, the intention is to cover all modifications, equivalents, and alternatives falling within the spirit and scope of the invention as defined by the appended claims.

DETAILED DESCRIPTION OF THE DRAWINGS

A. Overview

Figure 1:
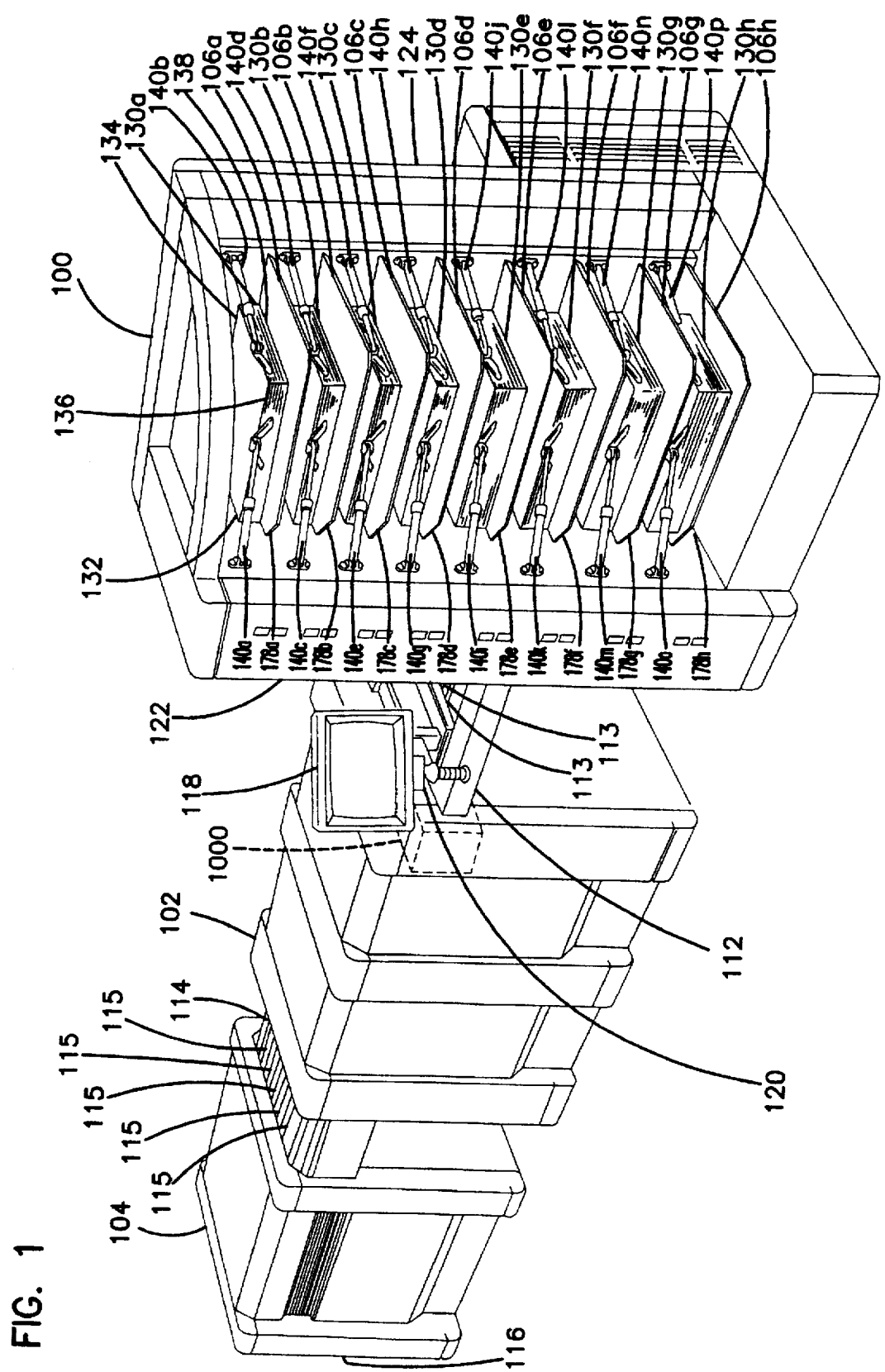
FIG. 1 is an illustration of a printing system including a collator module, a printing module, and a stacker module.
Figure 2:
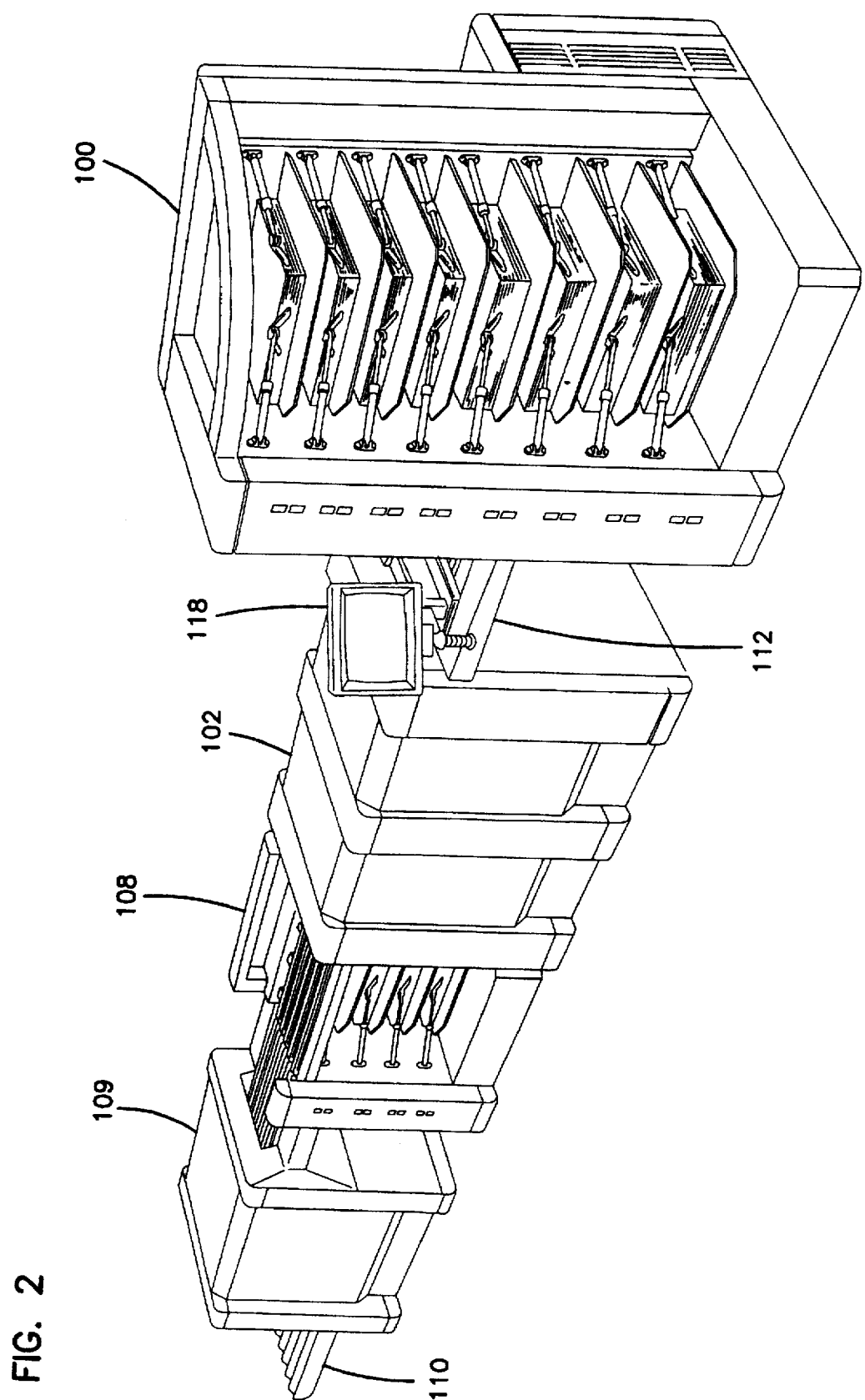
FIG. 2 is an illustration of an alternative embodiment of the printing system shown in FIG. 1.

Each of FIGS. 1–2 illustrates a system for creating documents, such as checks, deposit slips and other customized forms used in the finance industry. While the principles of the present invention are not so limited, it has been discovered that the present invention is particularly advantageous for this type of application. Hence, the implementations and embodiments embodying the principles of the present invention will be described in this context.

Referring first to FIG. 1, the system can be viewed as including three main modular sections: a collator 100, a printer 102, and a stacker 104. Each of these sections operates under the control of a programmed controller (not shown in FIG. 1), such as a conventional business computer that controls the selection (or "picking") of print medium sheets from the various retainers 106 in the collator 100 for processing by the printer 102. After the printing stage, the printer 102 feeds the printed sheets to the stacker 104, which stacks the printed sheets according to a programmed arrangement as dictated by the programmed controller. A first track assembly 112 is connected between the collector 100 and the printer 102. A second track assembly 114 is connected between the printer 102 and the stacker 104.

The alternative system of FIG. 2 is essentially identical to the system of FIG. 1, with the exception that the stacker 104 is replaced by a post collator 108 and an alternative embodiment 109 of the stacker 104. In this alternative embodiment, a conveyer 110 can be attached as yet another modular component for transporting stacks of printed sheets after the stacking stage. As will be described in more detail below, the present invention can be implemented in modular form to permit interconnection of these processing modules. This modularity also enables other types of processing modules to be interconnected into the present system.

The systems shown in FIGS. 1 and 2 address problems recognized with existing systems by providing a number of important advantages related to maintenance reduction and increased flexibility and productivity within the printing process. Examples of these advantages include: automatic detection of erroneously processed sheets; automatic recovery from such an undesired state; and processing the sheets to minimize jamming, which frequently occurs in conventional systems while they process sheets during the printing stage.

Automatic detection and automatic recovery are provided using strategically-placed sensors and sheet diverters. The sensors can detect many different types of errors that occur during printing. For example, the sensors detect multiple and simultaneous picks that result in overlapping sheets being fed from the collator, the failure of the collator to pick a sheet, whether the collator picked the wrong sheet, and whether a sheet becomes jammed within the system. When an error is detected, the diverter allows the system to eject an erroneously processed sheet and continue printing without operator intervention. Minimizing operator invention in this way results in increased quality control and efficiency.

Accordingly, it is important that the sheets are properly controlled as they are being processed and transported through the printing system. If a sheet of print media, such as check stock, is picked at the collator 100 for subsequent customized printing and insertion into a check-book, the erroneously-picked sheet is automatically rejected without breaking the sequential numbering of the checks. This type of error is one of many undesired situations that the present invention addresses by properly controlling the sheets as they are processed.

Another important aspect of the present invention is that a transport assembly forms a substantially planer path along which the sheets are processed and transported. The transport assembly is formed by the first track assembly 112, printer 102, second track assembly 114, and stacker 112. The substantially planer path begins at an output port of the collator 100. After collation, all processing of the print medium occurs while it is in the substantially planer path. Even the printing stage is implemented without removing the sheet from the substantially planar path.

The substantially planer path eliminates the need to transport the sheets around rollers, drums, or other bends, which can deform the sheet and cause jamming. Consequently, the risk of jamming is reduced and manufacturing efficiency is improved. Additionally, rolling the sheet around rollers or drums can cause it to become permanently bowed. Even if a deformed sheet does not jam the printing system, a bowed sheet can be difficult to handle and finish into a complete check book. Thus, processing the sheet along a substantially planer path improves quality control.

Turning now to the details of FIG. 1, the collator 100 is shown to include a plurality of retainers (or hoppers) 106a–106h for storing groups of documents. Each retainer 106a–106h can hold a different type of print media sheets. A first track assembly 112 is operably connected between the output of the collator 100 and the input of the printer 102, which contains a print engine and mechanisms to position and prepare the sheet for printing. The second track assembly 114 is operably connected between an output of the printer 102 and an input of the stacker 104.

In use, the collator 100 picks a sheet from a retainer 106a–106h and feeds it into a vertical track (not shown in FIG. 1). The vertical track then transports the sheet to the first track assembly 12, which transports it to the printer 102. The collator 100 picks sheets from the retainers in any predetermined sequence or order. The printer will position the sheet along the planer path and then print an image. After printing on the sheet, the printer feeds it to the second track assembly 114, which then transports the sheet to the stacker 104.

The stacker 104 stacks the sheets fed from the second output track 114. The stacker will place the sheet on a dolly (not shown in FIG. 1) that is positioned within the stacker's base 116. After the stack is complete, the operator can remove the dolly and push it to another area of the production facility so that production of the check books can be completed. A stack is complete after it reaches a certain height, has a certain number of sheets, or sensors in the stacker 104 detect a certain character string printed on a sheet that is fed from the printer 102.

A programmed controller enhances the modularity of the present printing system by providing a control system that integrates control of all the modules and track assemblies. A benefit of this programmed controller is that it provides a comprehensive and integrated error detection and recovery system. If the programmed controller detects an erroneously processed document, it will generate an error signal, determine a recovery strategy, and then generate an error-recovery signal. Another benefit is that the programmed controller is flexible and can be adapted to many different combinations of modules.

Referring back to FIG. 1, a touch screen 118 provides an interactive and graphical user interface for the programmed controller that controls the collator 100, printer 102, stacker 104, and first and second track assemblies 112 and 114. A floptical disk drive 120 is located directly below the touch screen. The floptical disk drive 138 is a peripheral storage device that accepts both magnetic and optical storage media, including 3½ inch, 1.44 megabyte magnetic floppy disks and 20 megabyte optical disks.

The collator 100, first and second track assemblies 112 and 114, printer 102, stacker 104, and programmed controller are described in greater detail below.

B. Collator

Continuing with FIG. 1, the collator 100 is a document handling apparatus having a side portion 122 and a rear portion 124 that are adjacent to and substantially perpendicular to one another. The collator 100 also includes a frame 126 and a plurality of retainers 106a–106h. Each retainer 106a–106h is formed by a tray assembly 178a–178h, respectively, that may hold a stack 130a–130h of print media sheets. Examples of print media sheets that can be used in the present printing system include standard paper, self-carbonizing paper, preprinted check stock ready for customization, and other forms and materials ready for customization. Referring to the stack 130a, each stack has a leading edge 132, first side edge 134, second side edge 136, rear edge 138, and bottom (not shown). The stack 130a is oriented so that the leading edge 132 is proximate the side portion 122 of the collator 100 and the first side edge 134 is proximate the rear portion 124 of the collator 100.

Each retainer 106a–106h has an associated pair of adjustable edge guides 140a–140p for helping to control the sheets. For example, the retainer 106a is associated with adjustable edge guides 140a and 140b, which helps to control the second side edge 136 and the rear edge 138 of the stack 130a.

Each retainer 106a–106h also has an associated elevator assembly (not shown in FIG. 1) that is housed in the rear portion 124 of the collator 100. Each elevator assembly is arranged and configured to move an associated tray assembly 106a–106h up and down in order to maintain the top of the stack 130a–130h, respectively, at an appropriate level. The elevator assemblies are described in more detail below and are shown in later figures.

Each retainer 106a–106h also has an associated pick mechanism assembly that is housed in the side portion 122 of the collator 100. A vertical track is also housed in the side portion 122 of the collator 100. Each pick mechanism assembly is arranged and configured to pick the top sheet from the stack 130a–130h and feed it into the vertical track, which then transports it to the first track assembly 112. The pick mechanism assemblies and vertical track are described in more detail below and are shown in later figures.

The collator 100 also includes sensors for detecting errors and a drive system for providing motive power to both the vertical track and the pick mechanism assemblies, as discussed in more detail below.

1. Frame

Figure 3:
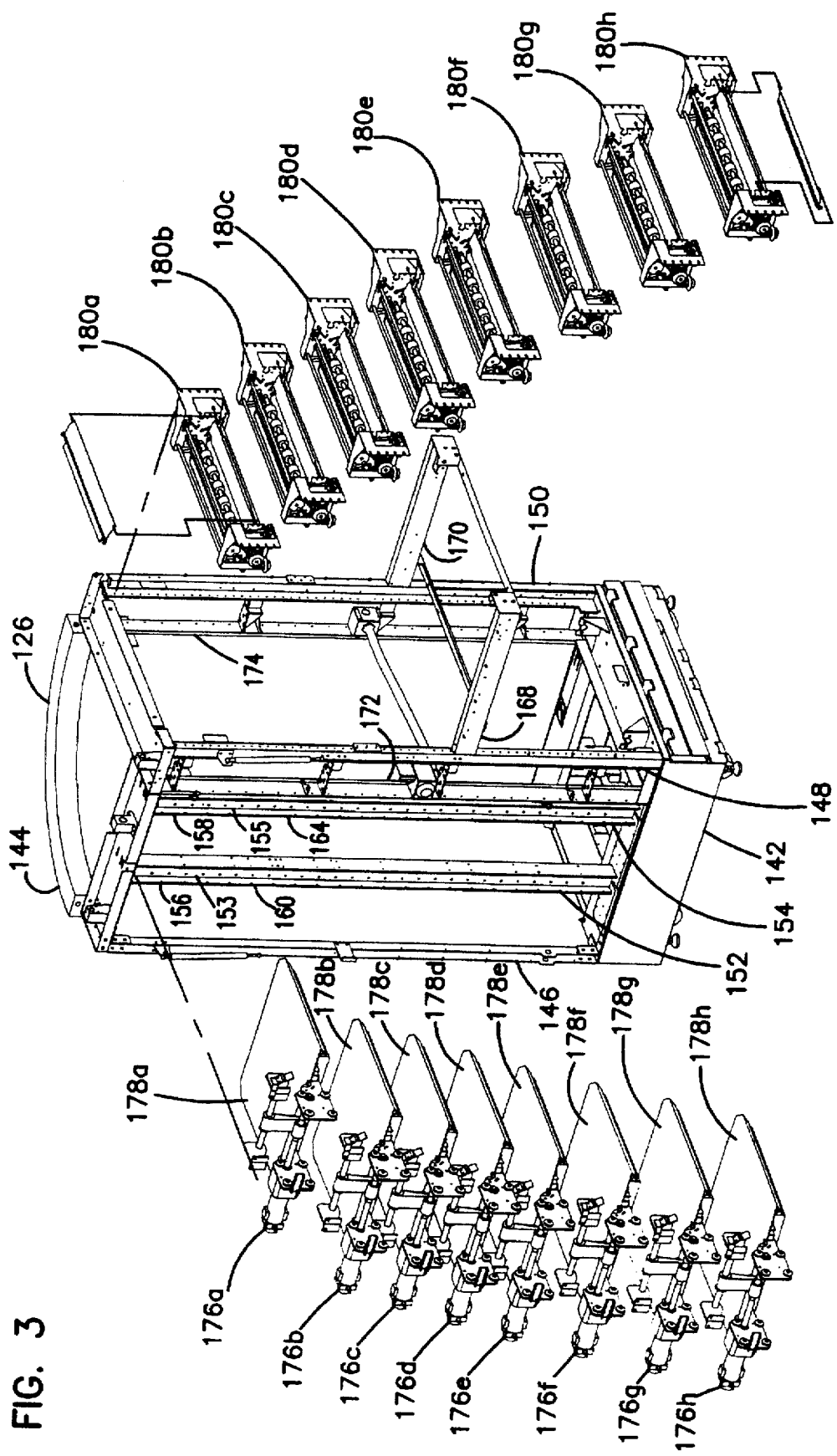
FIG. 3 is an illustration of a frame of the collator module shown in FIG. 1.

Referring now to FIG. 3, the collator 100 includes a frame 126 that provides a support structure. The frame has a base unit 142, a top unit 144, a first vertical support beam 146, a second vertical support beam 148, and a third vertical support beam 150. The first vertical support beam 146, second vertical support beam 148, and third vertical support beam 150 are connected between the base unit 142 and the top unit 144. The first vertical support beam 146 is proximate the rear portion 124 of the collator 100, the second vertical support beam 148 is proximate to a corner formed between the rear and side portions 122 and 124 of the collator 100, and the third vertical support beam 150 is proximate the side portion 122 of the collator 100.

First and second I beams 152 and 154 are positioned between the first and second vertical support beams 146 and 148 and are connected between the base unit 142 and the top unit 144. The first and second I beams 152 and 154 each have a flange 156 and 158, respectively. The flange 156 has first and second edges 160 and 162, each including a V-shaped profile. The flange 158 has first and second edges 164 and 166, also having V-shaped profiles. Flanges 156 and 158 form rails for the elevator assembly described in more detail below. Additionally, first and second I beams 152 and 154 have webs 153 and 155, respectively.

Elevator assemblies 176a–176h are mounted on both flange 160 of the first I beam 152 and flange 162 of the second I beams 154. Tray assemblies 178a–178h are connected to the elevator assemblies 176a–176h, respectively. The elevator assemblies 176a–176h and the tray assemblies 178a–178h are described in more detail below.

Pick mechanism assemblies 180a–180h are mounted on and extend between the second vertical support beam 148 and the third vertical support beam 150. Each pick mechanism 180a–180h cooperates with a corresponding elevator assembly 176a–176h, respectively, and a corresponding tray assembly 178a–178h, respectively. This cooperation is controlled to select the appropriate documents from the appropriate trays in a timely manner for presentation to the transporter. The pick mechanism assemblies 180a–180h are described in more detail below.

First and second horizontal beams 168 and 170 are connected to the second and third vertical support beams 146 and 148, respectively. The first and second horizontal beams 168 and 170 are substantially horizontal and project outward from the side portion 122 of the collator 100. The first and second brackets 172 and 174 are connected between the base unit 142 and the top unit 144. The first bracket 172 is positioned proximate the second vertical support beam 148, and the second bracket 174 is positioned proximate the third vertical support beam 150.

2. Tray and Elevator Assemblies

Figure 4:
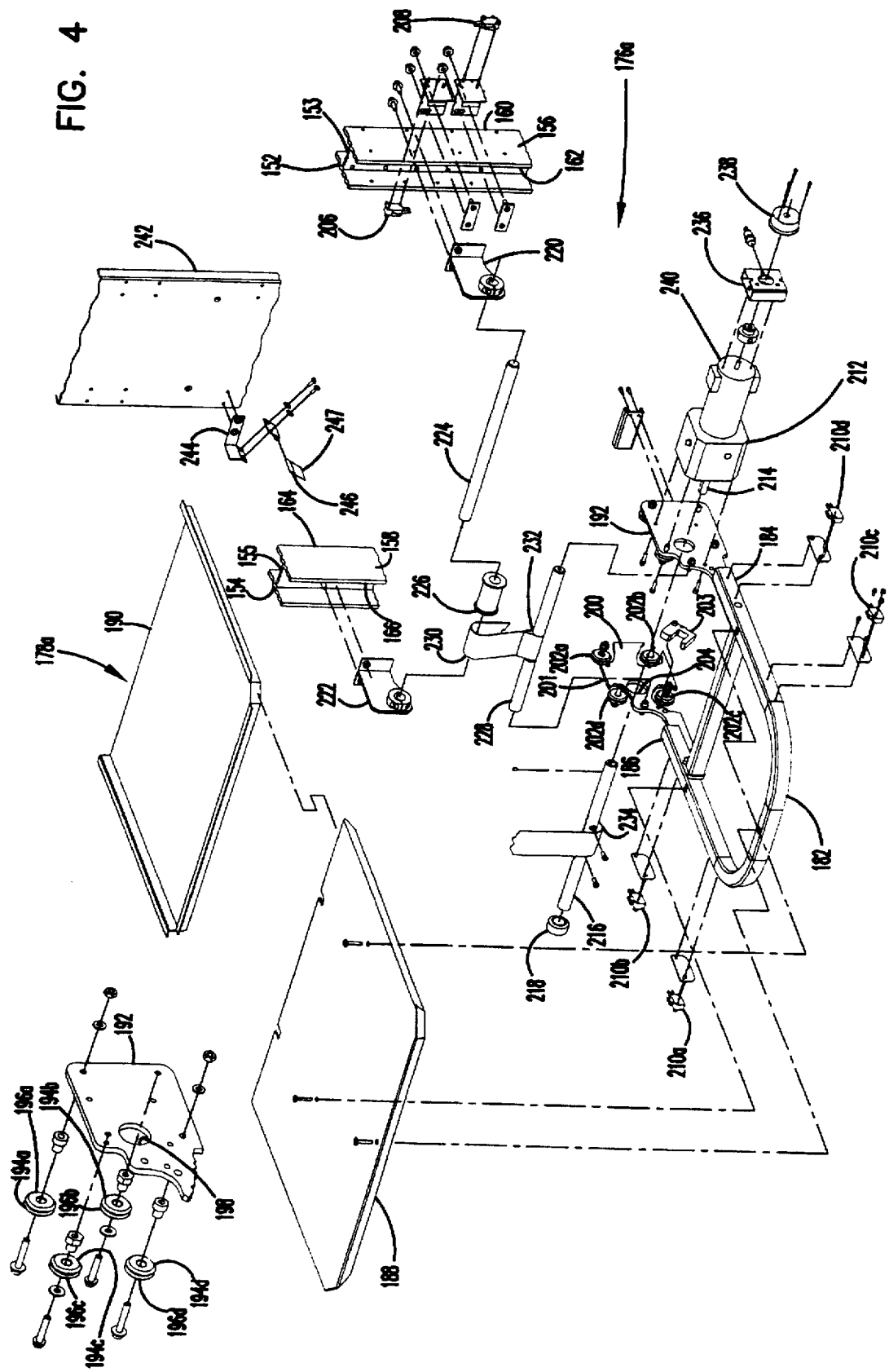
FIG. 4 is an illustration of a tray assembly and an elevator assembly that are components of the collator module shown in FIG. 1.

In FIG. 4, the tray assembly 178a is shown to includes a supporting frame 182, which has first and second posts 184 and 186. A safety interlock plate 188 is positioned on top of, and is connected to, the supporting frame 182. A paper tray 190 slideably engages the safety interlock tray 188. During use, the stack 130a is positioned on the paper tray 190. The operator can remove the paper tray 190 from the safety interlock plate 188 when replenishing the stack 130a.

The elevator assembly 176a includes a first support plate 192 to which a first post 184 of the supporting frame 182 is connected. The support plate 192 is substantially parallel to the flange 156 of the first I beam 152. Wheels 194a–194d are mounted on the support plate 192 and have rims 196a–196d, respectively. The rims 196a and 196b have a V-shaped groove that mate with the first V-shaped edge 160 of the flange 156. The rims 196c and 196d have a V-shaped groove that mate with the second V-shaped edge 162 of the flange 156.

Second support plate 200 is substantially similar to the first support plate 192 and has wheels 202a–202d that mate with the first and second edges 164 and 166 of the flange 158. The second post 186 of the supporting frame 182 is connected to the second support plate 200. One skilled in the art will appreciate that the flange 156 of the first I beam 152 and the flange 158 of the second I beam 154 provide a track along which the elevator assembly 176a raises and lowers the associated tray.

A paper sensor 203 is mounted on second support plate 200 and is positioned at approximately a 45° angle. The paper sensor 203 interfaces with the control system and has a light emitter such as a light emitting diode (LED) and a light-sensitive transducer. The LED will attempt to transmit light from the lower portion of the first side edge 134 of the stack 130a to the bottom (now shown) of the stack 130a.

The paper sensor 203 detects the presence or absence of sheets in the retainer 106a. The control system monitors a signal from the paper sensor 203 and uses this information to determine whether the stack 130a needs to be replenished. An advantage of this system is that the control system can quickly determine when the stack 130a is depleted without having to make several failed attempts to pick a sheet from the retainer 106a. The control system can then instruct the collator 100 to pick a sheet from a different retainer 106b–106h without delay.

Upper and lower limit switches 206 and 208 are mounted on the flange 156 of the first I beam 152. The upper limit switch 206 is mounted at a point above the elevator assembly 176a and the lower limit switch 208 is mounted below the elevator assembly 176a. Both limit switches 206 and 208 are proximate the first edge 160 of flange 156 so that they can be actuated by wheels 194a and 194b, respectively. Upper limit switch 206 is actuated if the elevator assembly 176a is raised too far, and lower limit switch 208 is actuated if the elevator assembly 176a is lowered too far. If either upper or lower limit switch 206 or 208 is actuated, the control system, which is communicatively coupled thereto, commands the elevator assembly 176a to stop moving.

Safety switches 210a–210d are operably connected to supporting frame 182 and positioned beneath safety interlock plate 188. One of the safety switches 210a, 210b, 210c, or 210d is actuated if elevator assemblies 176a and 176b are moved too close together and a foreign object is located between them. The control system will then stop the elevator assemblies 176a and 176b from being moved any closer together.

The drive system that raises and lowers elevator assembly 176a includes a motor 212 having a drive shaft 214 and an armature 240. Motor 212 is mounted on first support plate 192 and drive shaft 214 extends through a hole 198 of the first support plate 192. Drive shaft extension 216 is operably connected to drive shaft 214 and extends into a hole 204 of second support plate 200 and bushing 218.

First and second brackets 220 and 222 are operably connected to the webs 153 and 155, respectively, of first and second I beams 152 and 154, respectively. A first bar 224 is connected between first and second brackets 220 and 224. First and second brackets 220 and 222 and first bar 224 are positioned at a point above upper limit Switch 206. Pulley or reel 226 is mounted on first bar 224 and is approximately centered between first and second brackets 220 and 222. A second bar 228 is connected between first and second support plates 192 and 200.

A belt 230 has one end 232 operably connected to second bar 228 and an opposite end 234 operably connected to drive shaft extension 216. Belt 230 extends upward from the second bar 228, wraps around pulley 226, and then extends downward to drive shaft extension 216. The belt 230 may be implemented, for example, using a nylon mesh material.

In use, the motor 212 causes drive shaft extension 216 to rotate and reel in belt 230. As a result, elevator assembly 176a moves upward. The motor 212 is also controlled for reverse direction which causes drive shaft extension 216 to rotate in the opposite direction and let out belt 230. As a result, elevator assembly 176a moves downward.

Elevator motion encoder 236 and brake assembly 238 are operably connected to the armature 240 of motor 212 and interfaces with the control system. The elevator motion encoder 236 is used to sense how many rotations the motor armature has made. The control system uses this information to determine how far the elevator assembly 176a has traveled and its current level.

The brake assembly 238 is used to slow and stop rotation of the armature 240 and, hence, movement of the elevator assembly 176a. The brake assembly 238 is a fail safe electronic disk brake that remains in a locked position. Gearing between the brake assembly 238 and the motor 212 can be implemented, for example, with a 90 to 1 ratio that safely locks the tray assembly 178a in a fixed position if there is a power outage or a trip of a safety interlock. Consequently, the elevator assembly 176a is prevented from reeling out of control and creating damage.

Edge guide plate 242 is connected between the base unit 142 and the top unit 144 of frame 126. Edge guide 242 is positioned so that it is straddled by first and second support plates 192 and 200. The edge guide 242 helps to position the stack 130a in the retainer 106a and prevents the first side edge 134 of the stack 130a from getting caught in the mechanisms of the elevator assembly 176a.

Flange 244 is operably connected to edge guide 242 and extends over tray assembly 178a. Brush 246 is connected to flange 244 and extends downward. A lower edge 247 of brush 246 rests against the top sheet of the stack 130a. In this position, brush 246 helps to control the first side edge 134 and prevents undesired situations such as curling.

Elevator assemblies 176b–176h are substantially identical to elevator assembly 176a, which was described above. For purposes of brevity and clarity, these other elevator assemblies 176b–176h are not described in further detail.

3. Pick Mechanism Assembly

Figure 5:
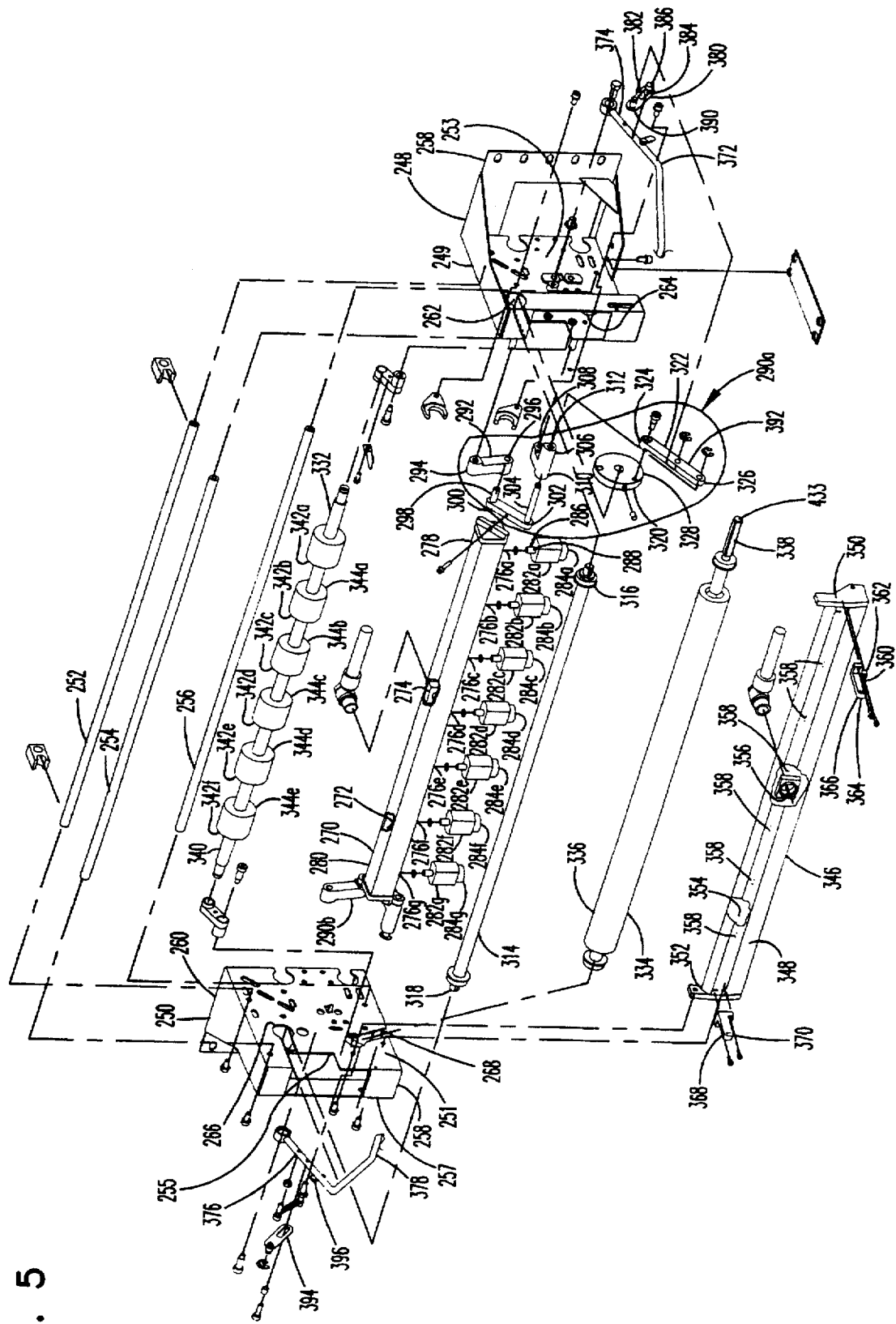
Figure 6:
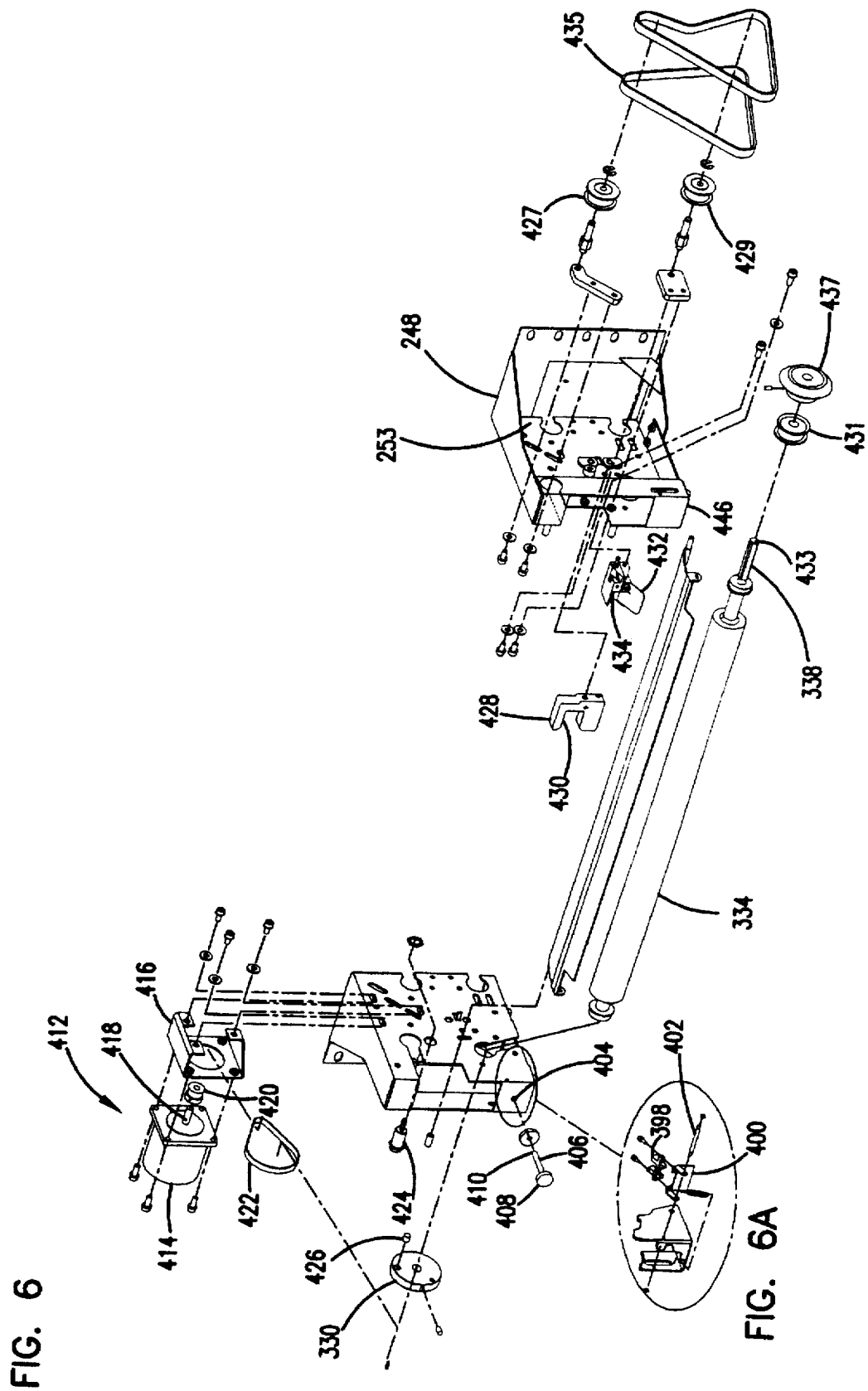

Referring now to FIGS. 5 and 6, pick mechanism assembly 180a includes first and second brackets 248 and 250, which are connected by rods 252, 254, and 256. First bracket 248 has an inside surface 249, an outside surface 253, a hole 262, a slot 264, and a mounting flange 258. Second bracket 250 has an inside surface 251, an outside surface 255, a hole 266, and a slot 268. Mounting flanges 258 and 260 are used to mount pick mechanism assembly 180a to second and third vertical beams 148 and 150, respectively, of frame 126. Second bracket 250 also has an edge 257 that is proximate tray assembly 178a and a flange 259 that projects outward from outside surface 255.

Manifold 270 is positioned between first and second brackets 248 and 250 and defines a passageway 272, a main port 270, and a plurality of periodically placed apertures 276a–276g. Manifold 270 has first and second ends 278 and 280. Suction foot 282a extends down from manifold 270 and has a lower end 284, an upper end 286, and a vertical passageway 288 that is open at both upper end 286 and lower end 284. The upper end 286 of the vertical passageway 288 is in fluid communication with aperture 276a.

Suction feet 282b–282g are substantially identical to suction foot 282a and have lower ends 284b–284g, respectively. Suction feet 282b–282g are also in fluid communication with apertures 276b–276g. A vacuum is formed at the lower ends 284a–284g of the suction feet 282a–282g, respectively, by withdrawing air from passageway 272 of manifold 270. The vacuum creates a force that attracts the top sheet from the stack 130a.

Air is withdrawn from passageway 272 via a vacuum distribution manifold that provides fluid communication between main port 272 and an air compressor. A valve and solenoid combination controls the flow of air from main port 272 to the vacuum distribution manifold. The vacuum distribution manifold, valve, and solenoid are conventional and, therefore, are not shown in the figures. Manifold 270 and suction feet 282a–282g form the primary mechanism for picking sheets from the stack 130a and feeding the picked sheets into the path of the present printing system. This action is described in more detail below.

Manifold 270 is operably connected to first and second brackets 248 and 250 by recirculating mechanisms 290a and 290b that cycles manifold 270 from a home position, to a position that is proximate the stack, and back to the home position. This cycle is called a picking cycle.

Recirculating mechanism 290a includes a first linkage 292 that has an upper end 294 rotatably connected to an inside surface 249 of first bracket 248 and a lower end 296 rotatably connected to an upper end 298 of a second linkage 300. A lower end 302 of second linkage 300 has a post 304 that projects through slot 264 of first bracket 248. First end 278 of manifold 270 is operably connected to second linkage 300 at a point between upper and lower ends 298 and 302. A third linkage 306 has a first end 308 rotatably connected to the inside surface 249 of first bracket 248 and a second end 310 that has a tube 312. Post 304 rotatably engages tube 312, which projects through slot 248.

A drive shaft 314, having first and second ends 316 and 318, extends between first and second brackets 248 and 250 such that the first end 316 projects through hole 262 of first bracket 248 and the second end 318 projects through a hole 266 of second bracket 250. First crank wheel 320 is positioned proximate the outside surface 253 of the first bracket 248 and is mounted on first end 316 of drive shaft 314. Fourth linkage 322 is positioned proximate an outside surface 253 of first bracket 248 and has first and second ends 324 and 326. First end 324 is rotatably connected to first crank wheel 320 at a point proximate the crank wheel's 320 circumferential edge 328. Second end 326 is rotatably connected to post 304.

Recirculating mechanism 240b is substantially similar to recirculating mechanism 290a and is operably connected between second end 280 of manifold 270 and second bracket 250. Recirculating mechanism 290b includes a second crank wheel 330, which is operably connected to second end 318 of drive shaft 314 and is positioned proximate an outside surface 255 of second bracket 250.

Upper and lower infeed rollers 332 and 334 form a roller assembly and extend between and are rotatably connected to first and second brackets 248 and 250. Additionally, upper and lower infeed rollers 332 and 334 are positioned so that they are proximate the leading edge 132 of the stack 130a. Lower roller bar 334 has a tubular pad 336 and a shaft 338 that extends through tubular pad 336. Upper roller bar 332 has a shaft 340 and a plurality of tubular pads 342a–342f that are spaced periodically along shaft 340. Tubular pads 342a–342f form gaps 344a–344e.

In the home position, manifold 270 and suction feet 282a–282g are positioned proximate shaft 338 of upper infeed roller 332 such that suction feet 282b–282f are positioned in gaps 344a–344b, suction foot 282a is positioned to the right of tubular pad 342a, and suction foot 282g is positioned to the left of tubular pad 342f.

During the picking cycle, the pick mechanism assembly 180a picks the top sheet from the stack 130a and feeds it between the upper roller 332 and the lower roller 334. When feeding a sheet, the manifold 270 and suction feet 282a–282g are in their home position. Picking a sheet is discussed in more detail below.

An air knife manifold 346 has a surface 348, one end 350 operably connected to first bracket 248, and an opposite end 235 operably connected to second bracket 250. Air knife manifold 346 is positioned below lower roller bar 334 and thus is also positioned proximate the leading edge 132 of the stack 130a.

Manifold 346 defines a passageway 354, main port 356, and a plurality of apertures 358 that extend from the passageway 354 to the surface 348. Manifold 346 forms an air knife. First tubular member or air knife post 360 is mounted proximate one end 350 of air knife manifold 346. First air knife post 360 defines a passageway 362 that is in fluid communication with passageway 354 of air knife manifold 346. First air knife post 360 also defines a side aperture 364 that extends from the passageway 362 to a surface 366. Second tubular member or air knife post 368 is substantially identical to first air knife post 360 and has a side aperture 370 that is in fluid communication with passageway 354 of air knife manifold 346.

The passage 354 of manifold 346 is pressurized by blowing air into the main port 356. In turn, the air exits the plurality of apertures 358 in the air knife manifold 346 and the side apertures 364 and 370 of the first and second air knife posts 360 and 368, respectively. The air exiting the plurality of apertures 358 blows against the leading edge 132 of the top sheets in the stack 130a. The air that exits the side apertures 364 and 370 blows on the first and second side edges 134 and 136, respectively, of the top sheets in the stack 130a. The air from the side apertures 364 and 370 blows on that portion of the first and second side edges 134 and 136, respectively, that is proximate to the leading edge 132.

Air is supplied to the main port 356 via an air distribution manifold that provides fluid communication between main port 356 and an air supply, which may be a compressor. A valve and solenoid combination controls the flow of air from the air distribution manifold to the main port 356. The solenoid is linked to the control system. The air distribution manifold, valve, and solenoid are conventional and thus are not shown in detail in the figures.

The air flow from the manifold 346 against the leading edge of the stack and from the first and second air knife posts 360 and 368 against the first and second side edges of the stack, respectively. The air fluffs or levitates at least the top sheet of the stack 130a. This levitation aids separation of the top sheet from the stack 130a during the picking cycle, which is discussed in more detail below.

Stack-height sensing bar 372 is a probe that has first and second end portions 374 and 376 and cross–member portion 378. First and second end portions 374 and 376 are rotatably connected to the outer surfaces 253 and 255, respectively, of first and second brackets 248 and 250, respectively. Cross member portion 378 extends between first and second end portions 374 and 376, so that the cross member portion 378 reaches across the width of the pick mechanism assembly 180a. Additionally, stack-height sensing bar 372 projects outward so that it can rest on a portion of the stack 130a that is not being levitated by the air knife manifold 346 and the first and second air knife posts 360 and 368.

First rocking linkage 380 defines a slot 382 at a first end 384 and is operatively connected to first end portion 374 by a pin 386 that passes through slot 382. A second end 390 of first rocking linkage 380 is rotatably connected to a mid portion 392 of fourth linkage 322 of recirculating mechanism 290a. Second rocking linkage 394 is similarly connected between second end portion 376 and recirculating mechanism 290b.

Referring now to FIGS. 5 and 6, a flag 396 is operably connected to second end portion 376 of stack height sensing bar 372. The flag 396 projects downward. An interrupt-type beam sensor 398 is mounted on a mounting member 400 that is pivotally connected to outside surface 255 of second bracket 250 by pin 402. Interrupt-type beam sensor 398 is positioned below the flag 396 and is communicatively connected to the control system.

Interrupt-type beam sensor 398 projects a beam of light to a light-sensitive detector and has normally closed circuit to the control system. As the stack 130a is depleted, the level of the stack height sensing bar 372 falls. When the stack height sensing bar 372 falls below a threshold level, the flag 396 drops into the path of the light beam and breaks the circuit to the control system. A break in the circuit to the control system indicates that the top level of the stack has fallen below a predetermined threshold level and that the tray assembly 178a needs to be raised.

Movement of the flag 396 is provided via a pivot mechanism involving a second bracket 250 having a flange 259. A threaded rod 406 has a head 408 and a tip 410. Threaded rod 406 extends through and engages threaded hole 404. Tip 410 engages mounting member 400. Twisting threaded rod 406 causes it to move in or out of the threaded hole 404. In turn, mounting member 400 pivots around pin 402. This pivoting action will adjust the relevant position between the interrupt-type sensor 398 and the flag 396.

A stepper motor drive system 412 provides motive power to the recirculating mechanisms 290a and 290b, which move the manifold 270 and suction feet 282a–282g through a picking cycle. Stepper motor 414 is mounted on motor bracket 416, which is connected to second bracket 250. Stepper motor 414 has a drive shaft 418 on which a drive wheel 420 is mounted. A belt 422 extends around drive wheel 420 and second crank wheel 330 of recirculating mechanism 290b.

As the stepper motor turns, belt 422 causes second crank wheel 330, drive shaft 314, and first crank wheel 320 to rotate. The rotating first and second crank wheels 320 and 330 cause recirculating mechanism 290a and 290b, respectively, to move the manifold 270 and suction feet 282a–282g through the picking cycle. During the picking cycle, the manifold 270 and the suction feet 282a–282g move from the home position, out over the stack 130a. The manifold 270 and the suction feet 282a–282g also move down until the lower ends 284a–284g of the suction feet 282a–282g are proximate the leading edge 132 of the top sheet in the stack 130a. The vacuum at the lower ends 284a–284g of suction feet 282a–282g, respectively, creates a force that attracts the leading edge 132 of the top sheet. As the picking cycle is completed, the manifold 270 and the suction feet 282a–282g return to the home position.

The attractive force caused by the vacuum and the movement of the manifold 270 and suction feet 282a–282g causes the top sheet to be separated from the stack 130a and move with the manifold 270 and suction feet 282a–282g as they complete the picking cycle. When the manifold 270 and the suction feet 282a–282g are returned to the home position, the leading edge of the sheet is inserted between the upper and lower infeed rollers 332 and 334, which are rotating. The upper and lower infeed rollers 332 and 334 then feed the sheet to the vertical track, which transports it to the first track assembly 112.

Determining when a picking cycle is completed involves the use of a hall-effect sensor 424 that is operably connected to second bracket 230, and a corresponding magnet 426 that is operably connected to second crank wheel 330. The hall-effect sensor 424 and the magnet 426 are proximate to one another when the second crank wheel 330 has positioned the manifold 270 and the suction feet 282a–282g in the home position. When the magnet 426 and the hall-effect sensor 424 are proximate one another, the hall-effect sensor 424 will send a signal to the control system. The control system uses this signal to identify when the manifold 270 and the suction feet 282a–282g are in the home position and to determine when a picking cycle is complete.

The system attempts to complete a picking cycle and feed a sheet of the print medium into the upper and lower infeed rollers 332 and 334 within a prescribed time frame. If the picking cycle is not completed with the prescribed period of time, the control system will generate an error and determine a recovery strategy.

Referring to FIG. 6, an upper sprocket 427 is connected to first bracket 248 and is positioned proximate to the outside surface 253. A lower sprocket 429 is also rotatably connected to first bracket 248 and is positioned proximate the outside surface 253 and below the upper sprocket 427. A drive sprocket 431 is mounted on an end 433 of shaft 338 of lower infeed roller 334 and is positioned proximate the outside surface 253 of first bracket 248. A drive belt 435 extends around drive sprocket 431, upper sprocket 427, and a lower sprocket 429. When lower infeed roller 334 rotates, the belt 435 causes the upper drive sprocket 427 and the lower drive sprocket 429 to rotate at the same rate as the lower infeed roller 334.

A cone gear 437 is also mounted on the end 433 of shaft 338 of lower infeed roller 334. Drive sprocket 431 is positioned between the cone gear 437 and the outside surface 253 of the first bracket 248. A drive assembly, which is described in more detail below, transmits motive power through the cone gear 437 and to the lower infeed roller 334, the drive sprocket 431, the upper sprocket 427, and the lower sprocket 429.

A paper sensor 428 is mounted on first bracket 248, defines a gap 430, and is positioned behind upper and lower infeed rollers 332 and 334 so that a picked sheet of print medium must pass through the gap 430 before it enters the vertical track. Paper sensor 428 signals the control system if it senses the presence of a sheet of print medium. If paper sensor 428 does not sense the presence of a sheet within the prescribed time frame identified above, the control system generates an error and determines a recovery strategy.

The manifold 270 and suction feet 282a–282g attempt, up to three times, to pick the top sheet and feed it into the upper and lower infeed roller 332 and 334. No error results if the top sheet is properly fed into the upper an lower infeed rollers 332 and 334 within three attempts. If the top sheet is not properly fed within three attempts, the control system generates a misfeed error and determines a recovery strategy.

Additional error detection is provided by a multi-item detector 432 that is also operably connected to first bracket 248. Multi-item detector 432 defines a gap 434, and is positioned behind upper and lower infeed rollers so that a picked sheet must also pass through the gap 434 before it enters the vertical track. Multi-item detector 432 determines whether a single sheet or multiple, overlapping sheets have been picked from the stack 130a and fed into the upper and lower infeed rollers 332 and 334. If multi-item detector 432 senses multiple, overlapping sheets, it sends a signal to the control system, which then generates an error and determines a recovery strategy. The multi-item detector 432 is discussed in more detail below.

The stepper motor 414 operates according to a predetermined acceleration and velocity profile that is controlled by an algorithm programmed in the control system. The predetermined acceleration and velocity profile is established in order to facilitate proper separation and picking of sheets from the stack 130a. Each type of print medium may require a different acceleration and velocity profile in order to optimize the separation and picking of separate sheets.

Additionally, it may be helpful to have different types of print media sheets within a single stack. An example of such an application might be printing check books that have self duplicating carbonless stubs. In this application, the stack 130a may have alternate sheets of check stock and sheets of lightweight self-contained carbonless paper. In order to accommodate different types of sheets within a single stack, the control system switches between different acceleration and velocity ramps.

Pick mechanism assemblies 180b–180h are substantially identical to pick mechanism assembly 180a. These are essentially the same, except for pick mechanism assembly 180e, which has a tandem driver sprocket 439. Tandem driver sprocket 439 is also rotatably connected to first bracket 248 and is in axial alignment with lower driver sprocket 429.

4. Cooperation Between Elevator Assembly and Pick Mechanism Assembly

Elevator assembly 176a and stack height sensing bar 372 of pick mechanism assembly 180a cooperate in order to maintain the top sheet of the stack 130a above a predetermined threshold level so that the top sheet can be picked and fed into the upper and lower infeed rollers 332 and 334. As discussed above, stack height sensing bar 372 is connected to first and second crank wheels 320 and 330 by first and second rocking linkages 380 and 394, respectively. First and second crank wheels 320 and 330 repeatedly move stack height sensing bar 372 up and down in sync with movement of the manifold 270 and the suction feet 282a–282g.

If the stack 130a blocks the fall of the stack height sensing bar 372, the flag 396 does not fall low enough to trigger the interrupt-type beam sensor 398. In this scenario, the top level of the stack 130a is still above the predetermined threshold level.

However, each sheet picked during the picking cycle lowers the top level of the stack 130a. Accordingly, the stack height sensing bar 372 falls a bit farther during each consecutive picking cycle. Eventually, the stack 130a is depleted enough that stack height sensing bar 372 falls below the threshold level and flag 396 triggers interrupt-type sensor 398, which then sends a signal to the control system.

The control system commands the motor 212 to raise the level of elevator assembly 176a until the top of the stack 130a returns to a level above the predetermined threshold level. The control system determines that the top of the stack 130a has returned to an appropriate level when the flat 396 moves out of the beam in the interrupt-type beam sensor 398. The control system then stops raising the elevator assembly 176a.

Adjusting the relative position between the interrupt-type sensor 398 and the flag 396 changes the threshold level at which the stack height sensing bar 372 will cause the flag 396 to trigger the interrupt-type sensor 398. In turn, this adjustment changes the predetermined level of the top sheet of the stack 130a. The predetermined level is adjusted when the top sheet of the stack is laying flat, not when it is being levitated.

Adjusting the top level of the stack 130a allows the operator to accommodate different paper and humidity conditions that might cause up curl or down curl of the paper edges, tightly nested perforations, and different stock weights. Lightweight stocks tend to levitate under influence of the air knife manifold 346 and first and second air knife posts 360 and 368 more than heavier stocks. Thus, an operator may want to set the top level of a stack of lightweight paper lower than the level of a stack that includes heavier paper.

Elevator assemblies 176b–176h cooperate with their corresponding pick mechanism assemblies 180b–180h, respectively, in substantially the same manner elevator assembly 176a and pick mechanism assembly 180a cooperate.

5. Front Edge Guide

Figure 7:
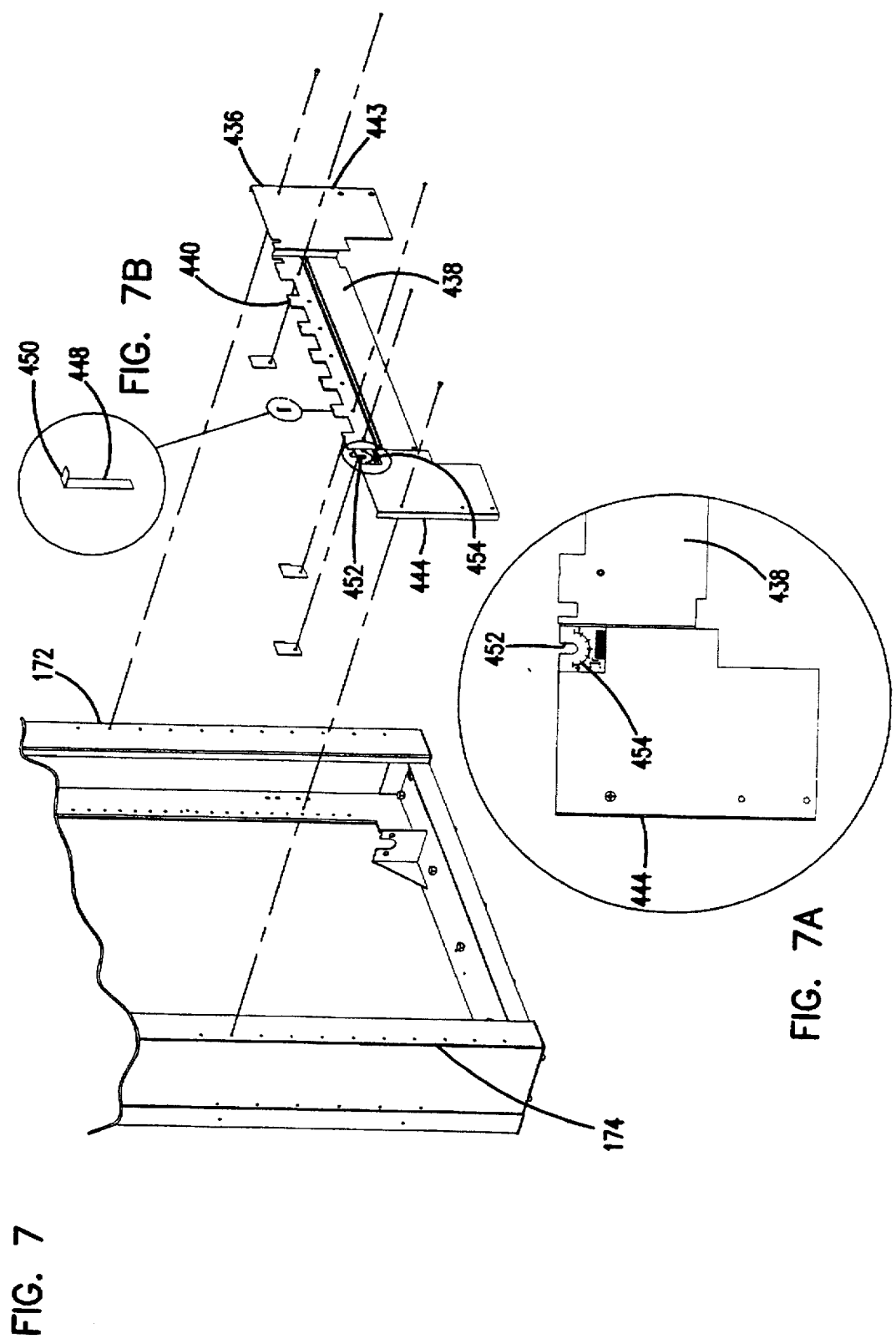

Referring to FIG. 7, front edge guide 436 is a plate having a face 438, top edge 440, a first end 443 connected to first bracket 172 of frame 126, and a second end 444 connected to second bracket 174 of frame 126. Front edge guide 436 is positioned so that face 438 is proximate the leading edge 132 of the stack 130a and top edge 444 is proximate a lower portion 446 of the pick mechanism assembly 180a.

A plurality of separator fingers 448 are connected to the plate at periodic intervals and project upward. As a result, separator fingers 448 are proximate the leading edge 132 of the stack 130a. Additionally, separator fingers 448 have a top portion 450 that is folded over. Top portions 450 are substantially horizontal and extend over the leading edge 132 of the stack 130a. The top portions 450 of the separator fingers 448 provide a fixed upper limit of sheet travel within the retainer 106a that prevents the top sheets of the stack 130a from levitating too high when air is injected into the stack 130a.

Additionally, front edge guide 436 has a slot 452 proximate the second end 444. When front edge guide 436 is mounted on first and second brackets 172 and 174, the threaded rod 406 and head 408 project through the slot 452. As discussed above, the threaded rod 406 is for adjusting the top level of the stack 130a stored in the retainers 130a.

Indices 454 are marked on the front edge guide 136 proximate the slot 452. Head 408 has a corresponding mark. The relative level of the top of the stack 130a can be determined by examining the position of the mark on head 408 relative to the indices 454 marked on front edge guide 436.

Each pick mechanism assembly 180b–180h has an associated front edge guide (not shown) that is substantially similar to front edge guide 436.

6. Multi-Item Detector

Figure 8:
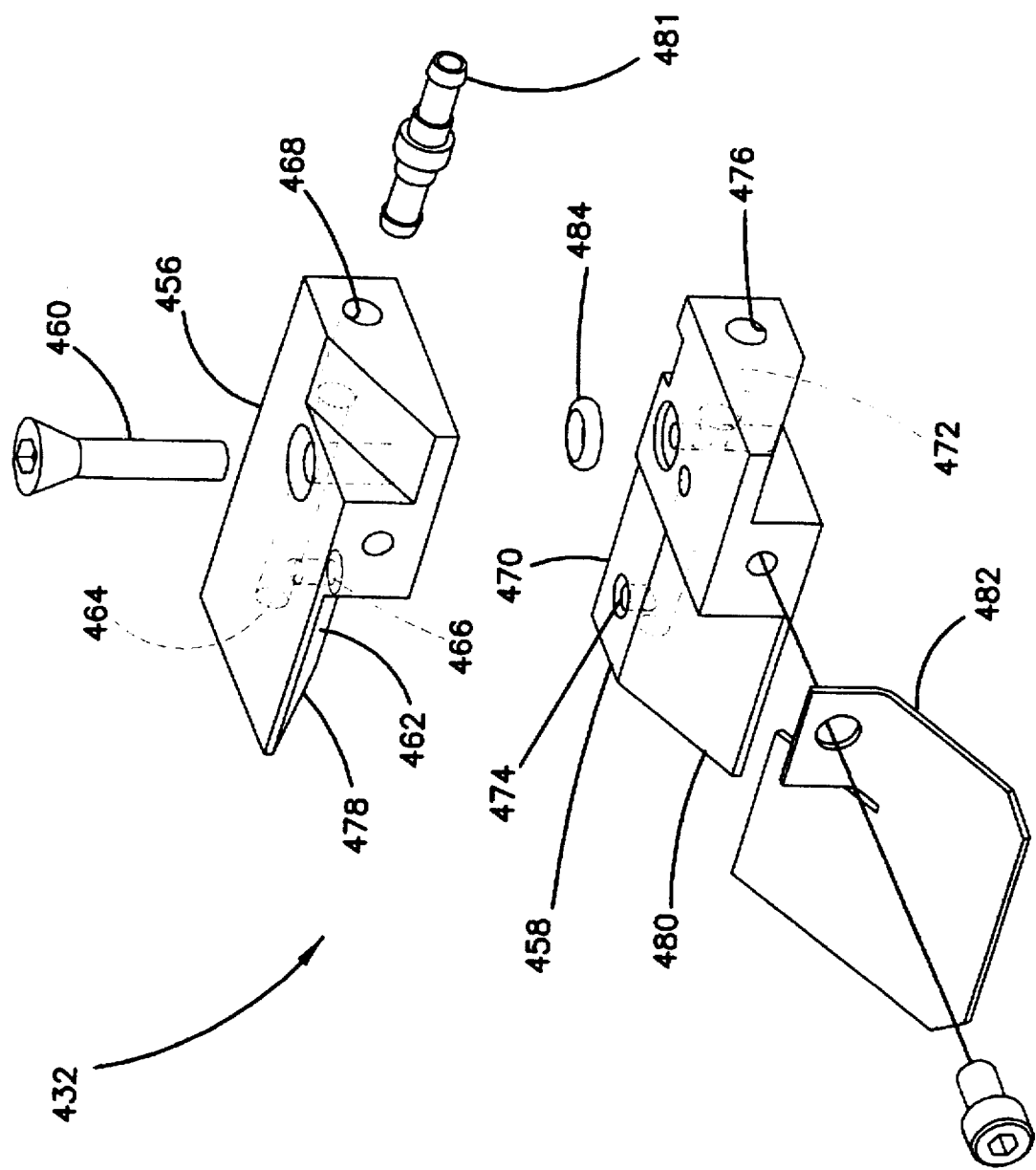
FIG. 8 is an illustration of a multi-item detector that is a component of the pick mechanism assembly shown in FIGS. 5 and 6.

Referring now to FIG. 8, multi-item detector 432 has an upper member 456 and a lower member 458 that are connected by countersunk screw 460. Upper member 458 defines a lower or first surface 462, a first passageway 464, an upper or first aperture 466 that extends from the lower surface 462 to the first passageway 464, and a first port 468 that is open to the first passageway 464. Lower member 456 defines an upper or second surface 470, a second passageway 472, a lower or second aperture 474 that extends from the upper surface 470 to the second passageway 472, and a second port 476 that is open to the second passageway 472.

Upper and lower surfaces 470 and 462 define gap 432, through which the sheet passes as it is fed from the upper and lower infeed rollers 332 and 534 to the vertical track. First and second apertures 466 and 474 are on oppositely disposed sides of the gap 432 and face one another.

Additionally, first and second ports 468 and 476 are in fluid communication with a vacuum assembly. The vacuum assembly includes a pressure-differential switch 477 that is in fluid communication with the vacuum-distribution manifold, described above, via second hose 481. A valve and solenoid combination (not shown) controls the flow of air between the pressure differential switch and the vacuum distribution manifold. The valve, solenoid, and vacuum distribution manifold are conventional.

Additionally, both upper member and lower members 456 and 458 have first and second leading faces 478 and 480, respectively. Leading faces 478 and 480 are beveled and cooperate in order to guide a moving sheet into the gap 432. Plate 482 is connected to the first leading face 480 of the lower member 458 in order to assist guidance of a sheet having a curled edge.

Upper and lower members 456 and 458 can be connected by a countersunk screw 460 that passes through first and second passageways 464 and 472. An O-ring 484 circumscribes countersunk screw 460 and provides a seal between the countersunk screw 460 and the upper member 456 and also between the countersunk screw 460 and the lower member 458. O-ring 484 prevents air from passing around countersunk screw 460 and into the first and second passageways 464 and 472.

In operation, the vacuum manifold withdraws air from first and second passageways 464 and 472 via the second hose 481, pressure differential switch 477, and first hose 479. Withdrawing air from first and second passageways 464 and 472 causes a vacuum adjacent to first and second apertures 466 and 474, respectively. If a single sheet is transported through gap 432, it will be drawn toward either the first or the second apertures 466 or 474 and block only that aperture. The vacuum differential switch 477 is not actuated in this scenario. If two sheets overlap and enter the gap 432 together, the vacuums cause the sheets to separate and block both the first and the second apertures 466 and 474. Blocking both first and second apertures 466 and 474 causes the pressure differential switch 477 to be actuated. The actuated pressure differential switch 477 sends a signal to the control system, which then generates an error and determines a recovery scheme.

7. Paper Sensor

Figure 9:
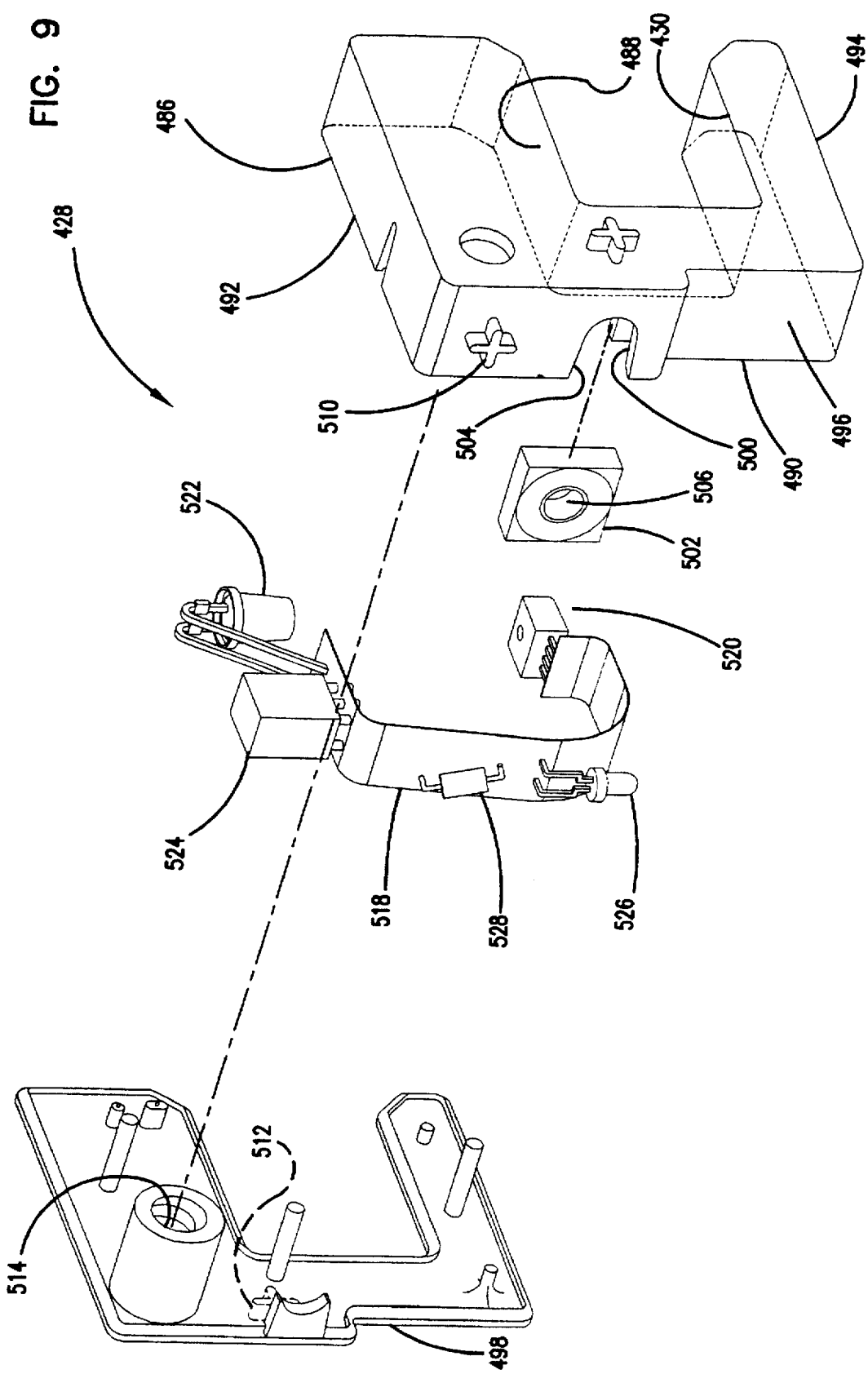
FIGS. 9 and 10 show a paper sensor that is a component of the pick mechanism assembly shown in FIGS. 5 and 6.
Figure 10:
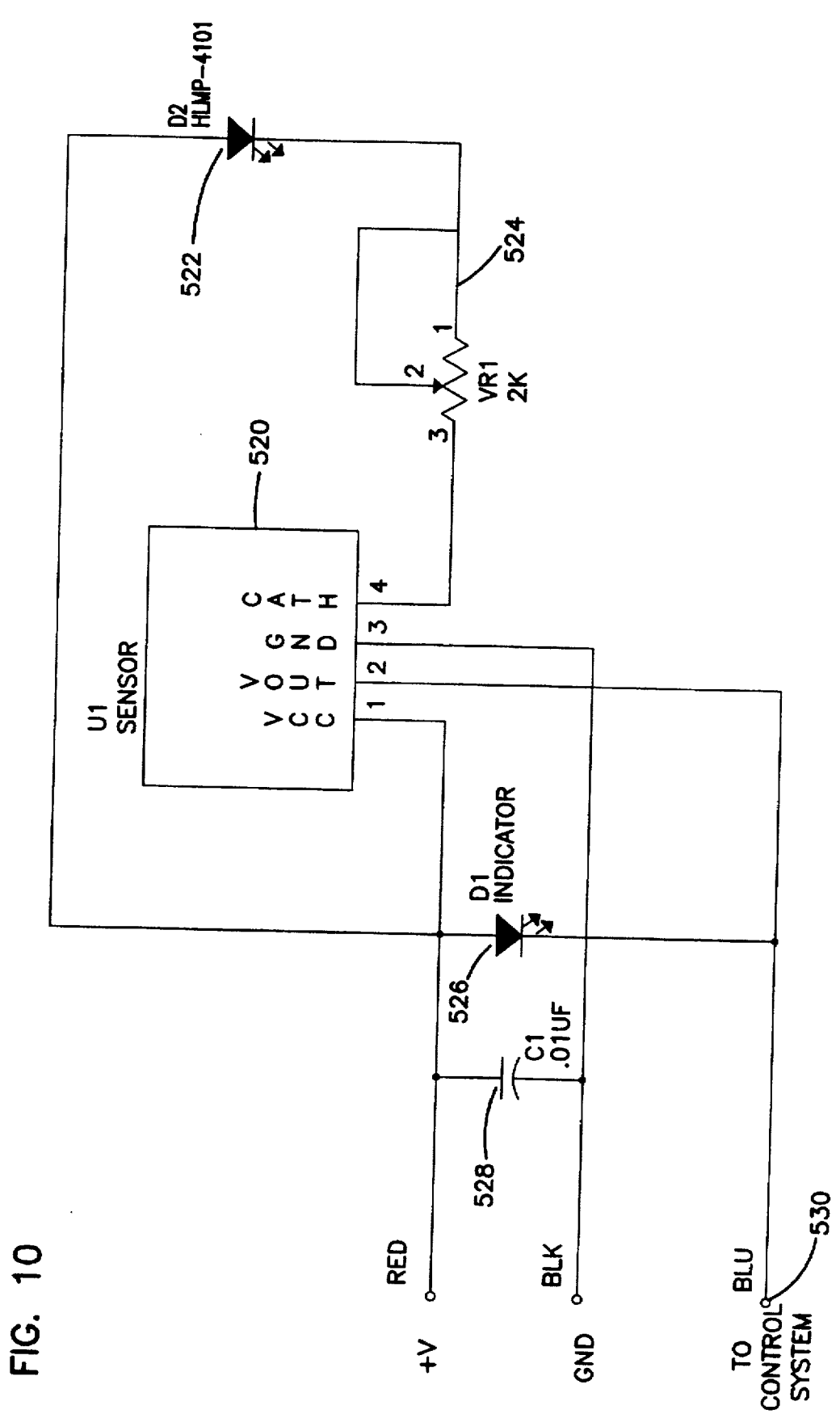

Referring to FIGS. 9 and 10, the paper sensor 428 includes housing 486 that defines a cavity 488 and is molded from clear LEXSAN brand material. Housing 486 has a rear portion 490, an upper portion, and a lower portion 492. Rear portion 490 has a face 496. Upper and lower portions 492 and 494 define the gap 430 through which sheets can pass. A cover 498 is operably connected to housing 486 and seals the cavity 488. Cover 498 can be sonically welded to housing 486.

Housing 486 also defines a recess 500 that receives a square nut 502 and a slot 504 that exposes the threaded hole 506 of square nut 508. Cover 498 secures square nut 502 in the recess 500. Alternatively, the paper sensor 428 is mounted by mating square nut 502 with an appropriately sized threaded post or bolt. For example, bracket 248 of pick mechanism assembly 180a might have a projecting threaded post for mounting paper sensor 428. Cover 498 and housing 486 also define a bolt passage 514 through which a mounting bolt can pass.

Additionally, housing 486 has a first protrusion 510 that projects from face 496 of rear portion 490. A second protrusion 512 may project from cover 498. Either first or second protrusion 510 or 512 can mate with a slot defined in the structure on which paper sensor 428 is mounted. Mating either first or second protrusions 510 or 512 will prevent the paper sensor 428 from rotating and moving out of alignment with the path.

Referring to FIGS. 9 and 10, a light-sensitive sensor 520, an emitter LED 522, a potentiometer 524, an indicator LED 526, and a capacitor 528 are mounted on a flexible circuit board 518 that is positioned in cavity 488 of housing 486. Emitter LED 522 is positioned in the upper portion 494 of the housing 486 and the light-sensitive sensor 520 is positioned in the lower portion 494 of the housing 486.

The light-sensitive sensor 520 is an intelligent signal processing sensor to which the emitter LED 522 is slaved. The light-sensitive sensor 520 provides a pulsed power signal to the slaved emitter LED 522, which emits a signature in the form of a step wave function. Emitter LED transmits the signature across gap 430. The light-sensitive sensor 520 is sensitive to the signature of the emitter LED 522, but has a low sensitivity to a continuous wave of light. The light-sensitive sensor 520 thus has a low sensitivity to ambient light conditions including bright lights. A signal output 530 is operably connected to the control system and provides a signal to the control system whenever light-sensitive sensor 520 does not detect the signature from the emitter LED 522. The light-sensitive sensor 520 can be implemented using a light modulation photo integrated circuit, Model No. S4282, manufactured by Hamamatsu Corp., of Japan.

The potentiometer 524 sets the sensitivity between the emitter LED 522 and the light-sensitive sensor 520. If multiple paper sensors 428 are used, the potentiometer 524 can be adjusted to standardize the response of all the paper sensors 428. This adjustment enables accommodation of lot differentials for the light-sensitive sensors 520 and emitter LED 522.

Indicator LED 526 is visible through housing 486 and provides a visual mimic of the light-sensitive sensor 520 condition for diagnostic purposes. When working properly, indicator LED 526 emits a visible light when light-sensitive sensor 520 detects the signature emission from emitter LED 522. Indicator LED 526 does not emit a visible light when light-sensitive sensor 520 does not detect the signature emission from emitter LED 522. Thus, a technician can test the paper sensor 428 by manually cycling light-sensitive sensor 520 on and off and observing indicator LED 526. The light-sensitive sensor 520 can be cycled by blocking it with an opaque object such as a sheet of paper.

Paper sensor 203 is substantially similar to paper sensor 428 and is not described in detail for purposes of brevity and clarity.

8. Vertical Track

Figure 11:
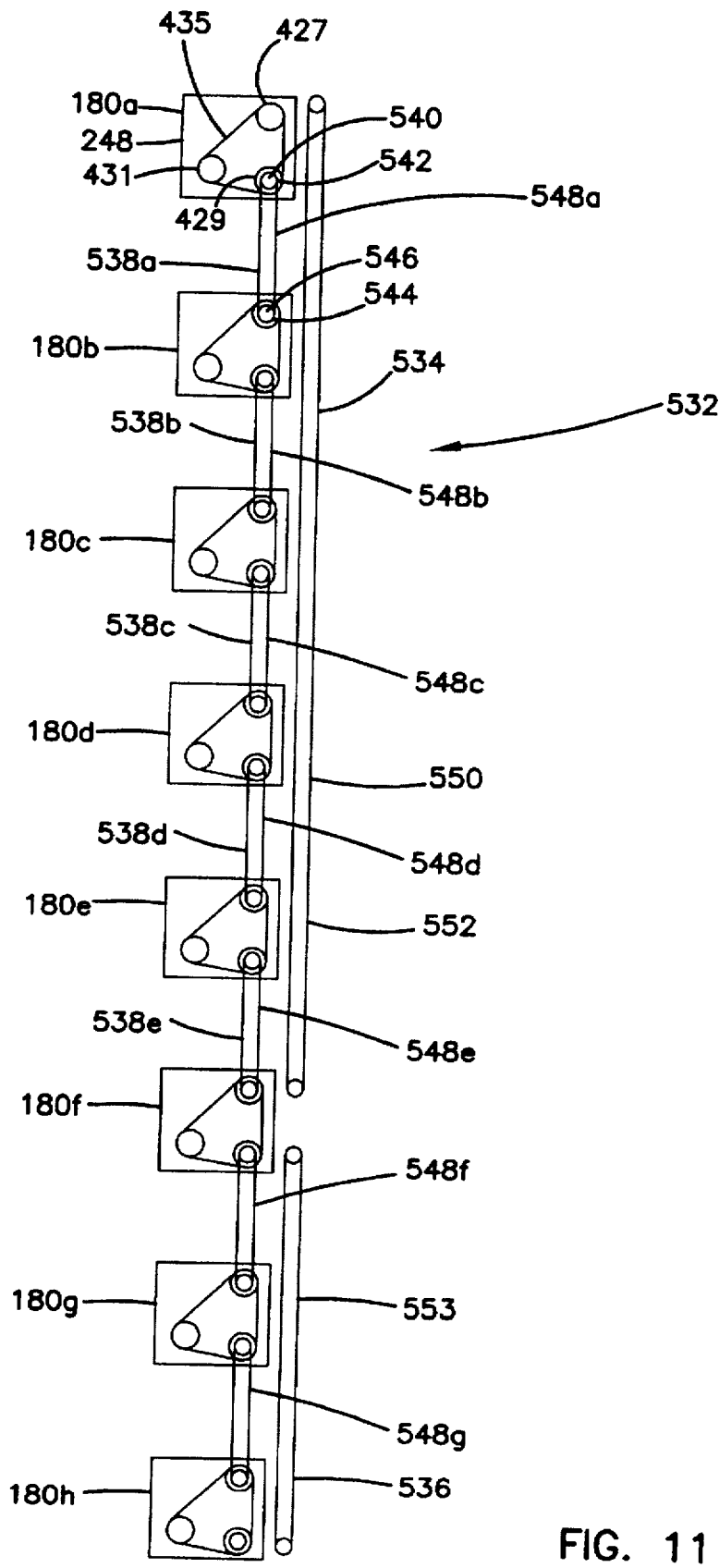
FIG. 11 shows a conveyor system for a vertical paper track that is a component of the collator module shown in FIG. 1.

Referring to FIG. 11, vertical track 532 is a feed assembly having an upper portion 534 and a lower portion 536. An output port is formed between the upper portion 534 and the lower portion 536. Upper portion 534 is substantially vertical and positioned above the level of the first track assembly 112 so that it transports sheets from the upper retainers 106a–106e to the first track assembly 112. Lower portion 536 is substantially vertical and positioned below the level of the first track assembly 112 so that it transports sheets from the lower retainers 106g and 106h to the first track assembly 112.

Sheets from retainer 106f are fed directly into first track assembly 112. This substantially vertical configuration has several advantages. For example, stacking the retainers 106a–106h on top of each other minimizes the foot print of the collator 100 and saves floor space. Another advantage is that the average distance between the retainers 106a–106h and the first track assembly is substantially minimized. As a result, the recovery strategy for error conditions is optimized, which minimizes both waste of the sheets and man hours required for correcting jams.

Upper portion 534 has five inner conveyor assemblies 538a–538e that cooperate with pick mechanism assemblies 180a180f. Inner conveyor assembly 538a is connected between pick mechanism assembly 180a and 180b; inner conveyor assembly 538b is connected between pick mechanism assemblies 180b and 180c; inner conveyor assembly 538c is connected between pick mechanism assemblies 180c and 180d; inner conveyor assembly 538d is connected between pick mechanism assemblies 180d and 180e; and inner conveyor assembly 538e is connected between pick mechanism assemblies 180e and 180f.

Inner conveyor 538a has an upper shaft 540 that is rotatably connected between the first and second brackets 248 and 250 of pick mechanism assembly 188a. Upper shaft 540 also has an end 542 on which lower sprocket 429 of pick mechanism 180a is mounted. Inner conveyor 538a also has a lower shaft 544 that is rotatably connected between the first and second brackets 248 and 250 of pick mechanism assembly 180b. Lower shaft 544 has an end 546 on which upper sprocket 427 of pick mechanism assembly 180b is mounted. A belt 548a extends around upper shaft 540 and lower shaft 544.

The inner conveyor assemblies 538b through 538e are substantially similar to inner conveyor assembly 538a and are similarly mounted between pick mechanism assemblies 180b and 180c, 180c and 180d, 180d and 180e and 180e and 180f, respectively. An outer conveyor assembly 550 extends from a position adjacent to pick mechanism 180a and pick mechanism assembly 180f and includes a belt 552 that fictionally engages the belts of inner conveyor assemblies 538a–538e.

Lower portion 536 is substantially similar to upper portion 534 and cooperates with pick mechanism assemblies 180f–180h to transport sheets from retainers 180g and 180h to first track assembly 112.

9. Drive Assembly

Figure 12:
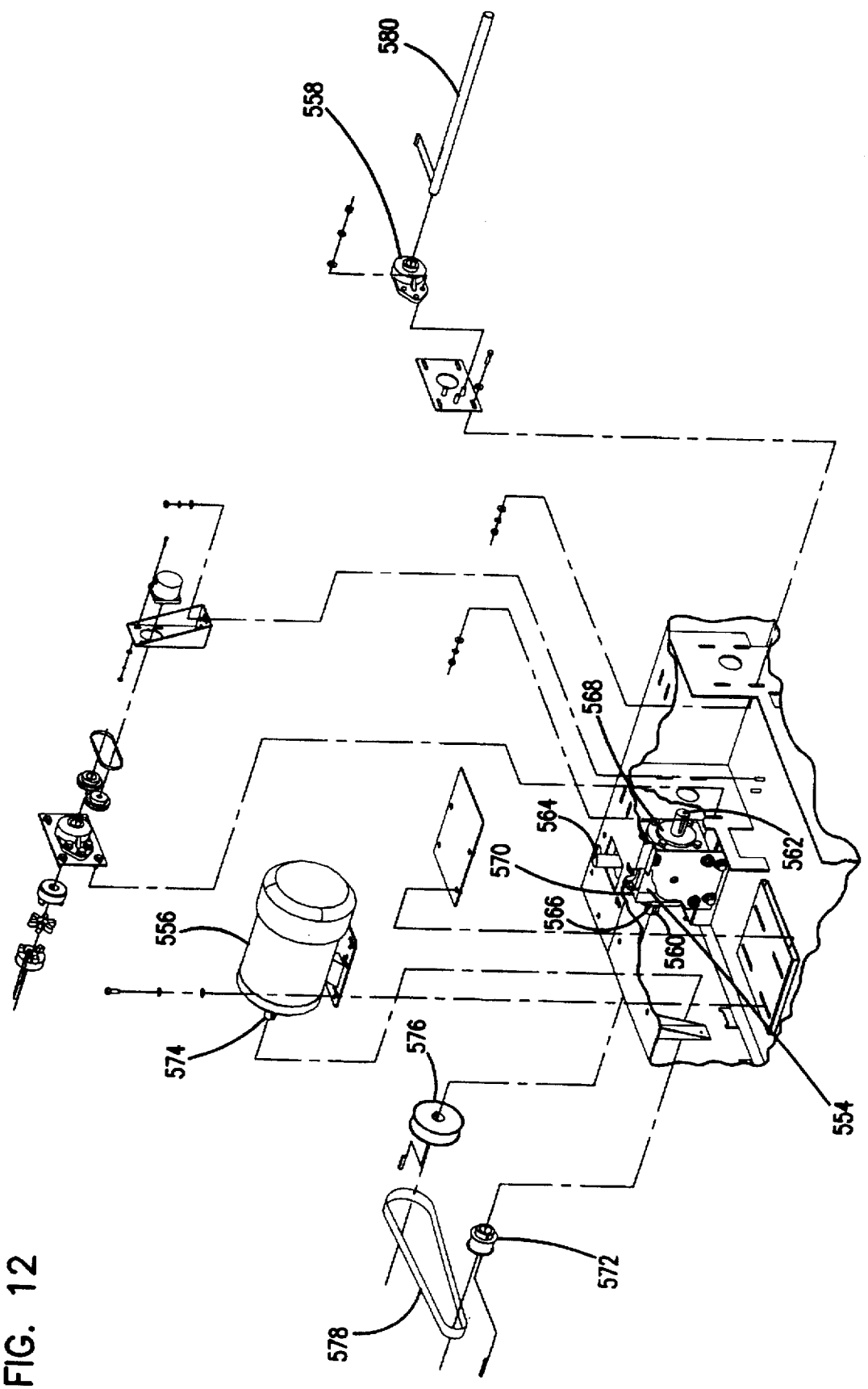
FIGS. 12 and 13 show a drive assembly for the collator module shown in FIG. 1.
Figure 13:
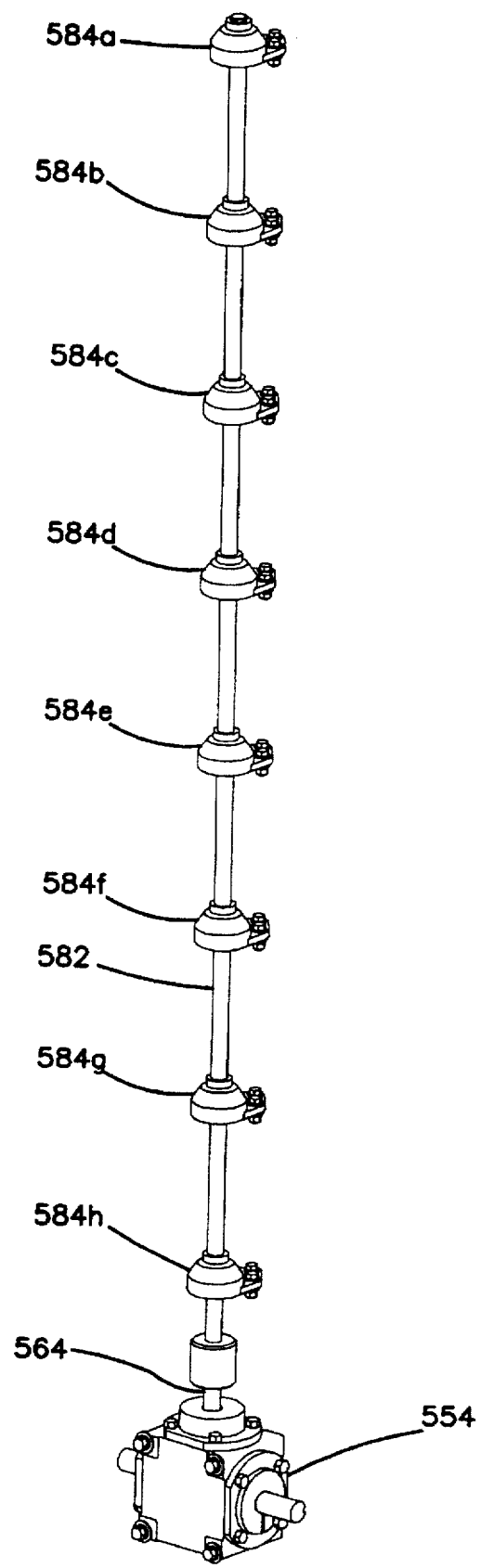

Referring to FIGS. 12 and 13, a drive assembly includes a gear box 554, a track motor 556, and a track encoder 558. The gear box 554 has first, second, and third shafts 560, 562, and 564. First and second shafts 560 and 562 project from oppositely disposed sides 566 and 568 of the gear box 554. The third shaft 564 projects upward from the top 570 of the gear box 554 and is substantially vertical. First, second, and third shafts 560, 562, and 564 are related such that rotating the first shaft 560 will transmit the motion to the second and third shafts 562 and 564.

A drive sprocket 572 is mounted on motor shaft 534 of track motor 556. Additionally, a pulley 576 is mounted on first shaft 560. A drive belt 578 extends around drive sprocket 572 and pulley 576. Track motor 556 is controlled by the control system and provides motive force for rotating first shaft 560, second shaft 562, and third shaft 564 of gear box 554.

Encoder rod 580 is connected to the second shaft 562 and extends through encoder 581. When track motor 556 rotates, it drives the first shaft 560 of gear box 554, which transmits the rotational force to the second shaft 562 and third shaft 564. In turn, the second shaft 562 causes the encoder 580 rod to rotate. The encoder 581 senses rotation of the encoder rod 580 and transmits a signal to the control system for each complete rotation made by the encoder rod 580. Each signal is a pulse that is termed a "tick". One skilled in the art will realize that each rotation of the encoder rod 580 corresponds to a complete rotation of the third shaft 564.

A vertical drive shaft 582 is connected to third shaft 564 of gear box 554. Vertical drive shaft 582 is adjacent to the pick mechanism assemblies 180a–180g and extends up to a position proximate top unit 144 of frame 126. A plurality of driving cone gears 584a–584h are intermittently positioned along the vertical drive shaft 582. Driving cone year 584a mates with cone gear 437 of pick mechanism assembly 180a. Similarly, driving cone gears 584b–584h mate with the cone gear 437 of pick mechanism assemblies 180b–180h.

Referring now to FIGS. 11, 12, and 13, vertical drive shaft transmits motive power from track motor 556 to lower infeed roller 334. In turn, drive sprocket 431 transmits the force to upper and lower sprockets 427 and 429, which causes the belts 548a–548g of inner conveyor assemblies 538a–538g, respectively, to rotate outer belts 552 and 553.

As a result, the vertical track 532 and the upper and lower infeed rollers 332 and 334 are all driven by track motor 556 and move in sync. An advantage of this interconnectivity is that the control system can use the ticks from track encoder 558 to measure the amount of movement by the initial track 532 and the upper and lower infeed rollers 332 and 334. In turn, the control system determines the position that a picked sheet should be located. The control system uses this information to increase accuracy of the error detection and error correction.

10. Adjustable Edge Guide

Figure 14:
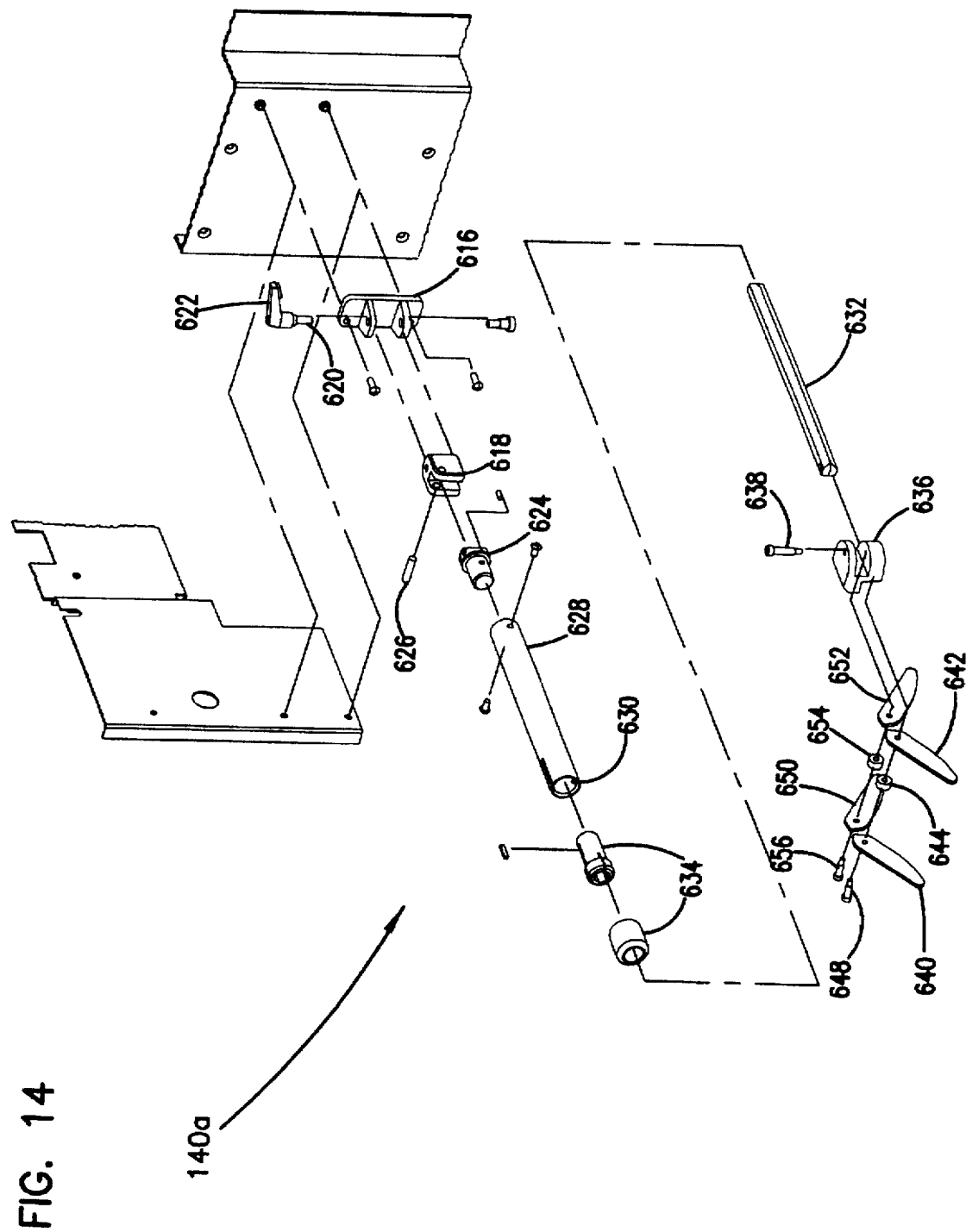
FIG. 14 is an illustration of an adjustable edge guide that is a component of the collator module shown in FIG. 1.

Referring now to FIG. 14, adjustable edge guide 140a has a base 616 for mounting on the collator 100. A swivel joint 618 is operably connected to base 616 and was a vertical locking pin 620, which includes a lever 622. An operator can use lever 622 to twist and lock locking pin 620, which prevents the adjustable edge guide 140a from pivoting from side to side.

A coupling member 624 is operably connected to swivel joint 618 by horizontal pin 626. Tube 628 is operably connected to coupling member 624 and has channel 600 that was a non-circular profile. For example, the profile of channel 600 may be trapezoidal. However, other conventional profiles can also be used to configure channel 630. As a safety feature, horizontal pin 626 does not lock so that tube 628 can pivot up and down.

Allowing the adjustable edge guide 140a to pivot up and down prevents an object located in retainer 106a from being pinched between the adjustable edge guide 140a and either the tray assembly 178a or the top unit 144 of frame 126. Damage to the adjustable edge guide 140a is also prevented.

Shaft 632 slideably engages channel 630 and has a profile that is similar to the profile of the channel 630. Having a trapezoidal profile for channel 630 and a mating profile for shaft 632 prevents shaft 632 from rotating. Tube 628 and shaft 632 form a telescoping member.

A collar chuck 634 selectively secures shaft 632 in its position relative to tube 628. An advantage of the shaft 632 and channel 630 combination is that the shaft 632 can be moved into or out of channel 630 in order to accommodate different sizes of print media.

A pivoting member 636 is connected to shaft 632 by vertical pin 638. A flange arrangement has first and second flanges 640 and 642, which are substantially parallel to one another and are spaced by bushing 644. First and second flanges 640 and 642 are connected to pivoting member 636 with pin 648 and can pivot around pin 648. Another flange arrangement has third and fourth flanges 650 and 652, which are substantially parallel to one another and are spaced by bushing 654. Second set of flanges 650 and 652 are operably connected to pivoting member 636 with pin 656 and can pivot around pin 656. Pivoting member 636 permits the flange arrangements to pivot horizontally.

Adjustable edge guides 140b–140p are substantially identical to adjustable edge guide 140a. The other adjustable edge guides are not discussed in detail for purposes of brevity and clarity.

As discussed above, each retainer has two adjustable edge guides 140a–140p, which assist control of the print media. In retainer 106a, for example, adjustable edge guide 140a is positioned so that first, second, third, and fourth flanges 640, 642, 650, and 652 are abutting second side edge 136 of the stack 130a. If the paper stock is heavy, first and third flanges 640 and 650 are placed adjacent the second side edge 136 of the stack 130a such that they are in contact with at least the top sheets. Second and fourth flanges 642 and 652 do not contact the stack 130a. In this position, the adjustable edge guide 140a provides control of the sheets as they are being picked and fed into the upper and lower infeed rollers.

If the sheet is light weight, first and third flanges 640 and 650 is pivoted upward around pins 648 and 656, respectively, so that they rest on top of the stack 130a. Second and fourth flanges 642 and 652 are then placed in contact with the second side edge 136 of the stack 130a. In this position, the adjustable edge guide 140a provides a controlled amount of drag along the top of the stack 130a and provides better control for feeding into the upper and lower infeed rollers 332 and 334.

Adjustable edge guide 140b is substantially similar to adjustable edge guide 140a and can be similarly positioned against the rear edge 138 of the stack 130a. The other adjustable edge guides 140c–140p also operate in a substantially similar manner to adjustable edge guide 140a.

In order to replenish the stack 130a in retainer 130a, the operator loosens the locking pin 620 and pivot the adjustable edge guide 140a to the side. In this position, the adjustable edge guide 140a does not block the retainer 176a. Adjustable edge guide 140b can be pivoted in a similar manner. Print media sheets can then be resupplied to the retainer. After the sheets are resupplied, the adjustable edge guides 140a and 140b can be returned to one of the positions described above. One skilled in the art will realize that adjustable edge guides 140c–140p pivot in a substantially similar manner to clear their respective retainers 106b–106g.

11. Modularity

In the collator 100 described above, retainers 106a–106d have a 500-sheet capacity and retainers 106e–106h have a 1,000-sheet capacity. In this configuration, the collator 100 has an overall capacity of 6,000 sheets. One skilled in the art will realize that the collator 100 can have different configurations of retainers, which will affect its overall capacity. For example, the collator might include four retainers that have a 3,000-sheet capacity. In this configuration, the overall capacity of the collator is 12,000 sheets. This flexibility allows the printing system to be configured to meet the needs of individual applications.

Additionally, the present printing system can include multiple collators that are ganged together in a train structure. The train structure would include a common horizontal path that would lie in the same plane as the first track assembly 112 and provide a path by which sheets are transported from retainers within the additional collators to the first track assembly 112.

C. First Track Assembly

Figure 15:
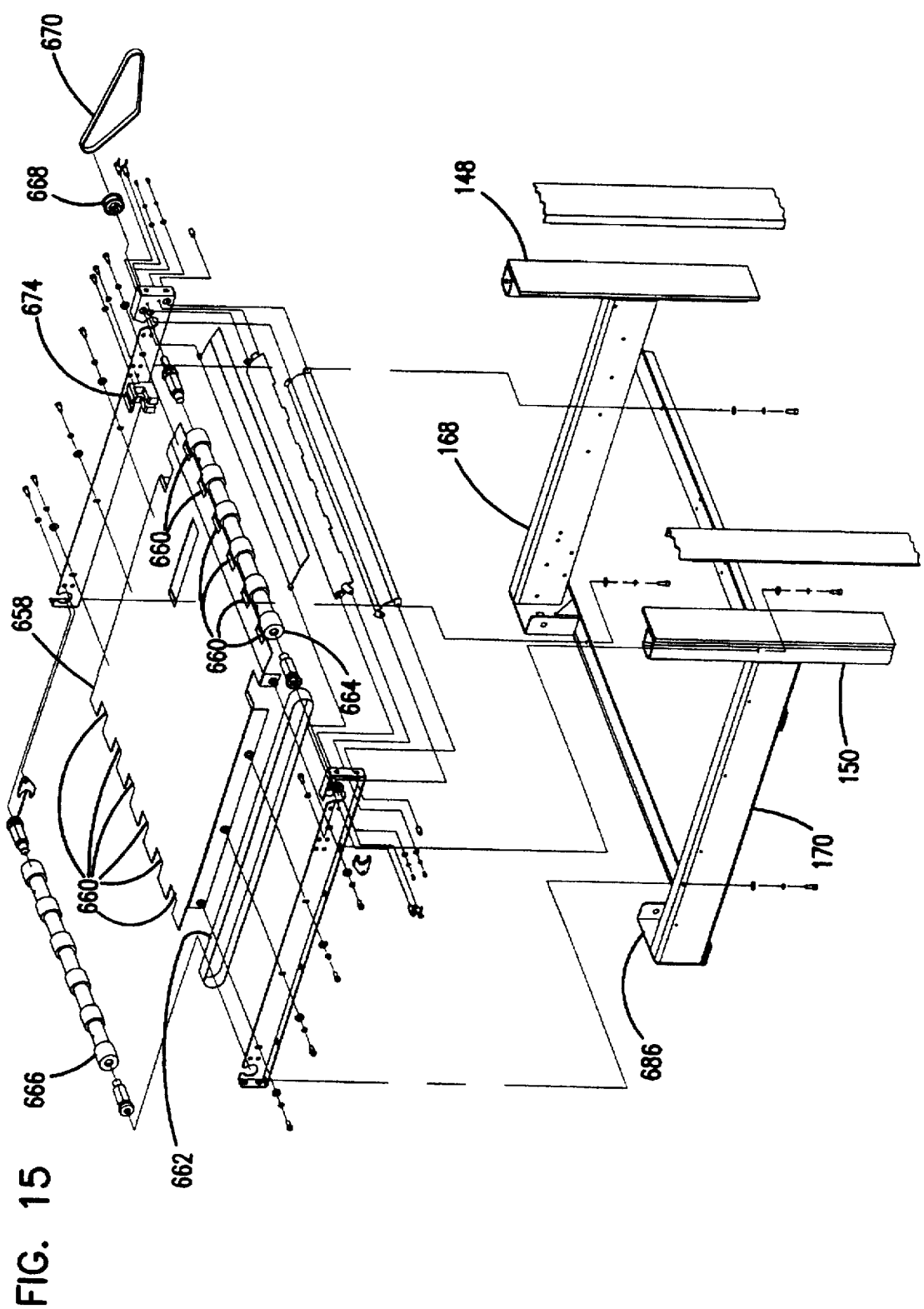
FIGS. 15 and 16 show an output track that extends between the collator and printer module shown in FIG. 1.

Referring to FIG. 15, output track platen 658 as connected to first and second horizontal beams 168 and 170 of frame 126. Platen 658 is substantially horizontal and has six perforations 660 located at oppositely disposed ends. A base 659 is connected to the lower surface of the platen 658 such that the base 659 and the platen 658 form a chamber 661.

The platen 658 forms six slots 663 such that each slot extends between each of the oppositely disposed perforations 660. Six track belts 662 extend around platen 658 and mate with oppositely disposed perforations 660. These six track belts 662 are mounted on a front roller assembly 664 and a rear roller assembly 666. Each of the six track belts 662 forms a plurality of perforations 665 that extend along substantially the entire length of the belts 662. Each of the six track belts 662 are aligned with one of the slots 663 such that the perforations 665 are in fluid communication with the slots 663.

Additionally, a blower (not shown) is in fluid communication with the chamber 661 through an opening not shown) in the base 659. The blower withdraws air from the chamber 661 so that air is drawn through the perforations 665 in the belts 662 and an attractive vacuum force is formed proximate the perforations 665. The attractive vacuum force should have sufficient strength so that a sheet being transported by the track assembly will be secured to the belts 662 and thus move with the belts 662 as they rotate. However, the attractive vacuum force should not be so strong that the sheet cannot be shifted during registration in order to correct the angular and lateral error in the sheets position.

A drive sprocket 668 is connected to the front roller assembly 664 and a drive belt 670 extends around the drive sprocket 668 and the tandem drive sprocket 439 of pick mechanism assembly 180f, which feeds sheets of print medium directly into first track assembly 112 as described above. Thus, the six track belts 662 receive motive power from track motor 556 and move at the same rate as vertical track assembly 552 and upper and lower infeed rollers 332 and 334.

In an alternative embodiment, the six track belts 662 can receive motive power from their own dedicated motor (not shown). In this alternative embodiment, the speed of the six track belts can be adjusted so that they rotate at the same speed as the vertical track assembly, faster than the vertical track assembly 552, or slower than the vertical track assembly 552. If the six track belts 662 operate at the same speed as the vertical track assembly 552, the ticks can be used to determine the position of sheets being transported along the first track assembly as well as the vertical track assembly 552. Operating the six track belts 662 at a different speed than the vertical track assembly 552 allows the distance between picked sheets to be adjusted.

A paper sensor 674 is connected to first horizontal beam 168 and positioned so that it can detect a document being transported by the upper six and lower six track belts 672 and 662. The paper sensor 674, which is linked to the control system, is substantially similar to the paper sensor 428, that was described above.

Figure 16:
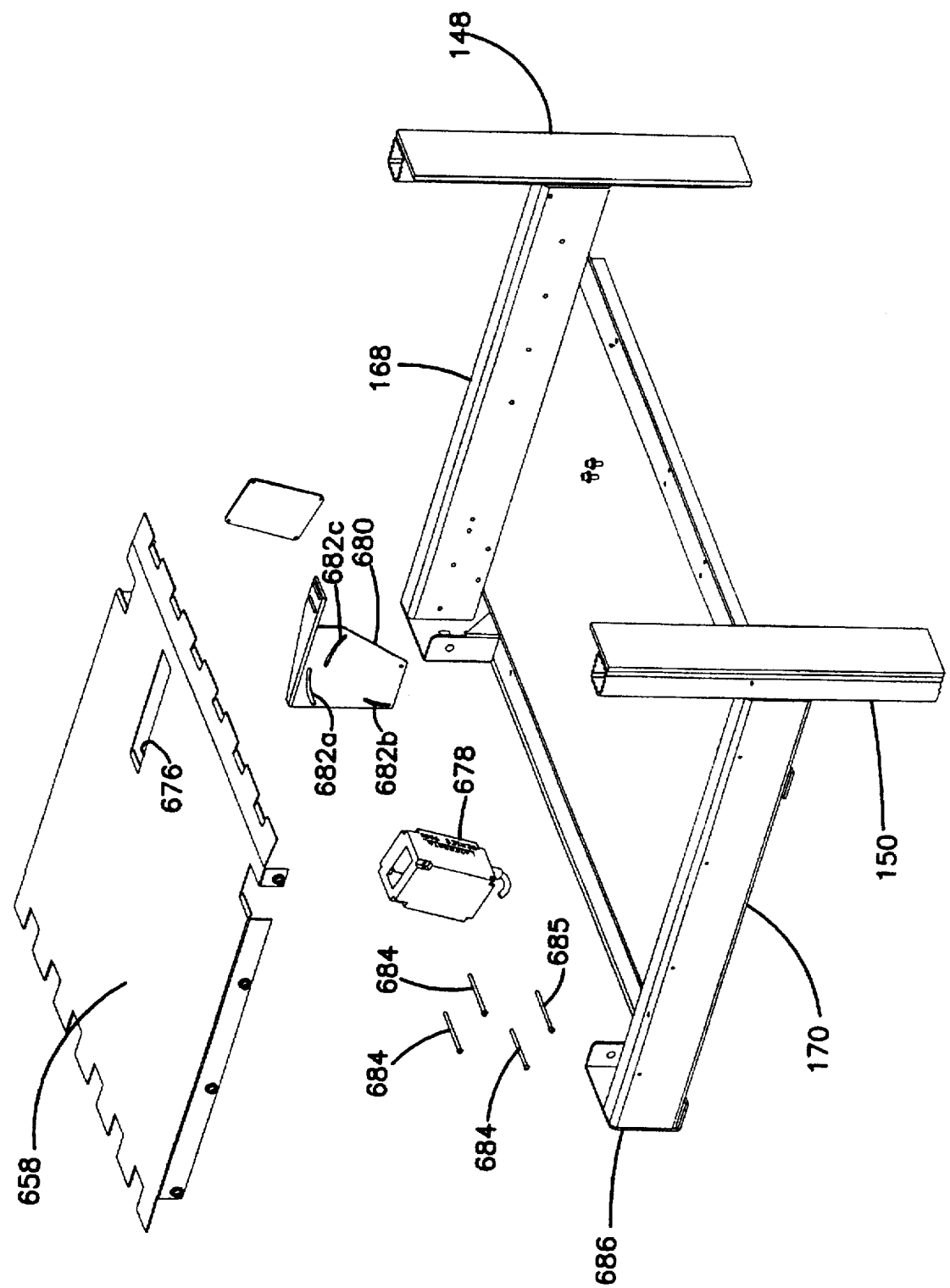

Referring to FIG. 16, an alternative embodiment of platen 658 and base 659 define a hole 676. Hole 676 is not open to chamber 661 so that it does not effect the strength of the attractive vacuum force that is created proximate the perforations 665 in the six track belts 662.

A scanning device 678 is mounted on a bracket 680, which has slots 682a, 682b, and 682c. Bracket 680 is mounted to the bottom of platen 658 at a position that is proximate hole 676. Scanning device 678 is attached to bracket 680 with screws 684 that extend through curved slots 682a, 682b, 682c. Thus, scanning device 678 is adjustable by moving the screws 684 through the slots 682a, 682b, and 682c. Additionally, scanning device 678 pivots around mounting screw 685. Moving the scanning device 678 relative to the slots 682a, 682b, and 682c allows the scanning device 678 to be properly focused. An alternate location for the scanning device 678 is within the first track assembly door itself. In that position, the scanning device 678 would be monitoring the printed side of the sheet, which is the side that will be printed.

In a specific embodiment, the scanning device 578 is a bar code scanner that detects a bar code image preprinted on each sheet of the print medium. In this embodiment, the rear face of the sheet is pre-printed with the bar code so that the sheets are continuously being scanned as they pass through the first track assembly 112.

The scanning device 678 transmits the scanning results to the control system, which can then determine whether the sheet of print medium is properly oriented, i.e., not upside down or turned in the wrong direction. In these scenarios, the scanning device 678 will not detect a bar code.

The control system can also determine whether the proper type of print medium document was fed from the collator 100, which effects whether the proper collation sequence occurs. In this scenario, the scanning device 678 will detect the wrong bar code. A commercially available bar code scanner that can be used to implement the scanning device 678 is model 9000, manufactured by Laser Data, Inc.

In this scenario, the programmed controller generates first identification signals. Each identification signal is associated with a particular retainer 106a–106h and represents the type of sheet being held by the associated retainer. The scanning device 678 generates a second identification signal representative of the bar code. The programmed controller compares the first and second identification signals and generates an error signal indicating the retainer is holding the incorrect type of sheet if the first and second identification signals do not match.

If the retainer from which the sheets are picked contain two types of pre-collated sheets, the scanning device 678 will generate alternating signals. The control system can use these alternating signals to distinguish between the two alternating types of sheets being picked. One situation in which pre-collated stock is used is for printing checkbooks that include carbon stubs.

Figure 17:
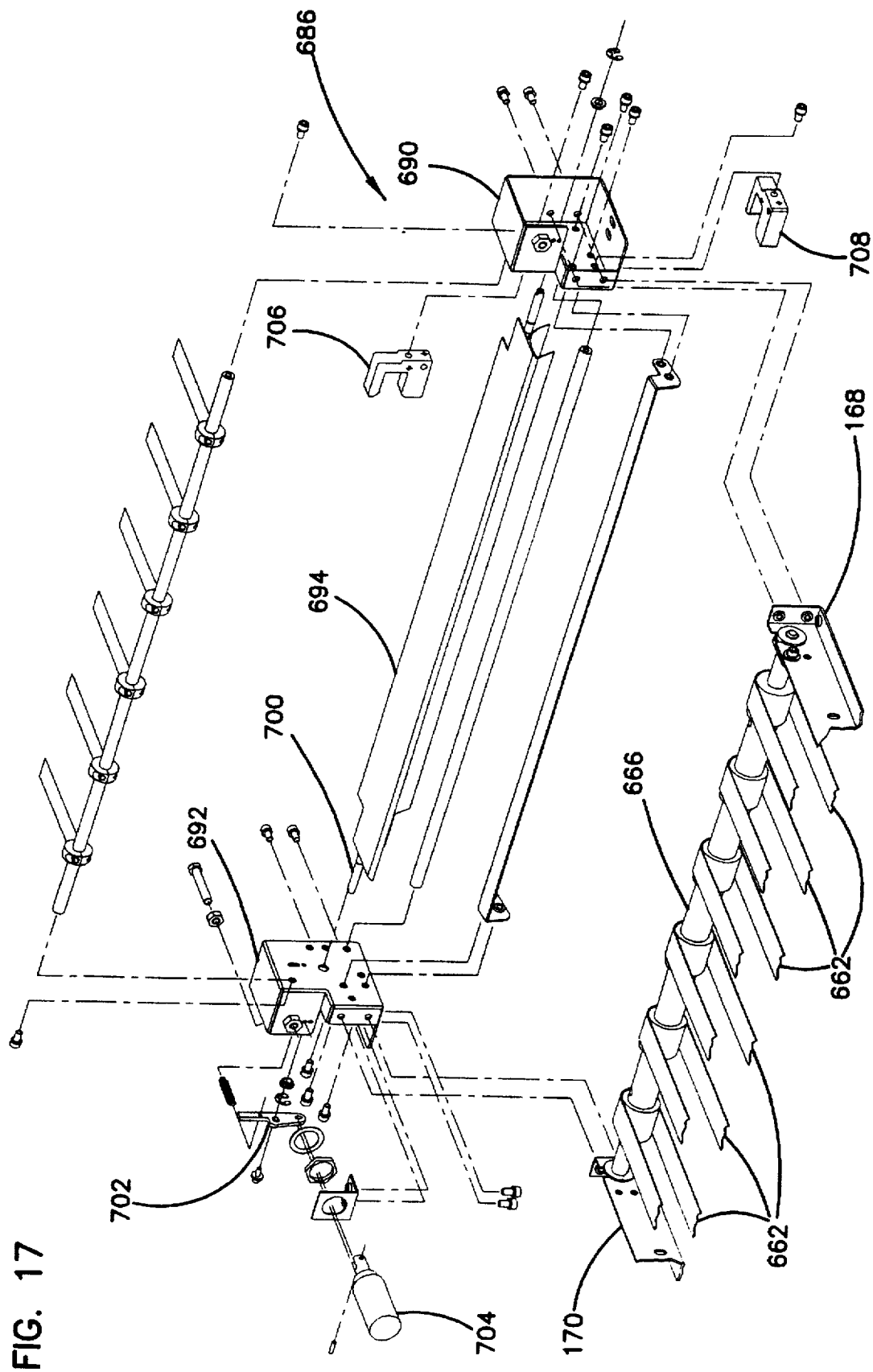
FIG. 17 is an illustration of a diverter assembly that is a component of the output track shown in FIGS. 13 and 14.

Referring now to FIG. 17, a diverter 686 is attached to a trailing edge 688 of the first track assembly 112. The diverter 686 includes a first bracket 680 attached to the first horizontal beam 168 and a second bracket 692 attached to the second horizontal beam 170. A platen 694 is pivotally connected between first and second brackets 690 and 692. Platen 694 is positioned proximate the rear roller assembly 666.

A pin 700 projects from platen 694 and extends through second bracket 692. A lever 702 is connected to pin 700. In turn, a solenoid 704 is connected to the lever 702. The solenoid 704 is linked to the control system. When the solenoid 704 is actuated, it moves the lever 702 which causes the platen 694 to pivot. When the platen 694 pivots, it obstructs the output from the conveyor formed by the upper six and lower six track belts 672 and 662. Thus, a sheet of print medium being transported through the first track assembly 112 will strike the platen 694 and be ejected or directed downward and off the substantially planer path so that it does not enter the printer 102. The platen 694 is positioned between the output from the first track assembly 112 and the input to the printer 102.

If a sheet is ejected by the diverter, the programmed controller will cause the collator 100 to re-present a sheet of the same type as the evicted sheet. Thus, a break in the predetermined order of sheets is prevented.

Additionally, a paper sensor 706 is mounted on the first bracket 690 and positioned between the platen 694 and the six upper and six lower track belts 672 and 662. Thus, the paper sensor 706 can sense sheets of print medium being transported out of the first track assembly 112. An additional paper sensor 708 is attached to the bottom of first bracket 690 and oriented so that it detects a document that is diverted by the platen 694 as it moves downward and off the substantially planer path.

A bin, not shown, can be positioned to received documents that the platen 694 diverts from the first track assemblies. Paper sensors 706 and 708 are substantially similar to the paper sensor 428 described above. Both paper sensors 706 and 708 are linked to the control system.

In operation, the six track belts 662 and the vertical track assembly should transports the sheets fast enough to establish a sufficient spacing between the sheets being transported. If an error is detected, therefore, the sheet can be diverted before the next sheet is picked from one of the retainers. In this situation, the control system can cause the same type of sheet that was diverted to be repicked and thus preserve any predetermined sequence of sheets that are required to run the job. If the retainer from which the diverted sheet retains two types of pre-collated sheets, the programmed controller will also cause the next subsequent sheet to be diverted so that the proper order of alternating types of sheets is preserved.

D. Registration System

Figure 18:
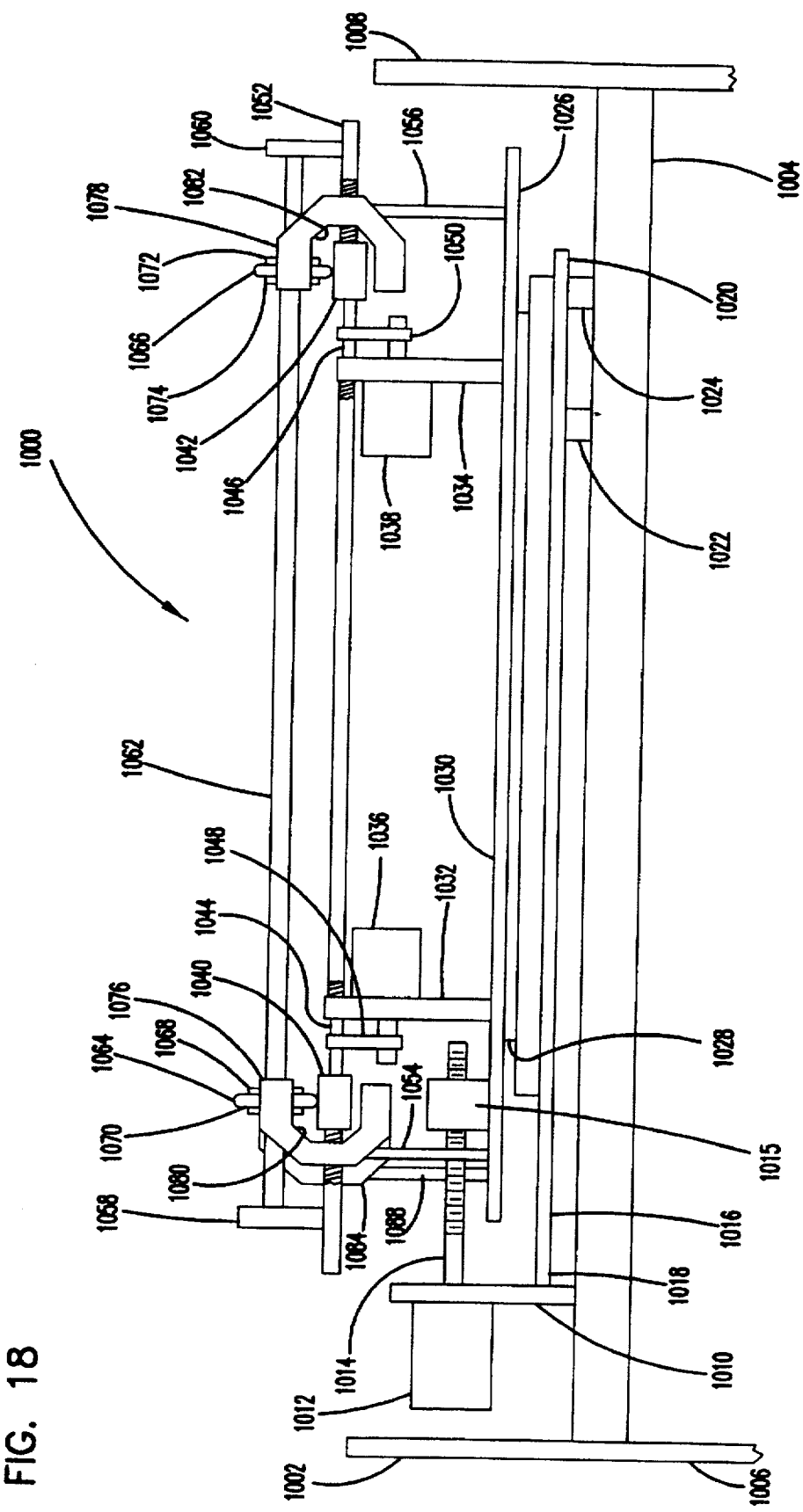
FIG. 18 is a front elevational view of a registration system used in the printing system shown in FIG. 1.
Figure 19:
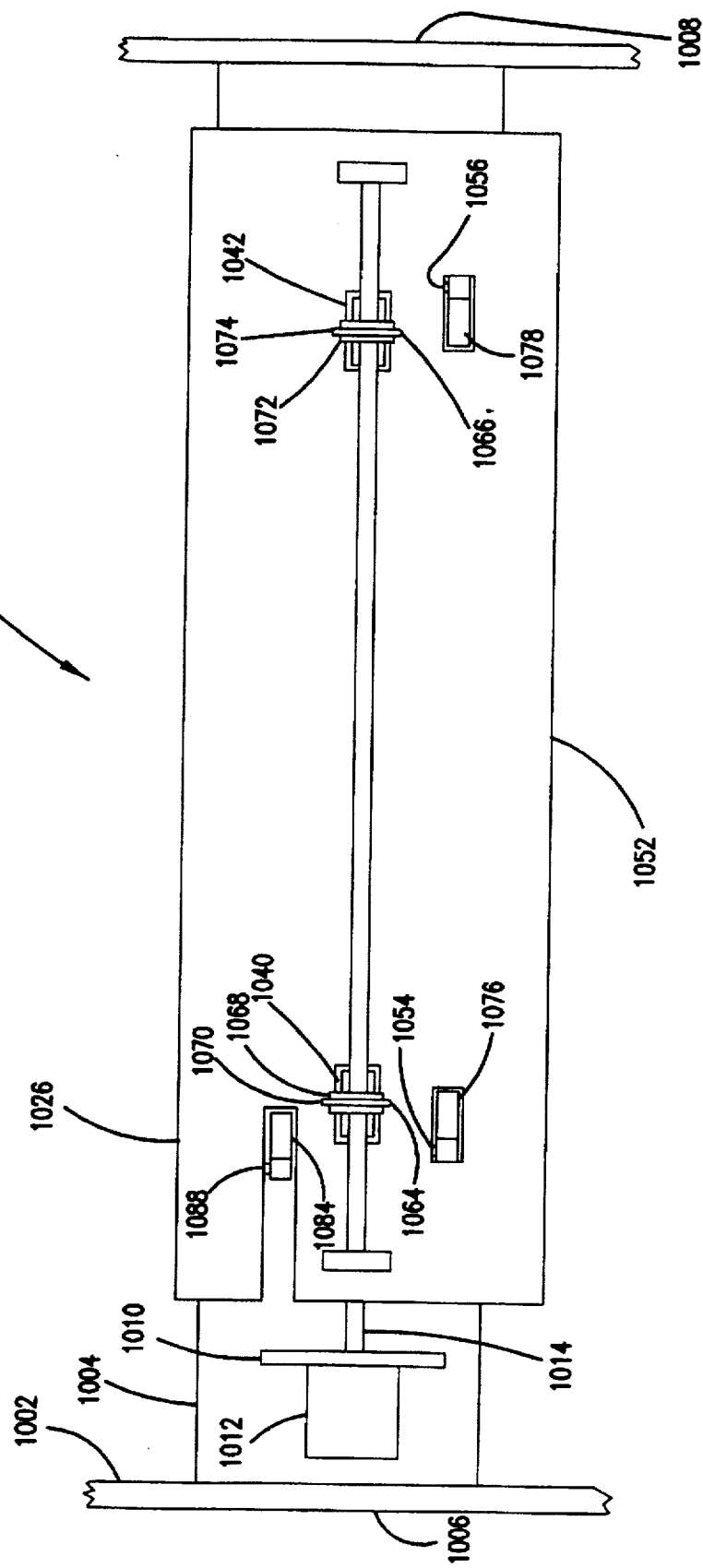
FIG. 19 is a top plain view of the registration system shown in FIG. 18.

Referring now to FIGS. 18 and 19, a registration system, generally shown as 1000, positions the sheet being transported along the path so that the sheet is properly aligned with the printer 102 and a print engine within the printer. This function is very important, especially when the sheet is a preprinted form and the printer 102 is adding new characters that need to be properly aligned on the form. The registration system 1000 adjusts both the skew and lateral position of the sheet.

The registration system includes a frame 1002 that has a horizontal member 1004 extending between first and second vertical members 1006 and 1008. A vertical motor bracket 1010 is mounted on the horizontal member 1004 and supports a carriage motor 1012. The carriage motor 1012 drives a ball screw mechanism 1014 that includes a nut 1016. The carriage motor 1012 and ball screw mechanism 1014 form a motor arrangement. Additionally, a lower rail 1016 has one end 1018 connected to the vertical motor bracket 1010 and an opposite end 1020 supported by mounts 1022 and 1024. The lower rail 1016 supports a carriage 1026.

The carriage motor 1012 is linked to and controlled by a servo controller (not shown). In turn, the servo controller is linked to the control system. One type of servo controller that can be used is model number PRO 450 controller, which is manufactured by Reliance Electric of Eden Prairie, Minn. This servo controller may include an amplifier such as model number BSA 15, which is also manufactured by Reliance Electric. Such servo controllers are well known in the art.

The carriage 1026 includes an upper rail 1028 that slidable engages the lower rail 1016. A horizontal plate 1030 is mounted on the upper rail 1028, and first and second motor brackets 1032 and 1034 are mounted on the horizontal plate 1030. The first and second motor brackets 1032 and 1034 support first and second stepper motors 1036 and 1038, respectively. The first and second stepper motors 1036 and 1038 are linked to the control system.

First and second lower rollers 1040 and 1042 are connected to first and second rods 1044 and 1046, respectively, which are rotatably mounted on the first and second motor brackets 1032 and 1034, respectively. First and second belts 1048 and 1050 transmit motive power from the first and second stepper motors 1036 and 1038, respectively, to the first and second lower rollers 1040 and 1042, respectively. The diameter of the first and second lower rollers 1040 and 1042 is approximately +/−0.0005 of an inch of each other.

A platen 1052 is supported above the horizontal plate 1030 by brackets 1054 and 1056. Flanges 1058 and 1060 extend upward from the platen 1052, and a rod 1062 extends between the flanges 1058 and 1060. First and second upper rollers 1064 and 1066 are rotatably mounted on the rod 1062 such that the first upper roller 1064 engages the first lower roller 1040 and the second upper roller 1066 engages the second lower roller 1042. The first upper roller 1064 and the first lower roller 1040 form a first roller pair. The second upper roller 1066 and the second lower roller pair 1042 form a second roller pair.

The first upper roller 1064 includes a central roller 1068 that is surrounded by an o-ring 1070, which provides a tapered rim and minimizes the contact area between the first upper roller 1064 and the first lower roller 1040. Similarly, the second upper roller 1066 has a central roller 1072 and an o-ring 1074. An advantage of minimizing the contact between the upper rollers 1064 and 1066 and the lower rollers 1040 and 1042 is that the sheet being registered will more easily move when the skew is being adjusted.

The first and second roller pairs are positioned on opposite sides of the path and form a roller arrangement. The first roller pair will grip or pinch one side of the sheet and the second roller pair will grip or pinch the opposite side of the sheet. First and second sensors 1076 and 1078 are connected to the platen 1052 and are positioned proximate the first and second roller pair, respectively. Each sensor 1076 and 1078 includes a gap 1080 and 1082, respectively, and has a light emitter/detector arrangement (not shown) such that the sensors 1076 and 1078 can detect the presence or absence of a sheet in the gaps 1080 and 1082. Thus, the first and second sensors can detect the leading and trailing edges of the sheet as it is being transported along the path. The first and second sensors 1076 and 1078 are linked to the control system.

A third sensor 1084 is substantially similar to the first and second sensors 1076 and 1078. However, the third sensor 1084 is mounted on a bracket 1088, which is connected to the horizontal member 1004 of the frame 1002. Thus, the third sensor 1084 does not move with the carriage 1026. The third sensor 1084 is linked to the servo controller. The third sensor 1084 is slightly offset from the first sensor 1076. Thus, the third sensor 1084 can be used to register the side edge of the sheet being transported.

In operation, the first and second stepper motors 1036 and 1038 rotate at a substantially similar and predetermined speed so that the first and second roller pairs rotate and transport the sheets at approximately the same speed as the printer 102. Thus, the first and second roller pairs will slow the sheets being transported along the first track assembly 112 and reduce the gap between consecutive sheets picked from the collator 100 so that the gap is compatible with the print engine that is used in the printer 102.

As the sheet is being transported, it will pass through the first and second roller pairs and the leading edge will trip the first and second sensors 1076 and 1078. There is angular error if the sheet is skewed. In this first position, the leading edge of the sheet is not perpendicular to the path and will trip the first and second sensors 1076 and 1078 at different times.

The control system can measure the interval between the moments when the first and second sensors 1076 and 1078 are tripped. In response, the control system will create a speed differential between the first and second stepper motors 1036 and 1038 by increasing the speed of one stepper motor 1036 or 1038 and decreasing the speed of the other stepper motor 1038 or 1036. The controller will also cause a phase differential between steps in the first and second stepper motors 1036 and 1038.

The magnitude of the speed change for the first and second stepper motors 1036 and 1038 is approximately the same so that the mean speed of the sheet will remain substantially the same as it is being rotated. Once the sheet is shifted to a second position wherein the leading edge is substantially perpendicular to the transport path, the first and second stepper motors 1036 and 1038 are returned to substantially the same speed and the phase differential between the steps is returned to approximately zero.

The registration system 1000 also shifts the sheet from side to side so that the sheet's side edge is placed in a predetermined position that is aligned with the printer 102. When the leading edge of the sheet is detected by either the first or the second sensors 1076 or 1078, the control system will activate the servo system and the carriage motor 1012 will move the carriage 1026 toward the third sensor 1084. When the third sensor 1084 detects the side edge of the sheet, it will send a signal to servo controller. The servo controller will then stop moving the carriage 1026 and the lateral position of the sheet will be properly aligned with the printer 102.

An alternative form of lateral registration is to move the carriage 1026 laterally until the third sensor 1084 detects the sheet and then move the carriage 1026 in the opposite direction until the sheet moves out of the third sensor's 1084 detection. In another alternative embodiment, a sensing device that generates an analog signal could be used in place of the third sensor. A charge-coupled device (CCD element) is an example of such an alternative sensing device.

E. Printer

As discussed above, the printer 102 receives sheets from the collator 100 that are transported via the first track assembly 112. The printer 102 contains a print engine and mechanisms to position and prepare sheets for printing. The printer 102 can be modelled as either a digital press or a printer. Digital press architecture models offset printing methods and duplicates an image or a set of images over several pages. The majority of information printed by a digital press does not change, and the data that does change from page to page tends to be sequential or related in some manner. Because there is little change, the digital press model does not place heavy requirements on computing hardware. The digital press model is also compatible with most of the equipment that is currently used in the production of checks and other financial forms.

One skilled in the art will appreciate that printer architecture may provide more flexibility than digital press architecture and can be used for other types of applications. One skilled in the art will further appreciate that other types of printers such as an offset press can be used in place of an electronic printer.

One advantage of the printer 102 is that all of the printing occurs while the print medium is in the substantially planer path. The printer 102 does not take the sheet out of that path, and its print medium does not bind or twist around drums or rolls. As discussed above, maintaining a substantially planer path reduces the chance that the print medium becomes deformed and get jammed in the printer 102. Thus, manufacturing efficiency and quality control are increased.

The printer 102 is connected between the first and the second track assemblies 112 and 114. After printing, the printer transports the sheet to the second track assembly 114, which carries the sheet to the stacker 104.

F. Second Track Assembly

Referring back to FIG. 15, the second track assembly 114 is similar to the first track assembly 112. However, the second track assembly 114 does not use an attractive vacuum force to secure the sheet to the six track belts 662. Rather, six upper track belts 672 are positioned above the platen 658, are substantially parallel to the lower six track belts 662, and lay against the lower six track belts 662. The upper six and lower six track belts 672 and 662 form a conveyor for transferring the document from the collator 100 to the printer 102. Frictional forces move the sheet as the six track belts 662 are rotating. The frictional forces also transmit motive power from the six track belts 662 to the six upper track belts 672. The six upper track belts are mounted in a door that lays over platen 658.

In this second track assembly 114, the attractive vacuum force is not necessary and thus the six track belts 662 do not need to define the apertures. Additionally, the base and the blower are not required.

G. Stacker

Figure 20:
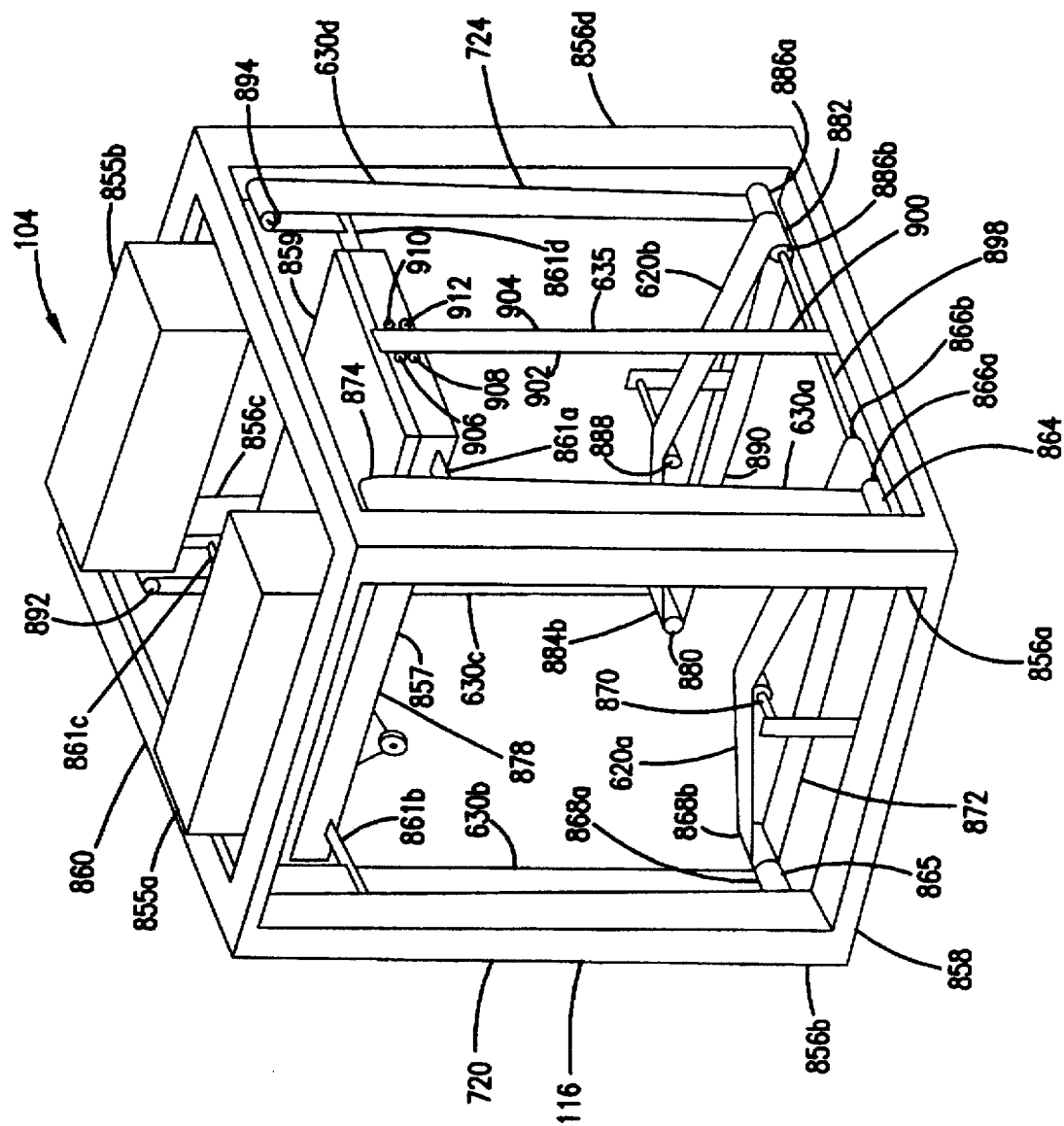
FIG. 20 is an illustration of an elevator assembly that is a component of the stacker module shown in FIG. 1.

Referring now to FIG. 20, stacker 104 has several structures including a frame 720 that forms a support structure, an elevator assembly 724, and paper handling assemblies 855a and 855b. Frame 720 forms base 116 of stacker 104 and includes legs 856a–856d, base unit 858, and top unit 860. Base unit 858 does not have a number between the lower portions of legs 856c and 856d, thereby enabling a dolly 862 to be wheeled into and out of base 116.

Elevator assembly 724 includes a dolly frame 857 for supporting a dolly 859. Dolly frame 857 has four brackets 861a–861d positioned proximate to such of its four corners. The elevator assembly 724 includes a drive mechanism. The drive mechanism includes two belting systems 620a and 620b. Belting system 620a includes first and second lower pulleys 864 and 865, which are operably connected to the lower portions of the legs 856a and 856b, respectively. Pulley 864 has an inner spool 866a and an outer spool 866b. Similarly, pulley 865 has an inner spool 868a and an outer spool 868b. Belting system 620a also includes a first intermediate pulley 870. Drive belt 872 extends around outer spool 866b of pulley 864, outer spool 868b of pulley 865, and first intermediate pulley 870.

First upper pulley 874 and second upper pulley (not shown) are rotatably connected to the upper portion of the legs 856a and 856b, respectively. A first suspension belt 630a is operably connected to inner spool 866a of pulley 864 and extends upward and around first upper pulley 874. The first suspension belt 630a then comes downward where it is operably connected to a bracket 861a of dolly frame 857. A second suspension belt 630b is operably connected to inner spool 868a of pulley 865 and extends upward and around second upper pulley 876. The suspension belt 630b then comes downward where it is operably connected to bracket 861b of dolly frame 857.

In operation, the drive belt 872 rotates, which causes the first and second lower pulleys 864 and 865 to rotate either clockwise or counter clockwise. If the first and second lower pulleys 864 and 865 rotate counter clockwise, they let out first and second suspension belts 630a and 630b, respectively. This action causes a first side ridge 878 of dolly frame 857 to lower. If the drive belt 872 moves in the opposite direction, the first and second lower pulleys 864 and 865 take in the first and second suspension belts 630a and 630b, respectively, and cause the first side edge 878 of dolly frame 857 to raise.

Belting system 620b is substantially identical to belting system 620a. Belting system 620b includes a third lower pulley 880 having an inner spool (not shown) and an outer spool 884b and a fourth lower pulley 882 having an inner spool 886a and an outer spool 886b; second intermediate pulley 888; drive belt 890; third and fourth upper pulleys 892 and 894; and third and fourth suspension belts 630c and 630d, which are operably connected to brackets 861c and 861d, respectively, of dolly frame 857. Additionally, belting system 620b operates in a similar manner to belting system 620a in order to raise and lower second side edge 896 of dolly frame 857. A drive shaft 898 is connected between first and fourth lower pulleys 864 and 882.

As discussed above, motive force is provided by a motor (not shown) that is connected to second intermediate pulley 888 of belt system 620b. When the motor shaft rotates, it causes the second intermediate pulley 888 to rotate and move drive belt 890. Drive shaft 898 transmits motive power from fourth lower pulley 882 to first lower pulley 864 and activates first belting system 620a.

Dolly 859 forms a platform and is loaded on dolly frame 857 so that when suspension straps 630a–630d raise dolly frame 857, dolly 859 is also raised. When loaded on the dolly frame 857, the dolly 859 is located symmetrically in the center of the four suspension belts 630a–630d. The dolly 859 is positioned in this way to suspend the loading, which may not be centered on the dolly 859. If the dolly frame 857 was not suspended at its corners and the load is not centered, the dolly 859 may have a tendency to tip. Suspending the frame 857 at its corners minimizes this tendency to tip.

Additional stability for the dolly frame 857 and dolly 859 is provided by track structure 635. Track structure 635 includes a beam or rail 900 that is substantially vertical and extends from the upper portion of frame 720 to the base unit 858 of frame 720. Beam 900 has a first V-shaped edge 902 and a second V-shaped edge 904. First wheel 906 is operably connected to the dolly frame 857 and has a V-shaped groove (not shown) along its edge that engages first V-shaped edge 902 of beam 900. A second wheel 908 is substantially similar to first wheel 906 and also engages first V-shaped edge 902 of beam 900. Third and fourth wheels 910 and 912 are substantially similar to first wheel 906 and engage second V-shaped edge 904 of beam 900.

Figure 21:
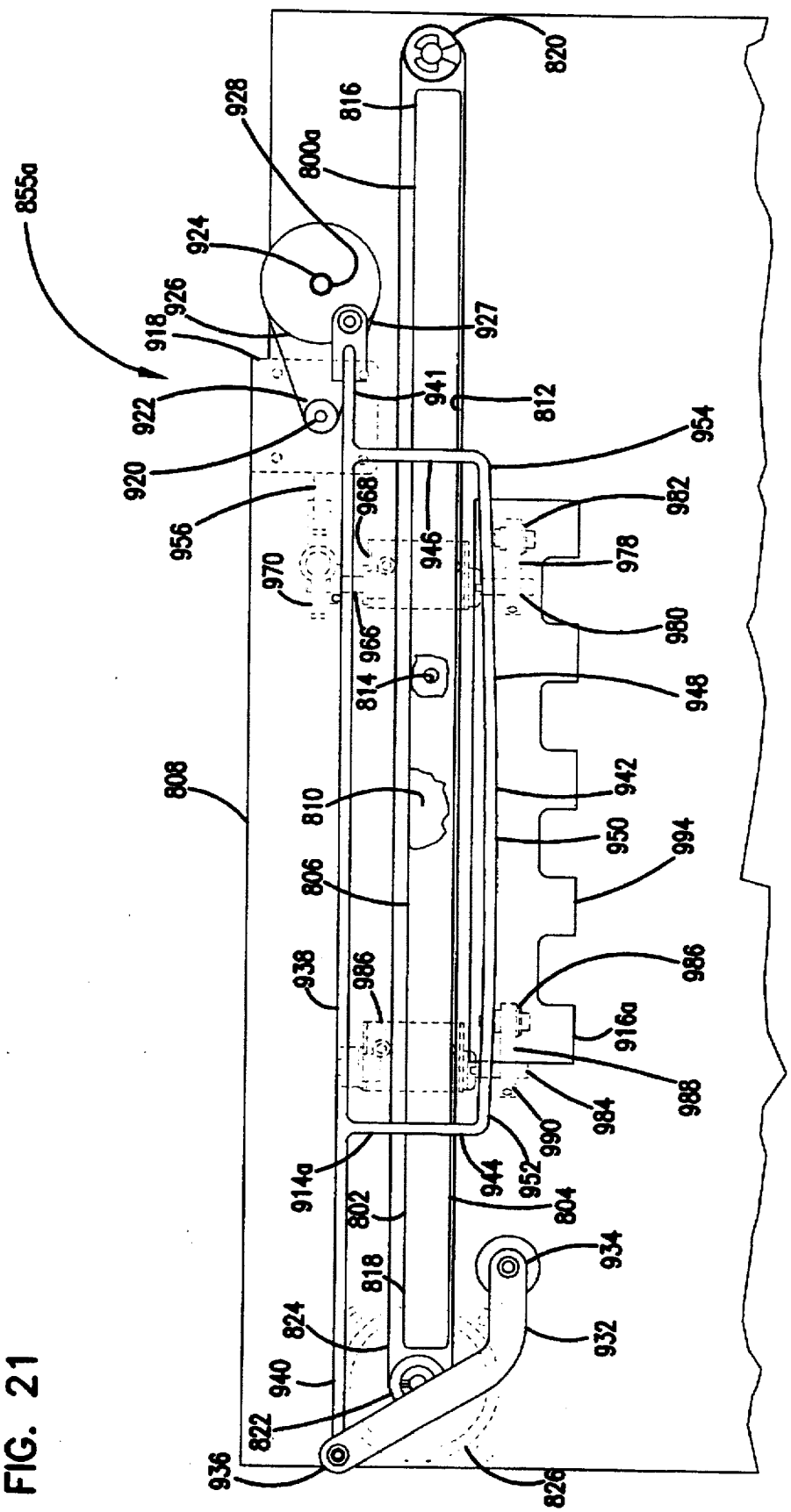
FIG. 21 illustrates a side view of a paper handling assembly that is shown in FIG. 20.
Figure 22:
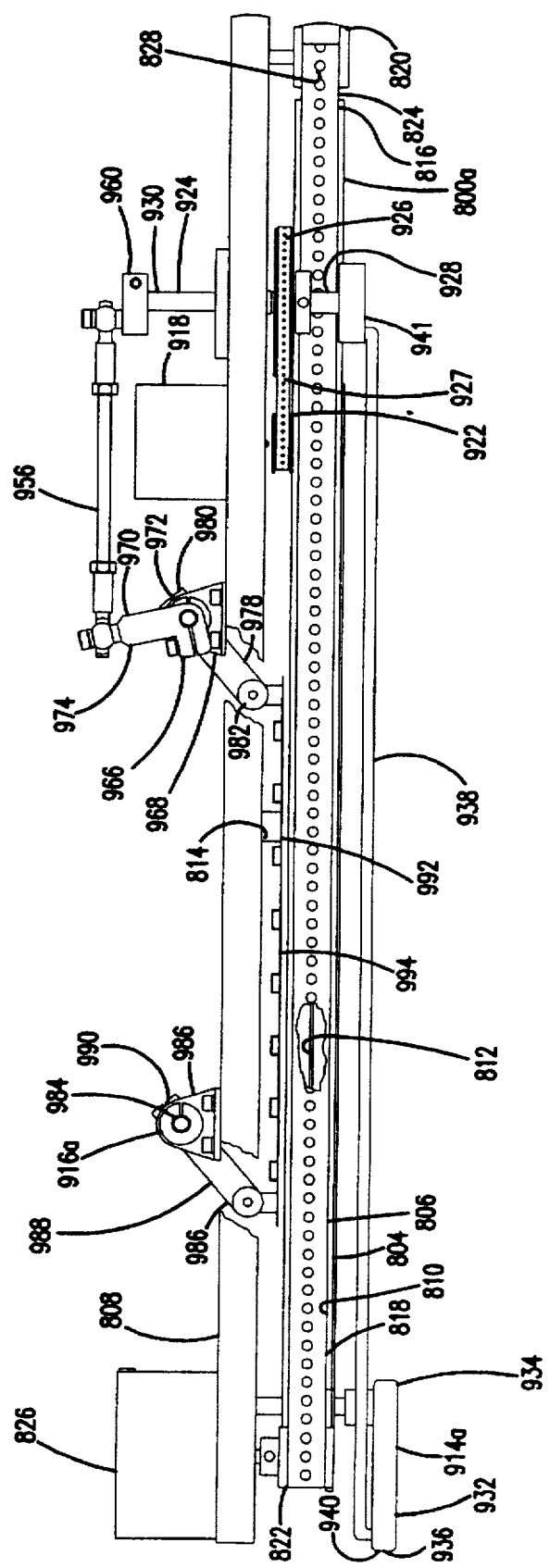
FIG. 22 illustrates a top view of the paper handling assembly shown in FIGS. 20 and 21.

Referring to FIGS. 21 and 22, the paper handling assembly 855a includes an inverted-conveyor assembly 800a, a rocker or recirculating assembly 914a, and a jogging assembly 916a that are substantially similar to one another. Inverted-conveyor assembly 800a includes an elongated tubular member or manifold 802 that has a lower surface 804, an upper surface 806, and has a square profile. Elongated tubular member 802 is mounted on backing plate 808. Additionally, elongated tubular member 802 defines a cavity 810 and a slot 812 that extends along a substantial portion of the elongated tubular member 802 and passes from the cavity 810 to the lower surface 804. Elongated tubular member 802 also defines a main port 814 that is in fluid communication with an air compressor, not shown.

Elongated tubular member 802 has two oppositely disposed ends 816 and 818. First and second rollers 820 and 822 are rotatably connected to backing plate 808 and positioned proximal to oppositely disposed ends 816 and 818, respectively. Conveyor belt 824 extends around first roller 820, along top surface 806, around second roller 822, and along lower surface 804 The conveyor belt 824 has a lower portion that defines a bottom surface and extends along the lower surface 804 of elongated tubular member 802. The bottom surface of the conveyor belt 824 is proximate the substantially planer path in which the sheets travel.

A stepper motor 826 is connected to first roller 820 and provides motive force to rotate first roller 820 and hence conveyor belt 824. Operation of stepper motor 826 and rotation of the conveyor belt 824 are described in more detail below.

Conveyor belt 824 defines a plurality of perforations or openings 828 that extend along substantially the entire length of conveyor belt 824. Perforations 828 are adjacent to and in alignment with slot 812 when they are proximate the lower surface 804 of elongated tubular member 802. Thus, conveyor belt 824 substantially blocks slot 812, except for the perforations 828 The air compressor draws air from the cavity 810 via main port 814. Drawing air from cavity 810 forms a vacuum at the perforations 828 that are adjacent to the slot 812.

Inverted-conveyor assembly 800a cooperates with rocking assembly 914a which separates the suspended sheet from the conveyor belt 824. Referring to FIGS. 19 and 20, rocking assembly 914a includes a stepper motor 918 that is mounted on backing plate 808. Stepper motor 918 has a drive shaft 920 that projects through backing plate 808. A drive sprocket 922 is mounted on drive shaft 920. A secondary shaft 924 projects through backing plate 808 and can rotate. A pulley 926 is mounted on one end 928 of secondary shaft 924 and a belt 927 wraps around drive sprockets 922 and pulley 926. A cam 960 is mounted on an oppositely disposed end 930 of secondary shaft 924.

A lever 932 has a lower or first end 934 pivotally connected to back plate 808 and an upper or second end 936 that can pivot accurately around the lower end 934. A recirculation member is connected between a cam 960, which forms a crank, and the lever 932. The recirculating member includes a cross member 938 having a first end 940 operably connected the upper end 936 of the lever 932 and a second end 941 operably connected to the pulley 926 proximate its circumference. A stripper bar 942 has first, second, and third portions 944, 946, and 948, respectively. First portion 944 is operably connected to cross member 938 and extends downward. Second portion 946 is operably connected to cross member 938 and extends downward. Third portion 948 has a lower edge, extends between the lower end of first portion 944 and the lower end of second portion 946, and is positioned below cross member 938. The lower edge of third portion 948 is slightly arcuate so that its middle portion 950 is slightly lower than its end portions 952 and 954.

In operation, stepper motor 918 causes drive sprocket 922, belt 927, and pulley 926 to rotate. As pulley 926 rotates, it moves the first end 940 of cross member 938 in a circular motion. As a result, cross member 938 moves up and down as well as laterally. Second end 941 of cross member 938, which is connected to lever 932, moves along an arcuate path. When the cross member 938 is in its upper most position, the third portion 948 of the stripper bar 942 is positioned above the lower surface 804 of the elongated tubular member 802. When cross member 938 is in its lowest position, third portion 948 of stripper bar 942 is below the bottom surface 804 of elongated tubular member 802.

Movement of the cross member 938 and stripper bar 942 is synchronized with movement of the conveyor belt 824. When third portion 948 of stripper bar 942 is above the lower surface 804 of the elongated tubular member 802, the conveyor belt 824 makes one complete cycle so that it transports a sheet from the second output track 114 to the end of the substantially planer path. After the sheet is at the end of the substantially planer path, the cross member 938 moves downward to its lowest position, which causes the third portion 938 of the stripper bar 942 to drop below the conveyor belt 824. This action separates the sheet from the attractive vacuum force described above. The sheet then falls onto a stack on dolly 859.

The rocking assembly 914a provides a sinusoidal reciprocating motion for the third portion 948. The curvature in the third portion 938 of the stripper bar 942 works in concert with this sinusoidal reciprocating motion to create a smooth rolling line of contact between the third portion 938 and a top surface of the sheet being held against the conveyor belt 824 by the attractive vacuum force. As a result, a smooth removal of the sheet is achieved without introducing a wave front or a shock wave in either the lateral or the travel directions of the sheet. The sheet remains substantially flat as it is stripped and remains substantially flat until it is in the vicinity of the top of the stack.

Maintaining the sheet in a substantially flat position improves the quality of jogging, discussed below, by allowing more contact along the edges of the sheet. By keeping the sheet under control, the jogging assembly 916a has a better line of contact with the edges of the sheet.

Jogging assembly 916a helps to place the sheet squarely on top of the stack on dolly 859 and includes a first vertical shaft 966 mounted to back plate 808 by bracket 968. An upper lever 970 has one end 972 attached to first vertical shaft 966 and an opposite end 974 projecting radially outward. Linkage 956 is connected between opposite end 974 of upper lever 970 and cam 960. A lower lever 978 also has one end 980 connected to first vertical shaft 966 and an opposite end 982 radiating outward. The upper and lower levers 970 and 978 are radially oriented to one another at an obtuse angle.

A second vertical shaft 984 is mounted to back plate 808 by bracket 986. A lever 988 has one end 990 connected to second shaft 984 and an opposite end 986 radiating outward. Lever 988 is oriented so that it is substantially parallel to lower lever 978. A rod 922 is connected between lower lever 978 and opposite end 986 of lever 988. Brush 994 is operably connected to rod 992 and extends downward.

As pulley 926 rotates to move the rocking assembly 914a, it causes secondary shaft 924 and cam 960 to also rotate. As the cam 960 rotates, it moves linkage 956 back and forth in a lateral direction. This action drives upper lever 970 back and forth, which rotates first vertical shaft 966 and causes lower lever 978 to rotate. The opposite end 982 of lower lever 978 moves along an arcuate path and causes rod 992 and brush 994 to move away from the back plate 808. Lever 988 moves in a similar manner to lower lever 978. As brush 994 continues to move away from the back plate 808, it comes into contact with the edge of the sheet that fell from the conveyor belt and pushes the sheet into alignment with the stack of previously fallen sheets. As cam 960 continues to rotate, it causes the first and second vertical shafts 966 and 984 to move in the opposite direction, which causes rod 992 and brush 994 to move away from the back plate.

Figure 23:
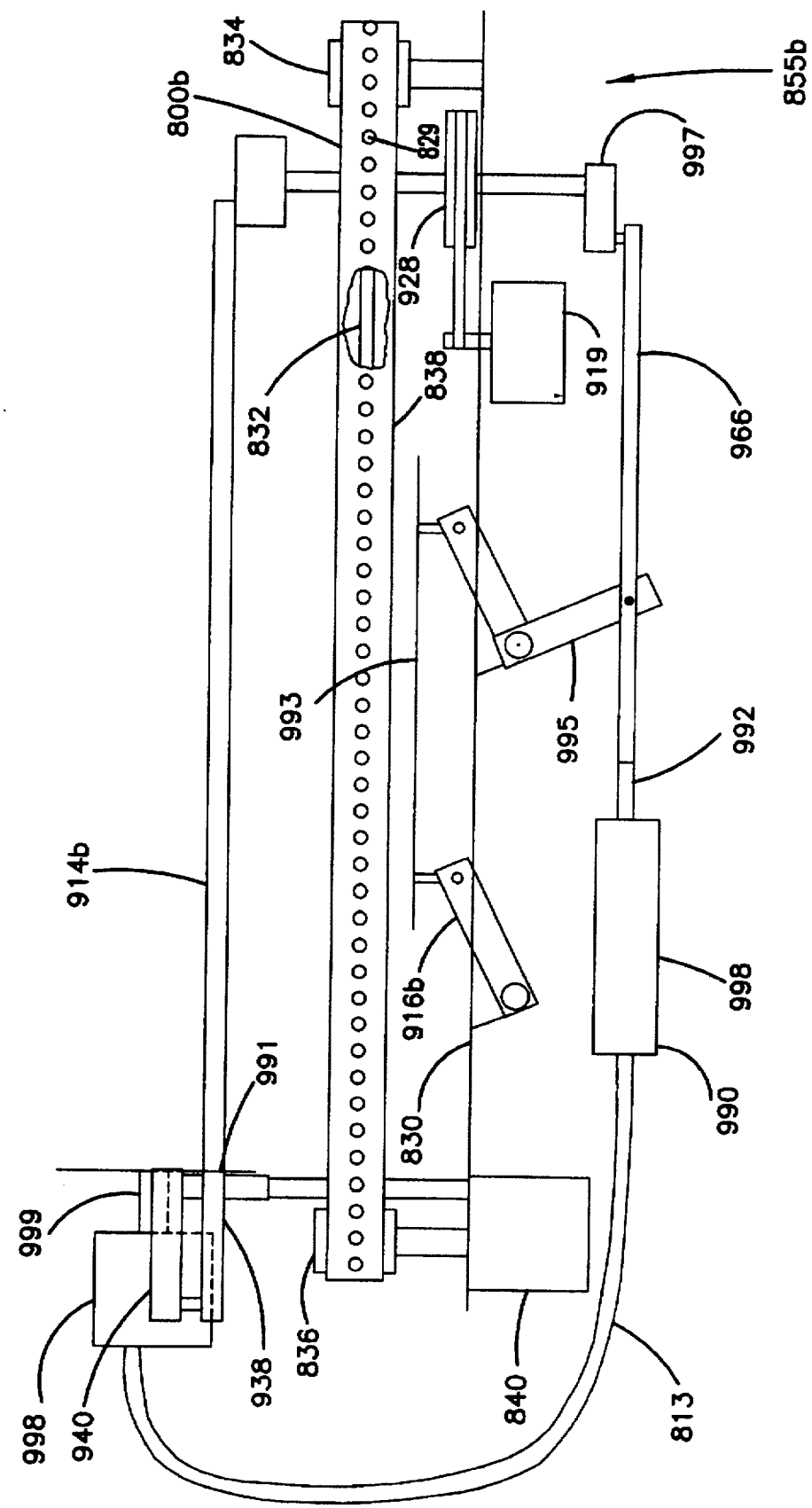
FIG. 23 illustrates a partial top view of another paper handling assembly shown in FIG. 20.

Paper handling assembly 855b is substantially similar to paper handling assembly 855a and includes inverted-conveyer assembly 800b, rocking assembly 914b, and jogging assembly 916b. Referring to FIG. 23, the primary difference relates to jogging assembly 916b, which has a linkage 966, a cam 997, a brush 993, an upper lever 995, a stepper motor 919, and a pulley 925. Jogging assembly 916b includes pump 998 mounted on a back plate 830. Pump 988 has a cylinder 990 and a piston 992. Linkage 996 is connected between piston 992 and cam 997. Linkage 996 is also connected to upper lever 995 at a point between piston 992 and cam 997. A hose 813 provides fluid communication between piston 992 and a secondary cylinder 998, which is engaged by secondary piston 999. A secondary brush 991 is mounted on secondary piston 999.

As linkage 996 is being pushed, it causes pump 998 to force a gas into secondary cylinder 998. Secondary piston 999 then moves outward and presses secondary brush 991 against a leading edge of the fallen sheet and aligning it with a leading edge of the stack of previously fallen sheets on the dolly 859.

Brush 993 and secondary brush 991 cycle out of phase with one another. Thus, secondary brush 991 is withdrawn from the leading edge of the sheet when brushes 993 and 994 are in contact with the side edges of the sheet. Similarly, secondary brush 991 is in contact with the leading edge of the sheet when brushes 993 and 994 are withdrawn from the side edges of the fallen sheet of paper.

Additionally, secondary stepper motors 918 and 919 are each linked to the control system and are synchronized to one another, which keeps rocking assemblies 914a and 914b in sync. In order to maintain stepper motors 918 and 919 in synch, pulleys 926 and 925 each include a halo-affect sensor and magnet combination (not shown), which the control system senses to determine when the pulleys 926 and 925 reach a home position.

If one of the pulleys 926 or 925 does not reach its home position at the appropriate time, stepper motor 918 or 919, respectively, will seek to put the pulley 926 or 925, respectively, into its home position and in synch with its corresponding pulley 925 or 926, respectively. Only one cycle is interrupted if the pulleys 926 and 925 are immediately synchronized. As a result, there is not any cumulative effect of running the pulleys 926 and 925 out of synch. The drive pulleys can become out of sync if something physically interrupts the motion of either rocking assembly 914a or 915b or the motion of either of the jogging assemblies 916a or 916b.

Inverted-conveyor assembly 800b of paper handling system 855b is substantially similar to inverted vacuum conveyor 800a and includes a backing plate 830, elongated tubular member 832, rollers 834 and 836, conveyor belt 838 with perforations 829, and stepper motor 840. Inverted vacuum assemblies 800a and 800b are substantially parallel to one another so that they can transport oppositely disposed edges of the print medium. Additionally, the distance between inverted vacuum assemblies 800a and 800b is adjustable so that the stacker 104 can accommodate different sizes of sheets. The distance is adjusted by sliding backing plate 830, which is mounted on a carriage, of inverted vacuum assembly 800b toward or away from inverted vacuum assembly 800a.

In use, a sheet of the print medium travels along the planer path, is fed out of the second track assembly 114, and is positioned proximate the perforations 828 and 829 of conveyor belts 824 and 838, respectively. The vacuum formed adjacent to the perforations 828 and 829 forms an attractive force that secures the sheet against the conveyor belts 824 and 838 as it is fed from the second track assembly 114 and suspends the sheet so that it essentially stays in the substantially planer path. As the conveyor belts 824 and 838 rotate, they transport the sheet to the end of the substantially planer path at which time stepper motors 826 and 840 stop rotating.

When the stepper motors 826 and 840 and the conveyor belts 824 and 838 stop rotating, the sheet is suspended over the dolly. The sheet is then caused to separate from the vacuum formed along the perforations 828 and 829 of the conveyor belts 824 and 838, respectively, and falls into a stack on the dolly. The stepper motors 826 and 840 go through one complete cycle when driving the conveyor of belts 824 and 838 and transporting a sheet. During that cycle, the conveyor belts 824 and 823 move the sheet from the second track assembly 114 to the end of the substantially planar path.

At the beginning of the cycle, the stepper motors 826 and 840 drive the conveyor belts 824 and 838, respectively, at a beginning speed that is approximately 10% faster than the speed of the second track assembly 114. The stepper motors 826 and 840 then ramp up to a higher speed, which widens the gap between the sheets. The speed of the stepper motors 826 and 840 then ramp down to a complete stop at the end of the cycle. Widening the gap between the sheets, as described above, provides time to position the sheet over the stack, release it from the attractive vacuum force, and allow it to fall onto the stack.

The stepper motors 826 and 840 are both linked to the control system, which controls the motors' 826 and 840 acceleration, speed, and deceleration. Additionally, the stepper motors 826 and 840 are controlled in sync so that the conveyor belts 824 and 838 are driven at substantially the same speed.

Although only three modules are described in particularity, one skilled in the art will realize that other modules can be used in addition to or in place of the collator, printer, and stacker. Examples include a post collator, a slave collator, and a finishing machine.

H. Control System

Figure 24:
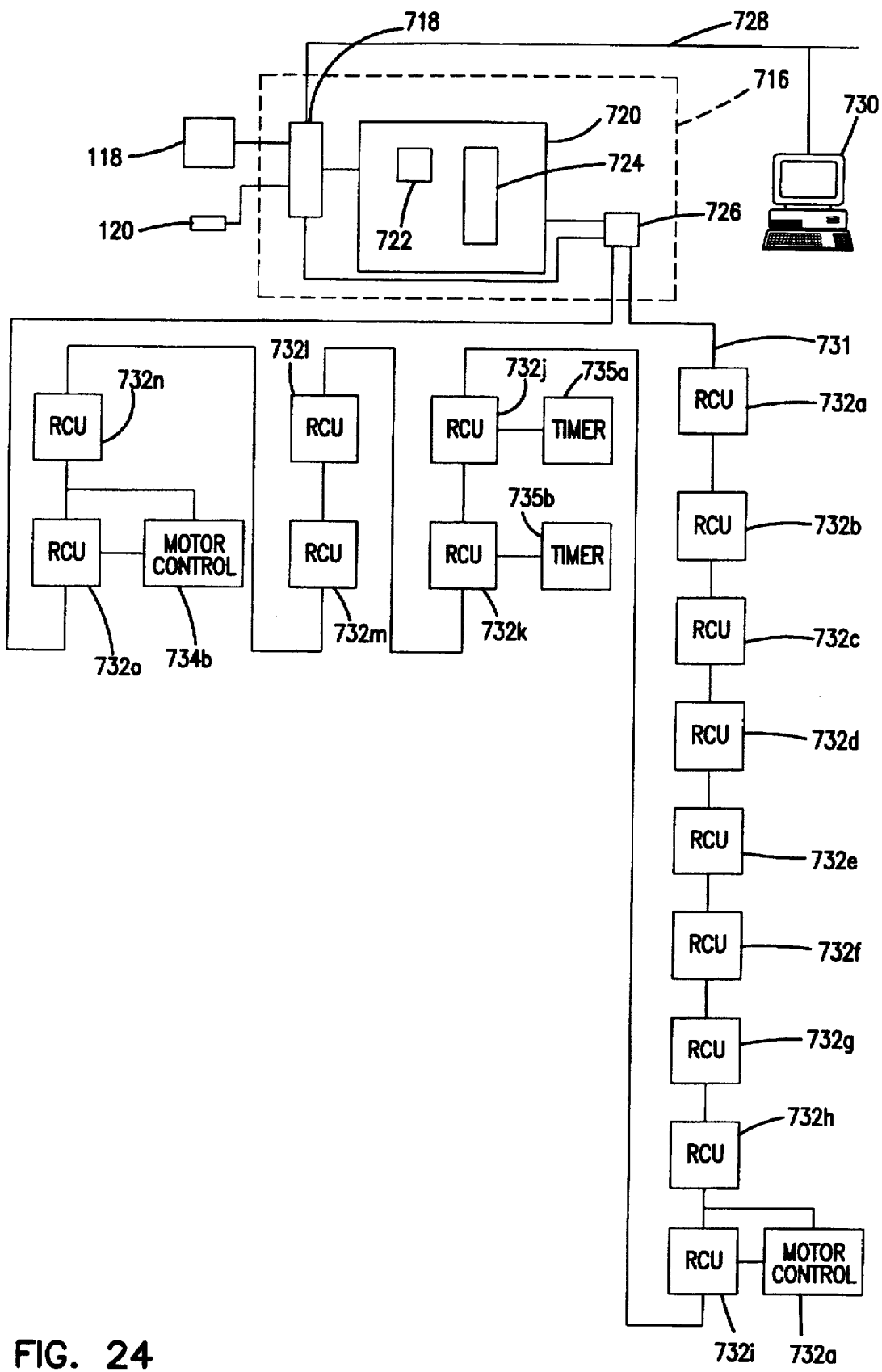
FIG. 24 is a functional block diagram of the programmable controller.

Referring to FIG. 24, the programmable controller includes a central control unit 716, a plurality of remote control units 732a–732o, motor-control daughter boards 734a and 734b, and timer daughter boards 735a and 735b. The central control unit 716, which is a system controller, can be implemented using an IBM-compatible personal computer having a microprocessor 718, which is a first processor, and a coprocessor board 720. Coprocessor board 720 includes a co-microprocessor 724, which is a second processor, and RAM 722. The microprocessor 718 and co-microprocessor 724 communicate through RAM 722. The control unit 716 also includes a serial communication controller 726 that is linked to both the microprocessor 718 and the coprocessor board 720. The serial communication controller 726 provides a communication interface between the central control unit 716 and a daisy chain-type local area network (daisy chain network) 731. Additionally, touch screen 118 and floptical disk drive 120 are communicatively linked to microprocessor 718 and provide a user interface for central control unit 716.

The microprocessor 718 allows an operator to create and edit jobs for running on the printing system described herein. Additionally, microprocessor 718 creates and rasterizes print images that are printed by printer 100. The print images are created from format and image data that can be input from the system manager 730 or downloaded from remote sites such as customer locations.

Co-microprocessor 724 performs real-time functions, can be implemented using a 80188 type coprocessor, and receives sequence table and retainer configuration information from the microprocessor 718. Co-microprocessor 724 uses this information to schedule picks from the various retainers 106a–106h. Additionally, the co-microprocessor 724 determines error recovery strategies, generates error recovery signals, and records mechanical performance. Examples of errors to which the co-microprocessor 724 will respond include an empty retainer, a failure to pick a sheet from a retainer, a jammed sheet, overlapping sheets were picked from a retainer, a retainer is holding the incorrect type of sheets, and the sheets are improperly positioned within the retainer.

Remote control units (RCU) 732a–732o and motor-control daughter boards 734a and 734b are coupled to the daisy chain network 731. RCUs 732a–732i form a collator controller and are physically located in the collator 100. RCUs 732a–732h control the elevator assemblies 176a–176h, respectively, and pick mechanism assemblies 180a–180h, respectively. RCU's 732j and 732k control the first and second stepper motors 1036 and 1038, respectively. RCU 732i controls track assembly 112, vertical track 532 of the collator 100, and the carriage motor 1012. Control of the carriage motor 1012 is via the servo controller. RCUs 732l and 732m form a printer controller and provide control for the printing mechanisms in the printer 102. RCUs 732n and 732o form a stacker controller and provide control for the stacker 104. The central control unit 716, RCUs 732a–732o, motor-control daughter boards 734a and 734b, and the timer daughter boards 735a and 735b form the programmed controller.

In an alternative embodiment, the carriage motor 1012 could be a stepper motor that is directly controlled by an RCU. In this alternative embodiment, the servo controller is not required and the third sensor 1084 would directly interface with the RCU.

An advantage of this architecture is that each retainer 106a–106h (i.e., each pick mechanism assembly 180a–180h and associated elevator assembly 176a–176h) is controlled by a separate RCU 732a–732h and can function independently. The collator 100 does not have to pick sheets from all of the retainers simultaneously and the level of the paper trays 190 within the retainers can be independently adjusted. As a result, the collator 100 can pick sheets from various retainers 106a–106h in a variety of different sequences. For example, the collator 100 could repeatedly pick sheets from a single retainer, pick sheets from a first retainer until it is empty and then pick sheets from a second retainer, pick sheets from alternate retainers, pick sheets from specified retainers in a predetermined sequence.

Because the level of the paper trays 190 can be independently adjusted, another advantage is that a single collator can be configured with retainers having different capacities. For example, the collator 100 might have some retainers having a 500-sheet capacity and some retainers having a 1000-sheet capacity.

The motor-control daughter board 734a is linked to both the daisy chain network 731 and RCU 732i. As described in more detail below, the motor-control daughter board 734a provides control for track motor 556 and provides an interface for the sensors located in first output track assembly 112. Similarly, motor-control daughter board 734b is linked to RCU 732m and the daisy chain network 731. Motor-control daughter board 734b provides control for the motor (not shown) that drives elevator assembly 714 in the stacker 104. Timer daughter boards 735a and 735b are linked to RCUs 732j and 732k, respectively.

Additionally, central control unit 716 is coupled to a local area network 728, which can be any type of conventional network. A system manager 730 is also linked to local area network 728. System manager 730 is an IBM compatible personal computer, which monitors and controls multiple printing systems as described herein. System manager 720 also provides snapshots of the current status of various modules such as the collator 100, printer 102, stacker 104. Additionally, the system manager 730 generates job lists and allows users to create and edit collation sequences, printer jobs, images for printing, and fonts. Another advantage of system manager 730 is that it can be configured to display mechanical performance statistics of the various modules and also efficiency statistics of operators.

Figure 25:
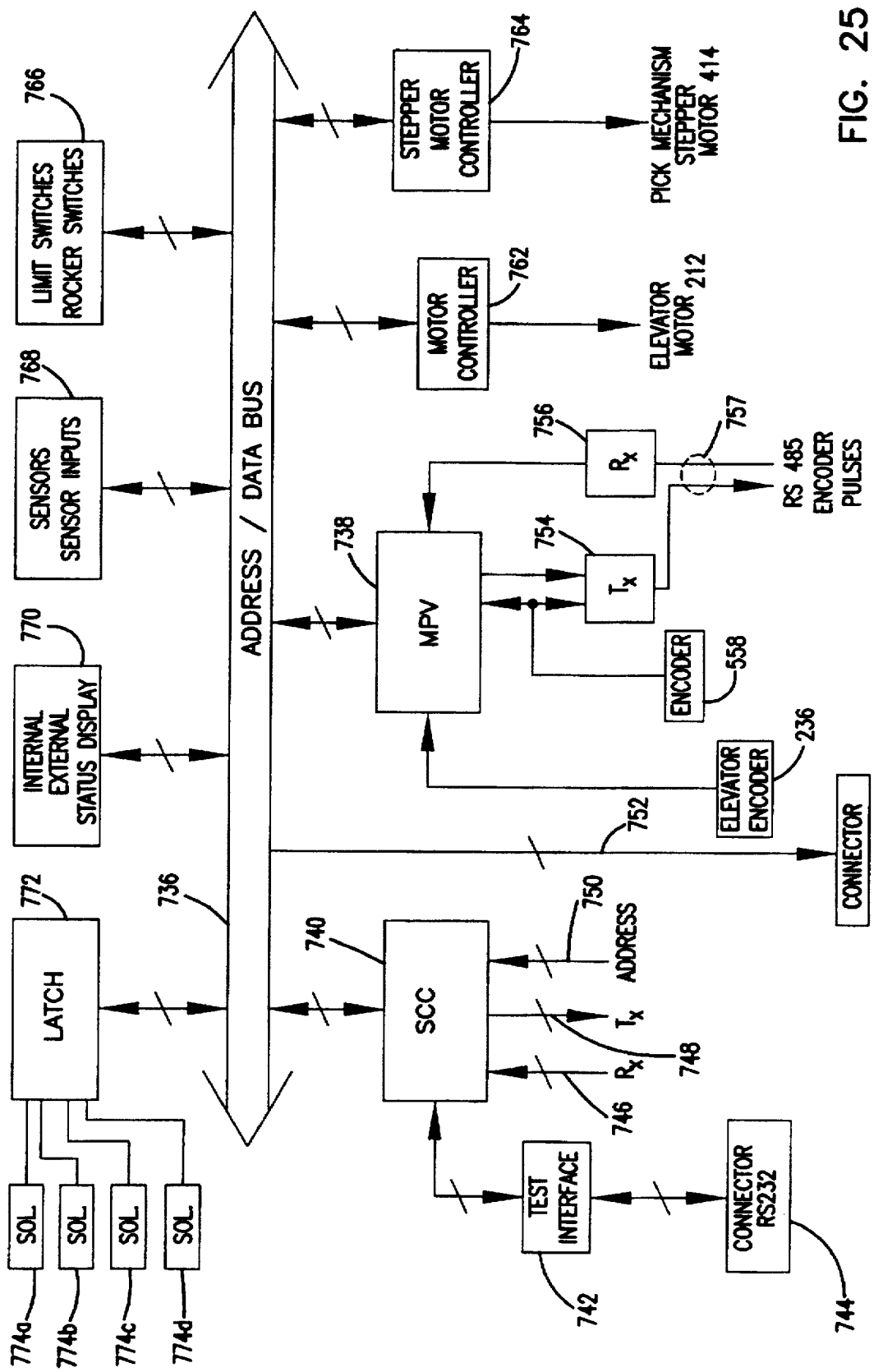
FIG. 25 is a functional block diagram of a remote control unit shown in FIG. 24.

Referring to FIG. 25, RCU 732a includes a serial communication controller (SCC) 740, a microprocessing unit 738, a motor controller 762, a stepper motor controller 764, a sensor interface 768, a switch interface 766, external/internal status display 770, a latch 772 and interface circuitry for solenoids 774a–774d, a connector 752 for either a motor-control daughter board 734a or 734b or a timer daughter board 735a or 735b, and an address/data bus 736.

SCC 740 provides an interface to daisy chain network 731, which includes a receive twisted pair 746, a transmit twisted pair 748, and an address bus 750. SCC 740 is linked to test interface 742. Test interface 742 provides an interface for test equipment and communicates according to the RS 232 protocol. Test equipment can be connected to connector 744. As will be described in more detail below, daisy chain network 731 includes a third twisted pair 757 for transmitting track encoder pulses. One type of SCC that can be used is model 85C30, which operates at 8 MHz.

Microprocessing unit 738 is linked to the address/data bus 736 and includes a microprocessor such as an 80188 model, a 32K×8 static RAM, and a programmable readable memory. Microprocessing unit 738 provides processing power for RCU 732a and includes a microprocessor (not shown), a static RAM (not shown), and a PROM (not shown). Elevator motion encoder 236 is linked to microprocessing unit 738. In the case of RCU 732i, track encoder 558 is linked to both the microprocessing unit 738 and driver 754. Driver 754 and receiver 756 provide an interface between microprocessing unit 738 and the third twisted pair 757. Third twisted pair 757 provide a dedicated communication link for transmitting encoder pulses from the track encoder 558 to the central control unit 716 and the RCUs 732a–732h in the collator 100. In this configuration, the encoder pulses a communication without being delayed by other messages that are being transmitted along the daisy chain network 731.

Motor controller 762 and stepper motor controller 764 are linked to the address/data bus 736, but are optically isolated. Motor controller 762 is linked to and controls motor 212 of elevator assembly 176a. One type of motor controller that can be used is model 33033 for controlling a brushless DC motor. Stepper motor controller 764 is linked to and controls stepper motor 414 of pick mechanism assembly 180a. One type of stepper motor controller that can be used is model L297.

Switch interface 766 is linked to the address/data bus 736. The switches that are connected to switch interface 766 include upper and lower limit switches 206 and 208, safety switches 210a–210d, and rocker switches (not shown). Each elevator assembly 176a–176h has an associated pair of rocker switches that an operator can use to move the elevator assembly 176a–176h up or down.

Sensor interface 768 is linked to address/data bus 736. Paper sensors 203 and 428, multi-item detector 432, and hall-effect sensor 424 are connected to sensor interface 768.

Internal/external status display 770 is linked to the address/data bus 736, driven by an octal flip flop (not shown), and enabled by an 8-bit latch (not shown). Internal/external status display 770 includes an internal set of eight light-emitting diodes (not shown) and an external set of eight light-emitting diodes (not shown). Both sets of diodes are arranged in a vertical bar graph and display identical codes that a technician can use for diagnostic purposes. The external set of diodes are visible to an operator. The internal set of diodes are mounted directly on the RCU circuit board.

Figure 26:
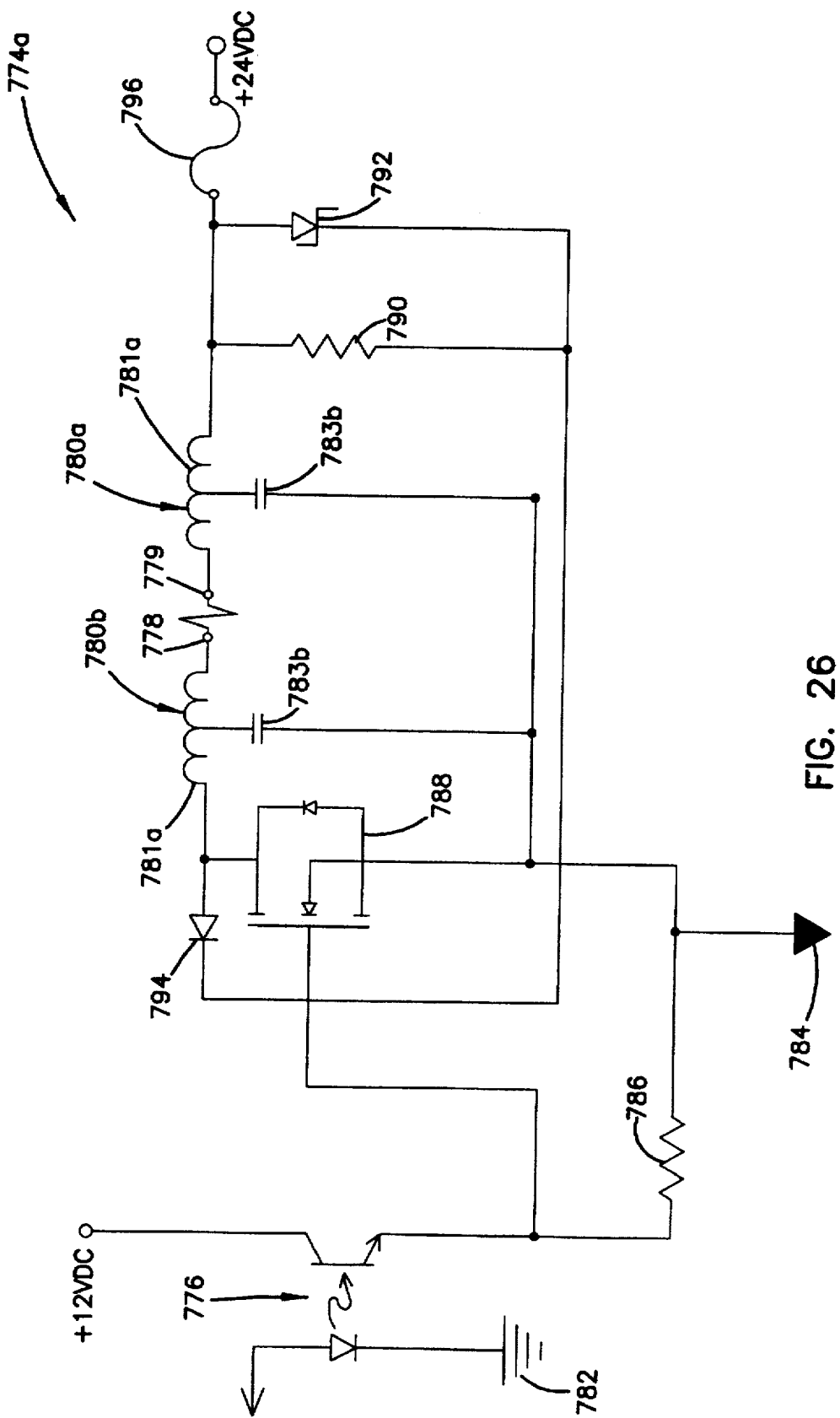
FIG. 26 is a functional block diagram of solenoid circuitry shown in FIG. 25.

Latch 772 is linked to address/data bus 736 and provides an interface to solenoid control circuits 774a–774d, each of which are substantially similar and control a separate solenoid. Referring to FIG. 26, solenoid control circuit 774a isolates solenoid 778 between first and second T-type EMI suppression filters (suppression filters) 780a and 780b. Inductive coil 781a of the first suppression filter 780a provides a path from a 24 volt DC power supply to a first terminal 779 of solenoid 778. Inductive coil 781b provides an electrical path from a second terminal 777 of solenoid 778 to the drain of N channel enhancement-mode MOSFET transistor (MOSFET transistor) 788. The source of MOSFET transistor 788 is connected to a ground plane 784 that is separate and isolated from the system ground 782. The gate of MOSFET transistor 788 is connected to an emitter of an optical isolator 776. A resistor 786 provides an electrical path between the emitter of optical isolator 776 and the ground plane 784. First suppression filter 780a also includes a capacitor 783a that is linked between inductive coil 781a and the ground plane 784. Similarly, second suppression filter 780b has a capacitor 783b that is connected between inductive magnetic coil 781b and the ground plane 784. Diode 794, resistor 790, and zener diode 792 provide voltage and current regulation for solenoid 778. The 24 volt power supply is isolated by fuse 796.

In order to activate solenoid 778, microprocessing unit 738 will send a signal to latch 772 via the address/data bus 736. Latch 772 will activate optical isolator 776, which will create a voltage difference between the gate and source of MOSFET transistor 788. The voltage difference will close the circuit between second suppression filter 780b and the ground plane 784. As a result, current will flow from the 24 volt DC power supply through inductive magnetic coil 781a, solenoid 778, and inductive magnetic coil 781b. Capacitors 783a and 783b will simultaneously become charged. This configuration and operation of first and second suppression filters enable solenoid 778 to actuate quicker than if the solenoid 778 was connected directly between the 24 volt power supply and the ground plane 784.

RCUs 732a–732o are detachably mounted programmable circuits. RCUs 732b–732o are substantially similar to RCU 732a. Additionally, motor-control daughter board 734a is connected to connector 752 of RCU 732i in the collator 100. Motor-control daughter board 734b is connected to connector 752 of RCU 732o in the stacker 104. Timer daughter boards 735a and 735b are similarly connected to RCUs 732j and 732k, respectively.

Figure 27:
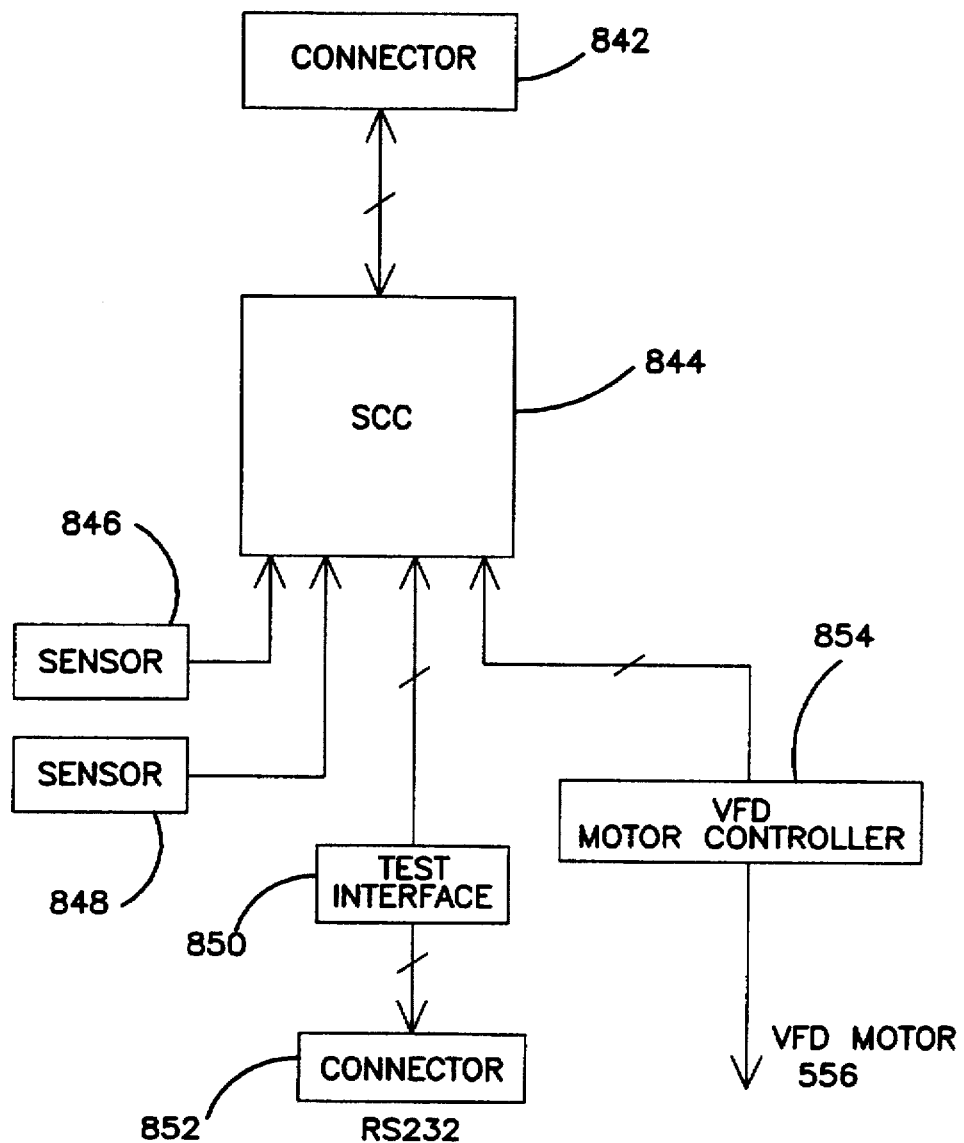
FIG. 27 is a functional block diagram of a motor-control daughter board shown in FIG. 24.

Referring now to FIG. 27, motor-control daughter board 734a includes a connector 842, an SCC 844, a variable frequency drive (VFD) motor controller 854, a test interface 850, and a connector 852. Main connector 842 is configured to interface with connector 752 of remote control unit 732i and is linked to serial communication controller 844. Serial communication controller 844 provides an interface between the remote control unit 732h and the VFD motor controller 854, test interface 850, and paper sensors 674, 706, and 708 and scanning device 678 that are located in first track assembly 112. VFD motor controller provides control of track motor 556. Test interface 850 is linked to connector 852 and provides an interface to test equipment. Test interface 850 provides communication according to the RS 232 protocol.

Motor-control daughter board 734b is substantially similar to motor-control daughter board 734a and controls the elevator motor of stacker 104. Motor-control daughter board 734b is not described in detail for purposes of brevity and clarity.

Figure 28:
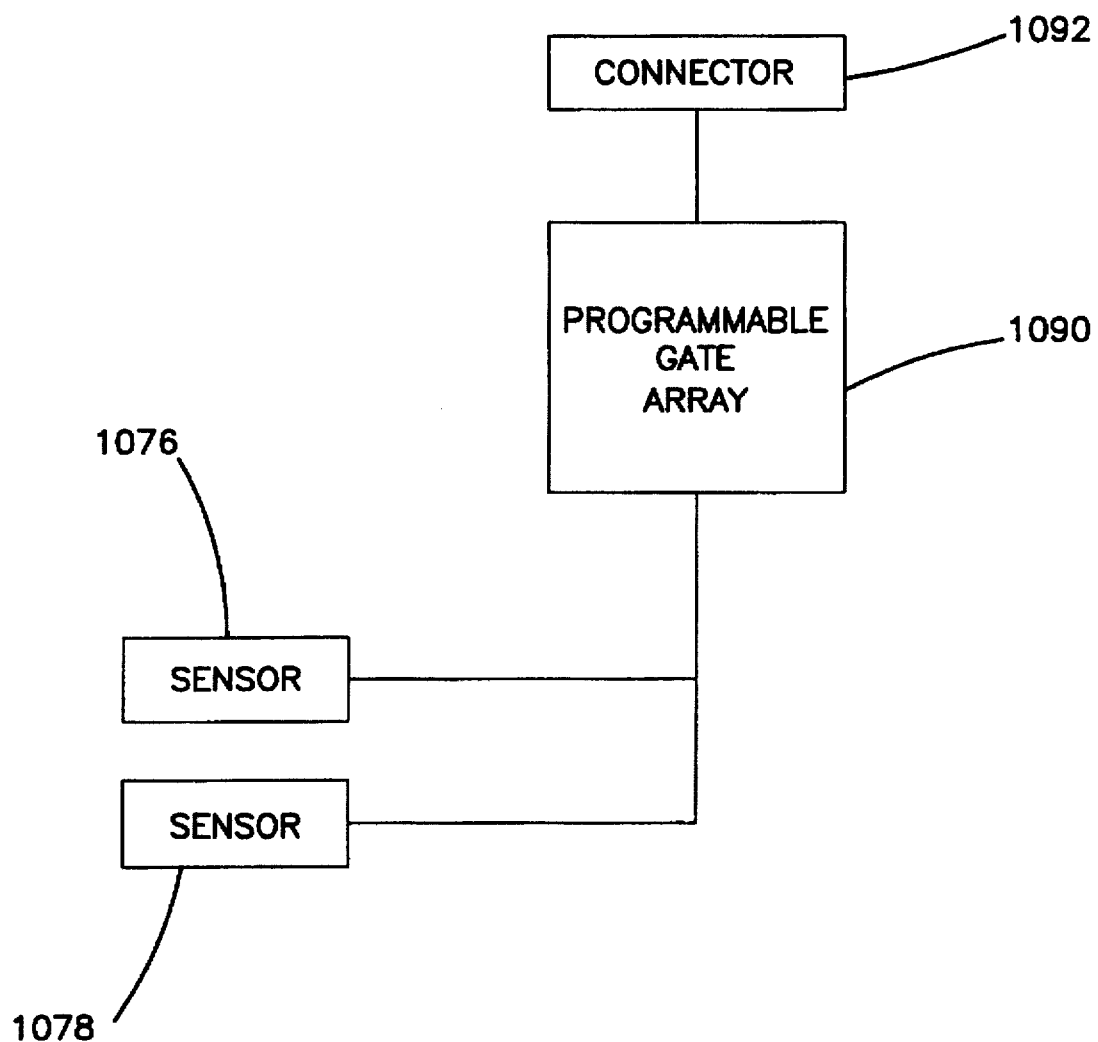
FIG. 28 is a functional block diagram of a timer daughter board shown in FIG. 24.

Referring to FIG. 28, the timer daughter board 735a includes a programmable gate array 1090 that is linked to a connector 1092. The connector 1092 is attached to connector 752 of RCU 732j. One type of programmable gate array that can be used is chip number ISPLSI 1016, which is manufactured by Lattice Corporation. In turn, the first and second sensors 1076 and 1078 are linked to the programmable gate array 1090. The timer daughter board 735b is substantially identical to the timer daughter board 735a and is also similarly linked to the first and second sensors 1076 and 1078.

The timer daughter boards 735a and 735b perform substantially identical functions and operate in parallel. When either the first or second sensor 1076 or 1078 detects the leading edge, it generates a signal that is detected by the programmable gate array 1090. In response to the signal, a counter internal to the programmable gate array 1090 begins to count. The counter continues to count until either the other sensor 1078 or 1076 detects the leading edge of the sheets and generates a signal or the counter overflows.

The programmable gate array 1090 is configured to operate on a 2 MHz clock. In contrast, RCUs 732j and 732k operate on a 4 MHz clock and thus increment the first and second stepper motors 1036 and 1038 on that basis. Thus, the count made by the programmable gate array 1090 corresponds to only half the number of steps made by the first and second stepper motors 1036 and 1038 and one half the time interval between triggering the first and second sensors 1076 and 1078.

Once the counter stops counting, the programmable gate array 1090 sends an interrupt signal to the RCUs 732j and 732k and then communicates the count to the RCUs 732j and 732k. The RCUs 732j and 732k use this information to calculate the change in speed and phase of the first and second stepper motors 1036 or 1038, respectively, required to rotate the sheet and correct the angular error.

RCU's 732j and 732k then adjust the speed and phase of the first and second stepper motors 1036 and 1038, respectively, until the angular error of the sheets is corrected. Once the leading edge of the sheet is substantially perpendicular to the path, the RCU's 732j and 732k return the first and second stepper motors 1036 and 1038, respectively, to their default speed.

When correcting angular error, RCU 732j will increase the speed of the first stepper motor 1036 and RCU 732k will decrease the speed of the second stepper motor 1038 if the second sensor 1078 detects the leading edge before the first sensor 1076. Similarly, RCU 732j will decrease the speed of the first stepper motor 1036 and RCU 732k will increase the speed of the second stepper motor 1038 if the first sensor 1076 detects the leading edge of the sheet before the second sensor 1078 detects the leading edge. The RCU's 732j and 732k will not adjust the speed and phase of the first and second stepper motors 1036 and 1038, respectively, if there is not a detectable time interval between the moments that the first and second sensors 1076 and 1078 detect the leading edge of the sheet.

An advantage of this architecture is that all of the calculations are accomplished in the time domain, which negates the need to convert the count to distance. Another advantage is that the count does not need to be divided by two in order to determine the velocity change required by each of the stepper motors 1036 and 1038. The reason that dividing the count is not required is that the clock speed of the programmable gate array is half that of the RCUs 732j and 732k. The count only corresponds to one half the steps made by the stepper motors 1036 and 1038 and thus one half the angular error of the sheet. Thus, the number of mathematical operations required by the RCUs 732j and 732k is reduced.

Reducing the number of required calculations in turn reduces the response time of the RCUs 732j and 732k. Thus, the delay between detection of the leading edge of the sheets and speed and phase adjustment of the first and second stepper motors 1036 or 1038 is minimized and angular error of the sheet is adjusted very quickly. Such a quick response time is very important when the sheets are being transported along the path very quickly and there is only a short time period in which the sheet engages the registration system 1000.

Although adjusting the speed of both the first and second stepper motors 1036 and 1038 is discussed, it is contemplated that angular error could also be corrected by adjusting the speed of only one of the stepper motors 1036 or 1038.

Those skilled in the art will readily recognize that these and various other modifications and changes may be made to the present invention without strictly following the exemplary embodiments and applications illustrated and described herein, without departing from the true spirit and scope of the present invention which is set forth in the following claims.

The invention that we claim:

1. A sheet-stacking apparatus for stacking sheets received from a printing assembly, the sheet stacking apparatus comprising:
   a support structure;
   an inverted-conveyor assembly supported by the support structure, the inverted-conveyor assembly having a bottom surface and being configured to suspend the sheets received from the printing assembly against the bottom surface and transport the sheets;

a recirculating assembly supported by the support structure, the recirculating assembly being configured to separate the suspended sheets from the inverted-conveyor assembly thereby causing the sheets to fall; and a platform supported by the support structure, wherein the falling sheets land on the platform and form a stack.

2. The sheet-stacking apparatus of claim 1 further comprising an elevator assembly for raising and lowering the level of the platform.

3. The sheet-stacking apparatus of claim 2 wherein the stack has side edges, the sheet-stacking apparatus further comprising a jogging assembly supported by the support structure, the jogging assembly being configured to square the edges of the stack.

4. The sheet-stacking apparatus of claim 3 wherein the sheets being transported have first and second side portions, further wherein the inverted-conveyor assembly has first and second conveyor belts, the first conveyor belt being configured and arranged to transport the first side portion of the sheets and the second conveyor belt being configured and arranged to transport the second side portion of the sheets.

5. The sheet stacking apparatus of claim 4 further comprising a carriage on which the second conveyor belt is mounted, the carriage slidably supported by the support structure so that the distance between the first and second conveyor belts is adjustable.

6. An inverted-conveyor assembly for use in a sheet stacking apparatus, the inverted-conveyor assembly comprising:

a belt system having a lower portion and an upper portion, the lower portion having a bottom surface, the belt system defining at least one opening; and a manifold positioned between the upper and lower portions of the belt system, the manifold being configured to intake air through the opening thereby creating a vacuum force proximate the bottom surface of the belt system, the vacuum force suspending sheets from the bottom surface.

7. The inverted conveyor assembly of claim 6 wherein the belt system includes a belt, the at least one opening being a plurality of apertures extending along the length of the belt, further wherein the manifold is in fluid communication with at least some of the apertures extending along the lower portion, the manifold being configured to intake air through the apertures.

8. The inverted-conveyor assembly of claim 6 wherein the belt system includes two substantially parallel conveyor belts, the at least one opening being a gap between the two substantially parallel belts, further wherein the manifold is in fluid communication with a portion of the gap extending along the bottom portion of the belt system, the manifold being configured to intake air through the gap.

9. An elevator mechanism for use in a sheet stacker, the elevator mechanism comprising:

a support structure;

a platform on which the sheets are stacked;

a plurality of suspension belts, each suspension belt having one end connected to the platform;

a plurality of rollers being rotatably supported by the support structure, the suspension belts further having an opposite end connected to the rollers;

a drive mechanism for rotating the rollers, wherein the rollers take up the suspension belts and raise the platform when rotated in one direction and the rollers let out the suspension belts and lower the platform when rotated in the opposite direction.

10. The elevator mechanism of claim 9 wherein the platform has four corners, further wherein the plurality of suspension belts includes four suspension belts, the one end of each suspension belt being connected to the platform proximate a different corner.

11. The elevator mechanism of claim 10 further comprising:

a rail being supported by the support structure, the rail having first and second edges; and first, second, third, and fourth rollers being rotatably connected to the platform, the first and second rollers engaging the first edge of the rail, the third and fourth rollers engaging the second edge of the rail.

12. A recirculating mechanism for separating sheets from an inverted conveyor assembly having a bottom surface from which the sheets are suspended, the recirculating mechanism comprising:

a support structure;

a motor being supported by the support structure, the motor having a drive shaft;;

a crank mounted on the drive shaft so that the motor will rotate the crank;

a recirculating member having a lower edge, one end pivotally connected to the crank and an opposite end operably connected to the support structure, wherein the rotating crank causes the lower edge to move below the bottom surface of the inverted conveyor assembly thereby separating the sheet.

13. The recirculating mechanism of claim 12 further comprising a lever having first and second ends, the first end being pivotally supported by the support structure and the second end pivotally connected to the opposite end of the recirculating member.

14. The recirculating mechanism of claim 13 wherein the lower edge of the recirculating member has a middle portion and end portions, further wherein the lower edge is arcuately shaped so that the middle portion of the lower edge is lower than the end portions and the lower edge has a rolling line contact with the sheet when moving below the bottom surface of the inverted conveyor assembly, thereby reducing sheet distortion during separation.

* * * * *

UNITED STATES PATENT AND TRADEMARK OFFICE
CERTIFICATE OF CORRECTION

PATENT NO. : 5,696,690

DATED : DECEMBER 9, 1997

INVENTOR(S) : RICHARDSON ET AL.

It is certified that error appears in the above-identified patent and that said Letters Patent is hereby corrected as shown below:

Title page, [75] Inventors: delete "Allan C. Brittle, Jr., Wayzata"

[75] Inventors: delete "Kent Gorham, Prior Lake"

[75] Inventors: delete "Chris J. Vetter, St. Paul"

[75] Inventors: delete "Eugene G. Weiss, Minneapolis"

Col. 3, line 33: "FIGS. 5 and 6" should read — FIGS. 5, 6 —

Col. 21, line 29: "not shown)" should read — (not shown) —

Signed and Sealed this

Twenty-seventh Day of April, 1999

Attest:

Q. TODD DICKINSON

*Attesting Officer*     *Acting Commissioner of Patents and Trademarks*